United States Patent [19]

Bickford et al.

[11] Patent Number: 4,791,838

[45] Date of Patent: Dec. 20, 1988

[54] APPARATUS AND METHOD FOR DETERMINING TORQUE, PRESENTING DIGITAL TORQUE READOUT AND AUTOMATIC CYCLING AND TERMINATION OF WRENCH OPERATION IN A TORQUE WRENCH SYSTEM

[75] Inventors: John H. F. Bickford, Middletown; Jesse R. Meisterling, East Hampton, both of Conn.; Milton O. Smith, Bothell, Wash.; Geoffrey F. Kosciak, Stevensville, Mich.

[73] Assignee: Raymond Engineering Inc., Middletown, Conn.

[21] Appl. No.: 930,342

[22] Filed: Nov. 12, 1986

Related U.S. Application Data

[63] Continuation-in-part of Ser. No. 869,178, May 30, 1986.

[51] Int. Cl.⁴ .............................................. B25B 21/00
[52] U.S. Cl. ........................................ 81/467; 73/708; 73/761; 81/469
[58] Field of Search .................. 81/467, 479, 57.39, 81/57.44, 57.46, 57.42, 469; 73/761, 862.21, 862.23, 862.25, 862.37, 708

[56] References Cited

U.S. PATENT DOCUMENTS 3,745,820 7/1973 Weiner ............................ 73/862.25
4,211,120 7/1980 Tambini ............................. 73/761
4,244,245 1/1981 Wallace ........................... 73/862.21
4,294,110 10/1981 Whitehouse .................... 73/862.23
4,402,052 8/1983 Stone ............................... 73/862.25
4,426,887 1/1984 Reinholm .......................... 73/761
4,444,273 4/1984 Ruby ................................. 81/467

FOREIGN PATENT DOCUMENTS 1560529 2/1980 United Kingdom .
1577526 10/1980 United Kingdom .

Primary Examiner—James G. Smith
Attorney, Agent, or Firm—Fishman, Dionne & Cantor

[57] ABSTRACT

Apparatus and a method are presented for determining the torque load applied to a fastening element by a fluid powered wrench, and displaying a digital readout of the torque. The operating pressure of the wrench, after compensation for the temperature of the pressure transducer, is converted to a torque measurement by a programmed microprocessor and the torque value is displayed on a digital readout. The system is useable with and adjusts for wrenches of several sizes by an input selector switch connected to the microprocessor. Apparatus and method are also presented for automatic cycling of a ratcheting hydraulic powered wrench and automatic termination of the tightening process when a predetermined torque has been delivered to the fastening element.

31 Claims, 26 Drawing Sheets

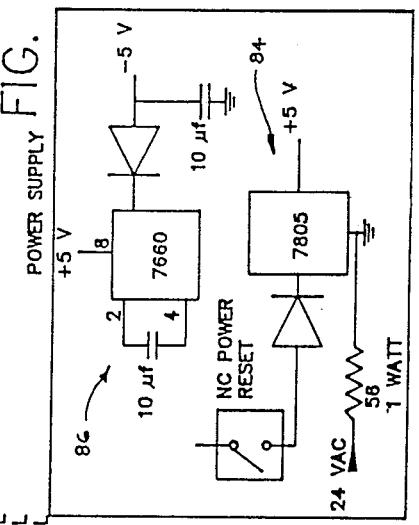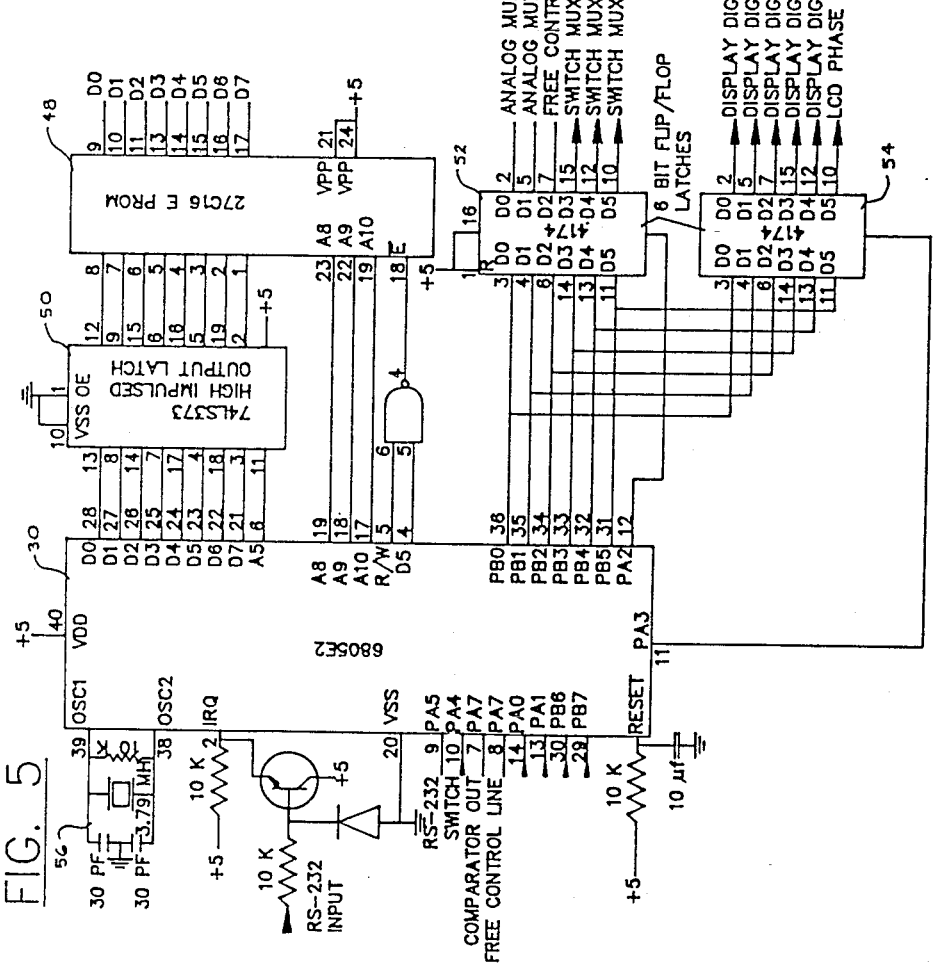

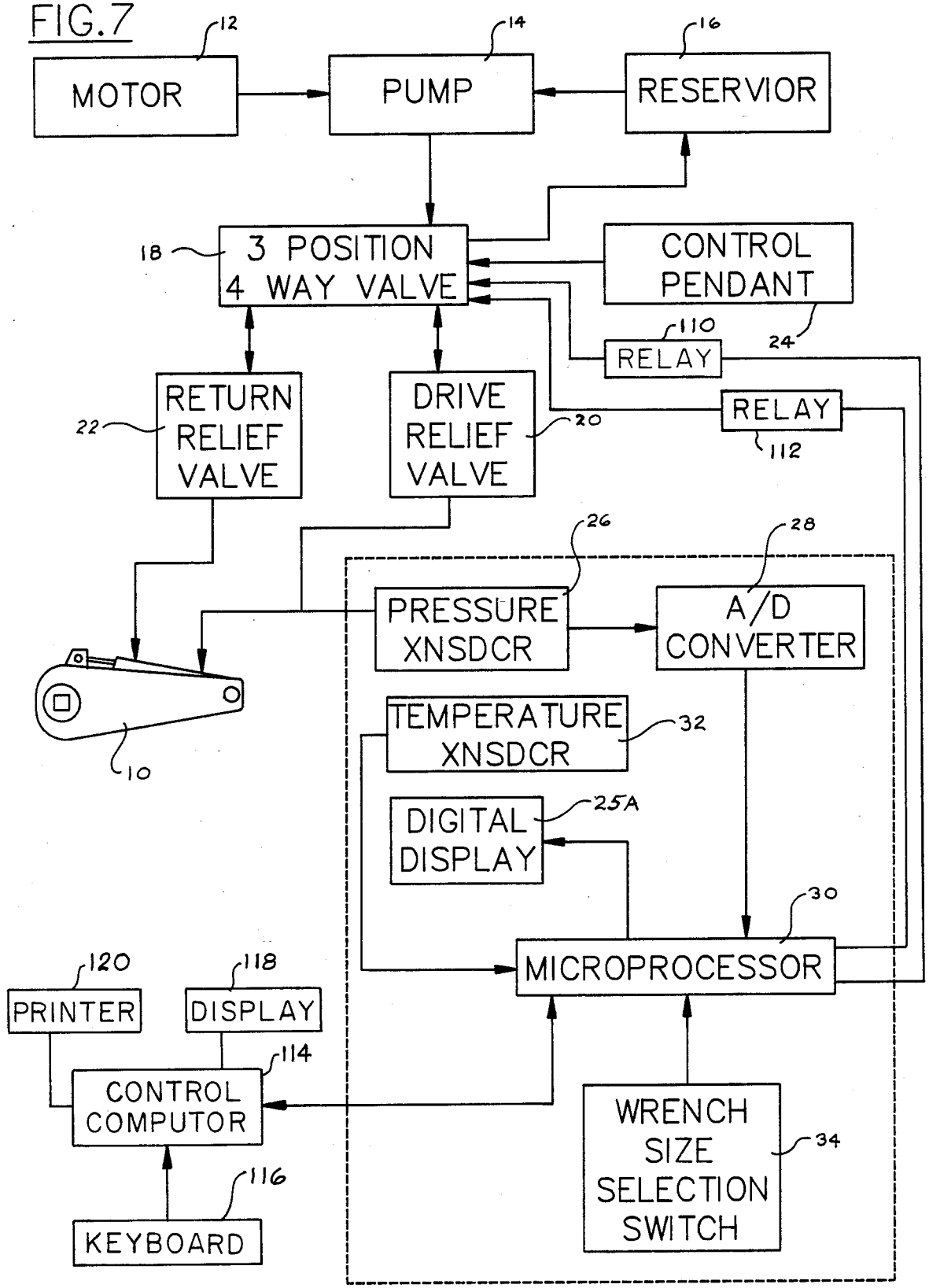

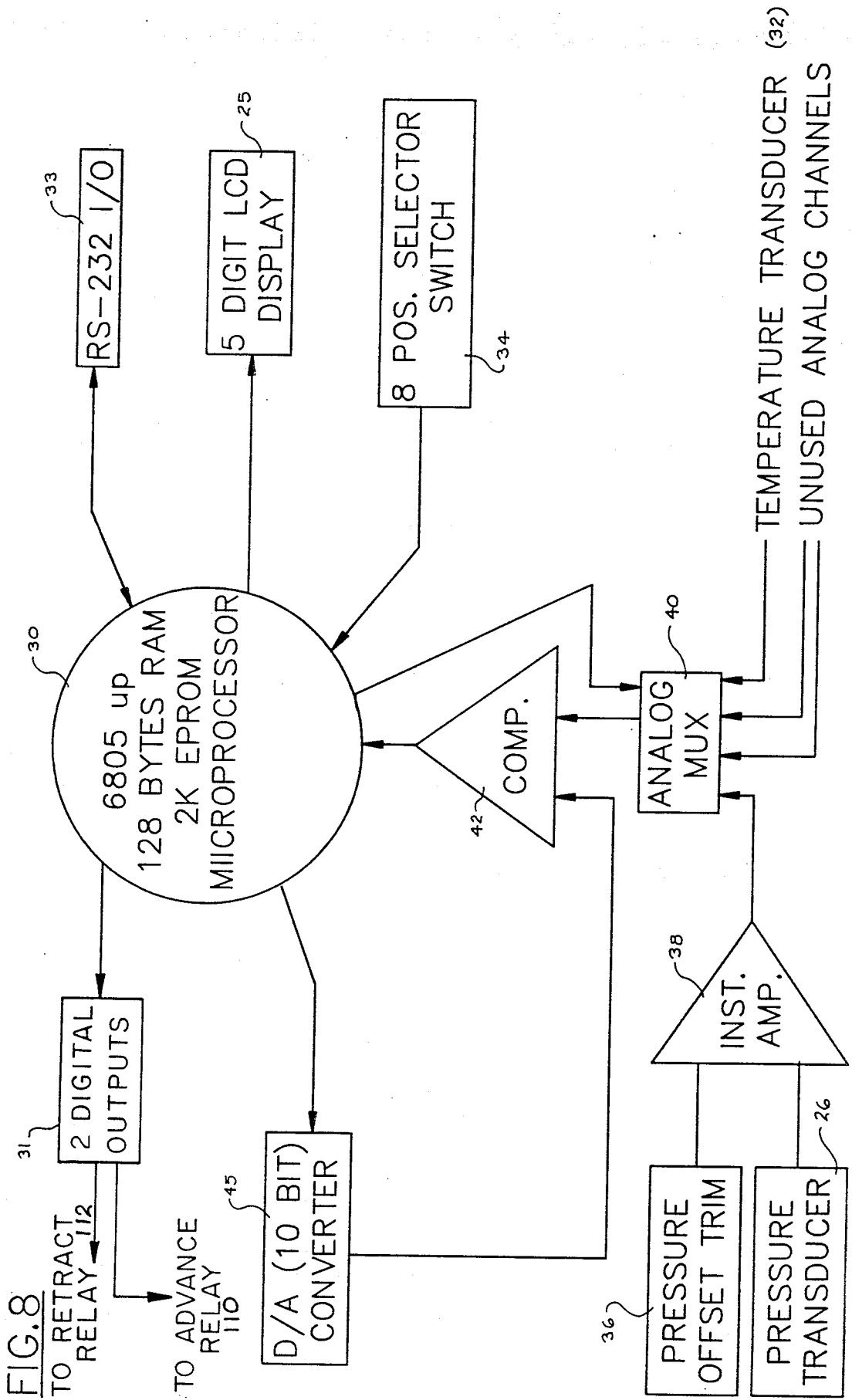

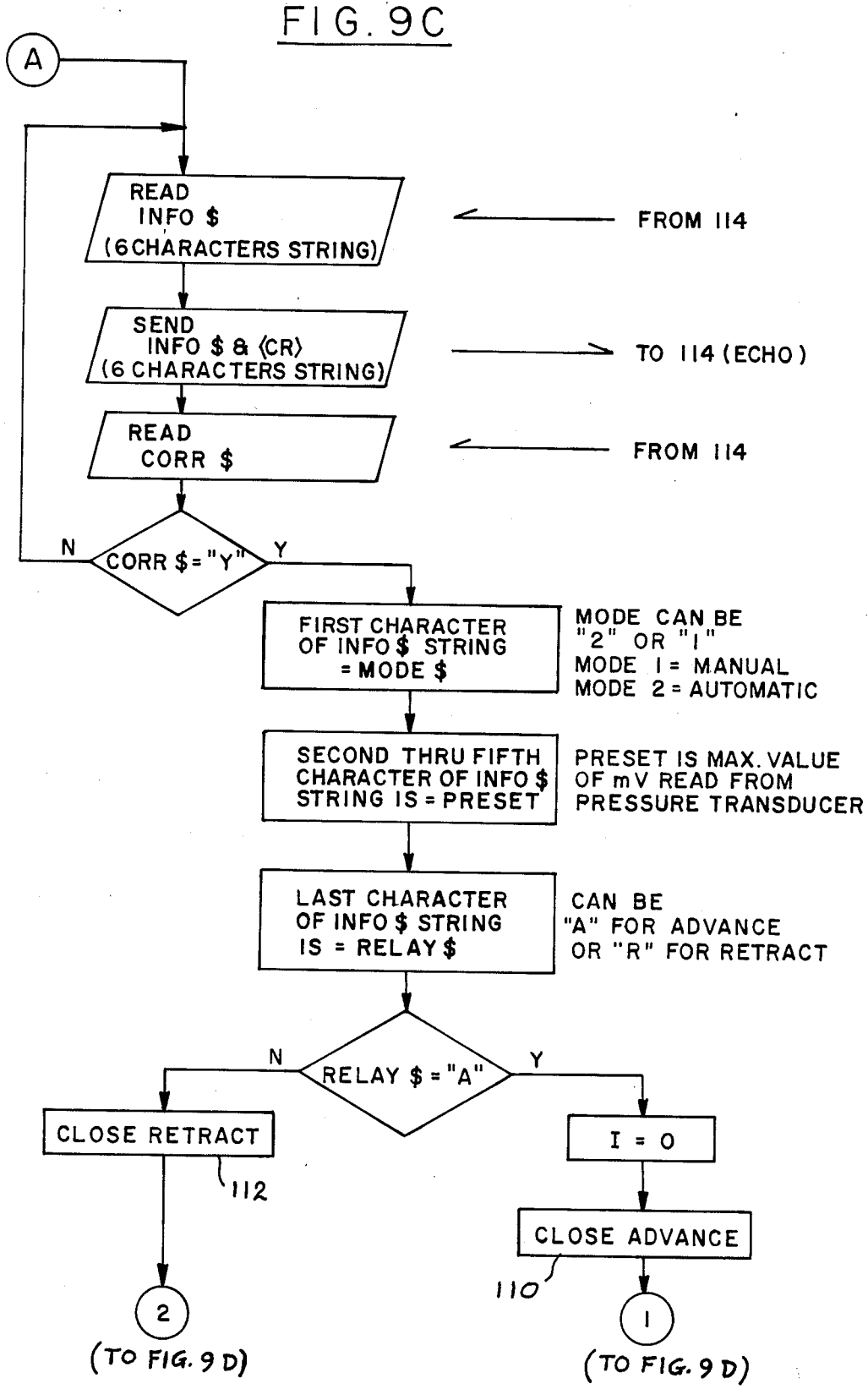

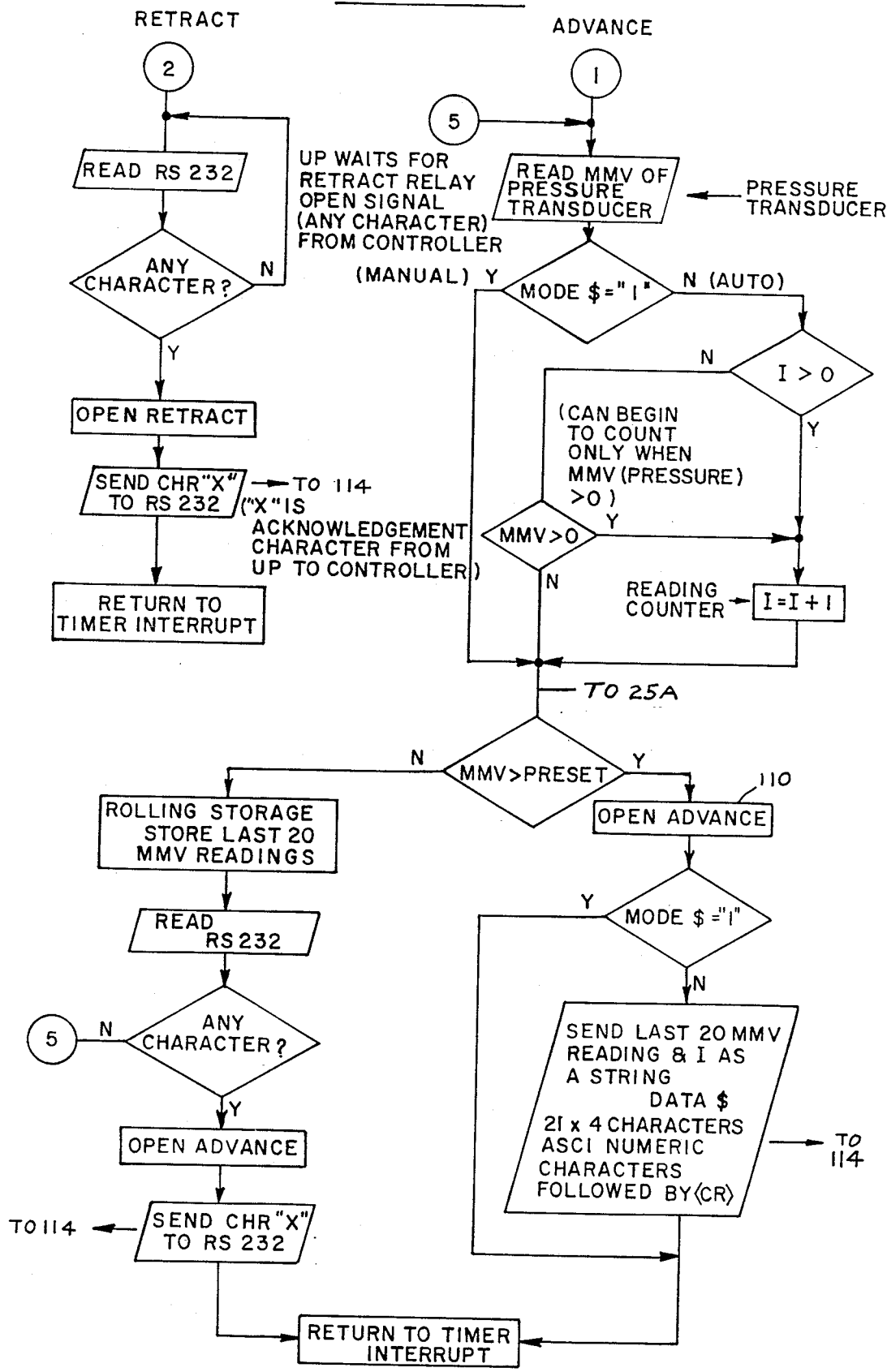

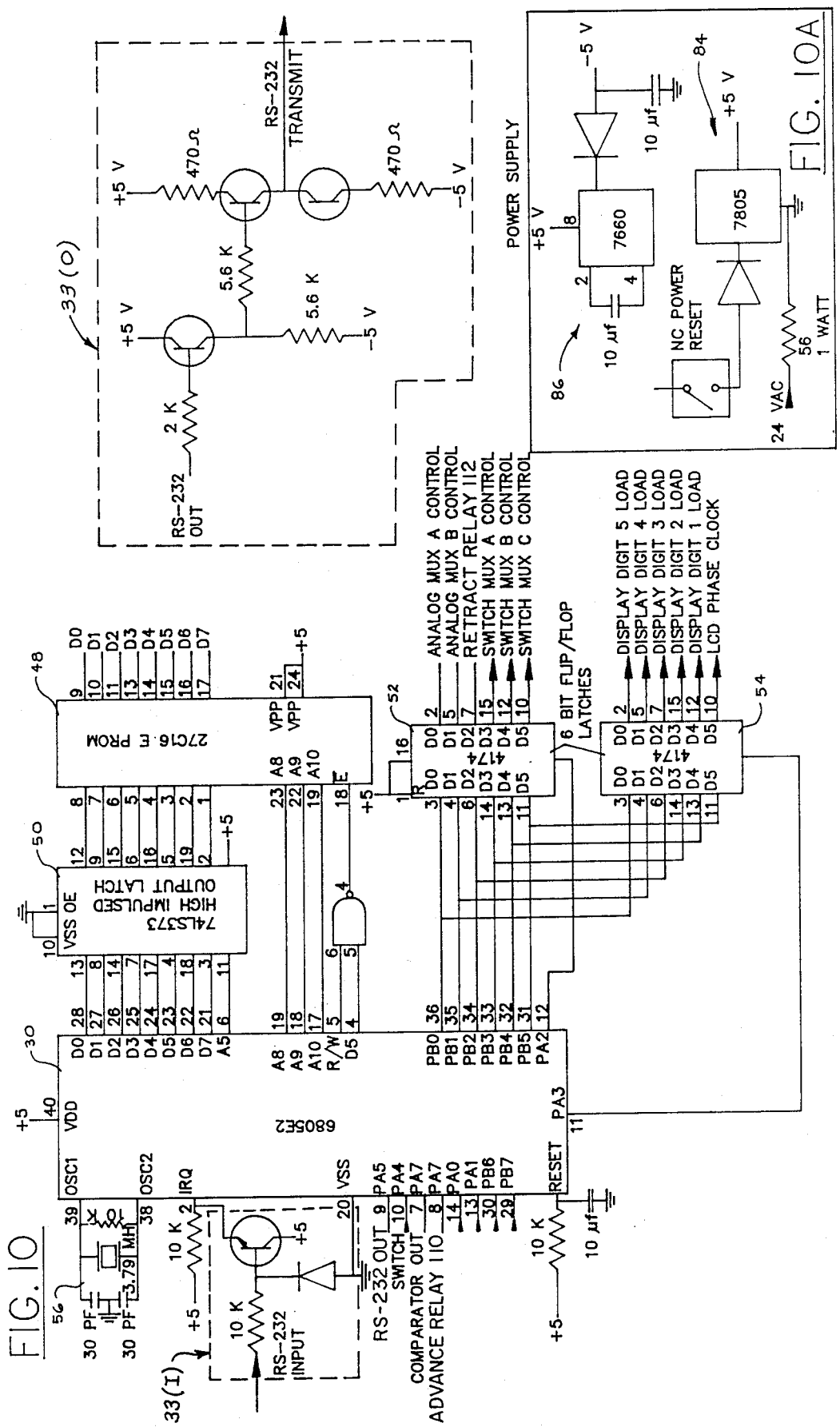

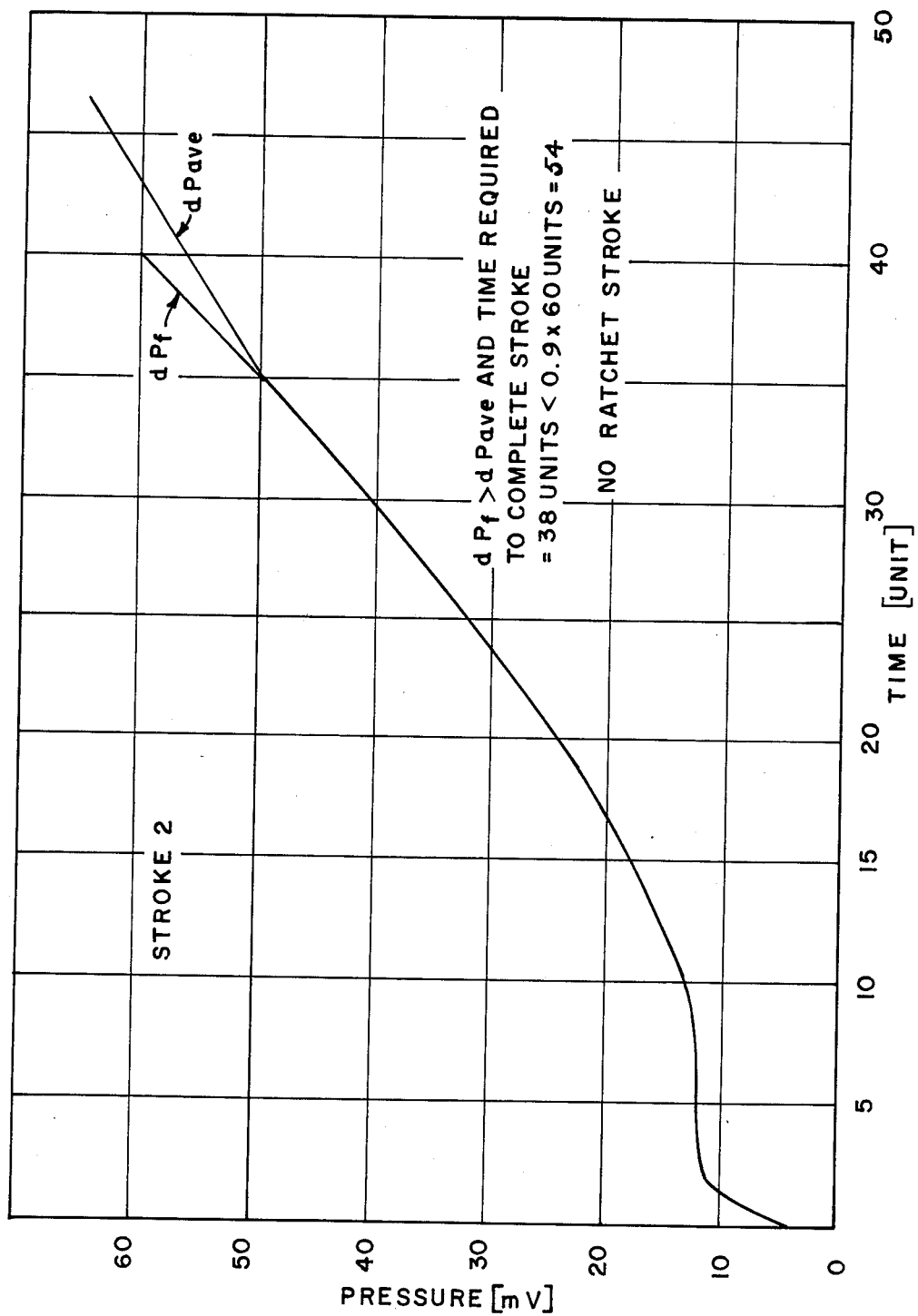

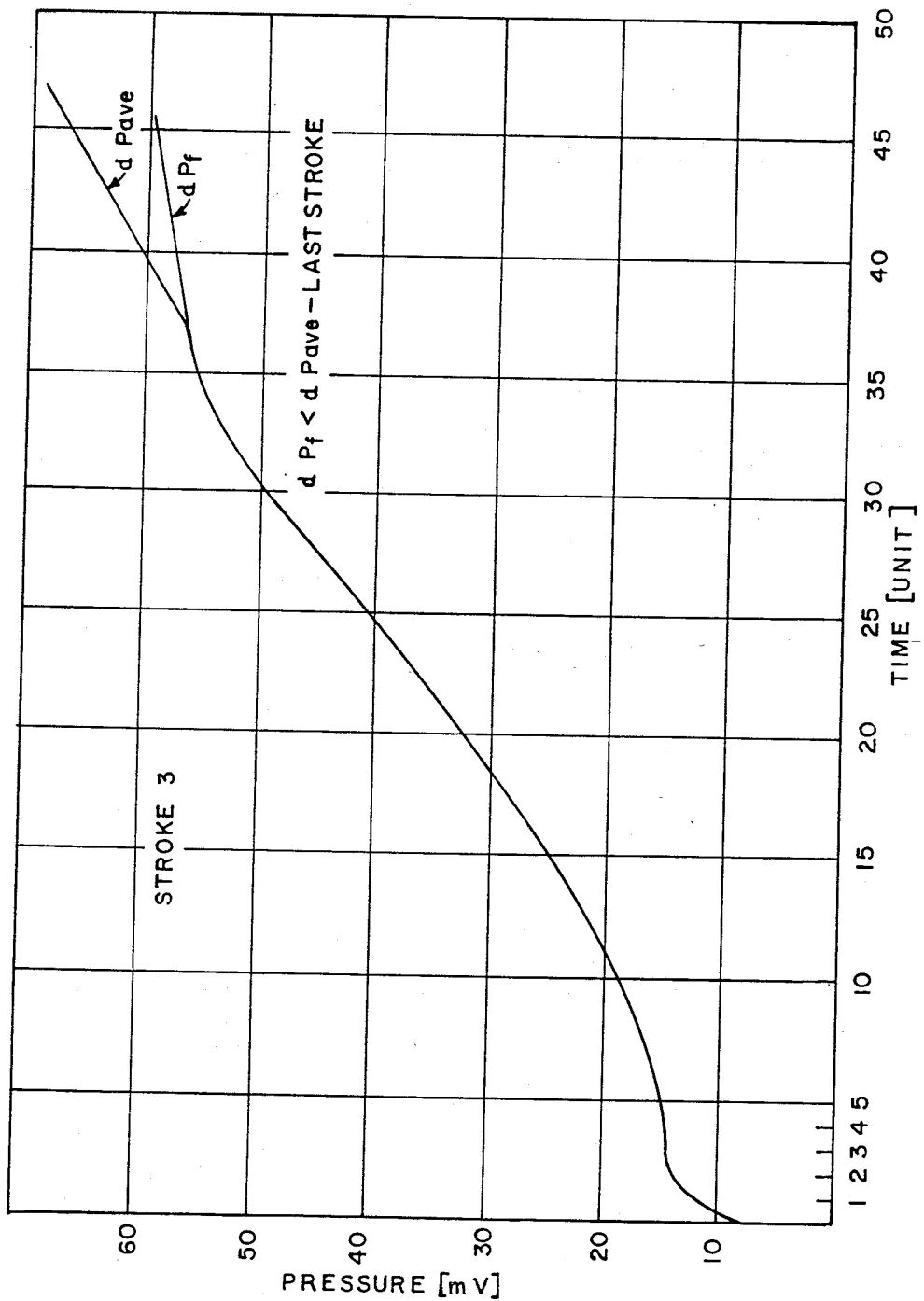

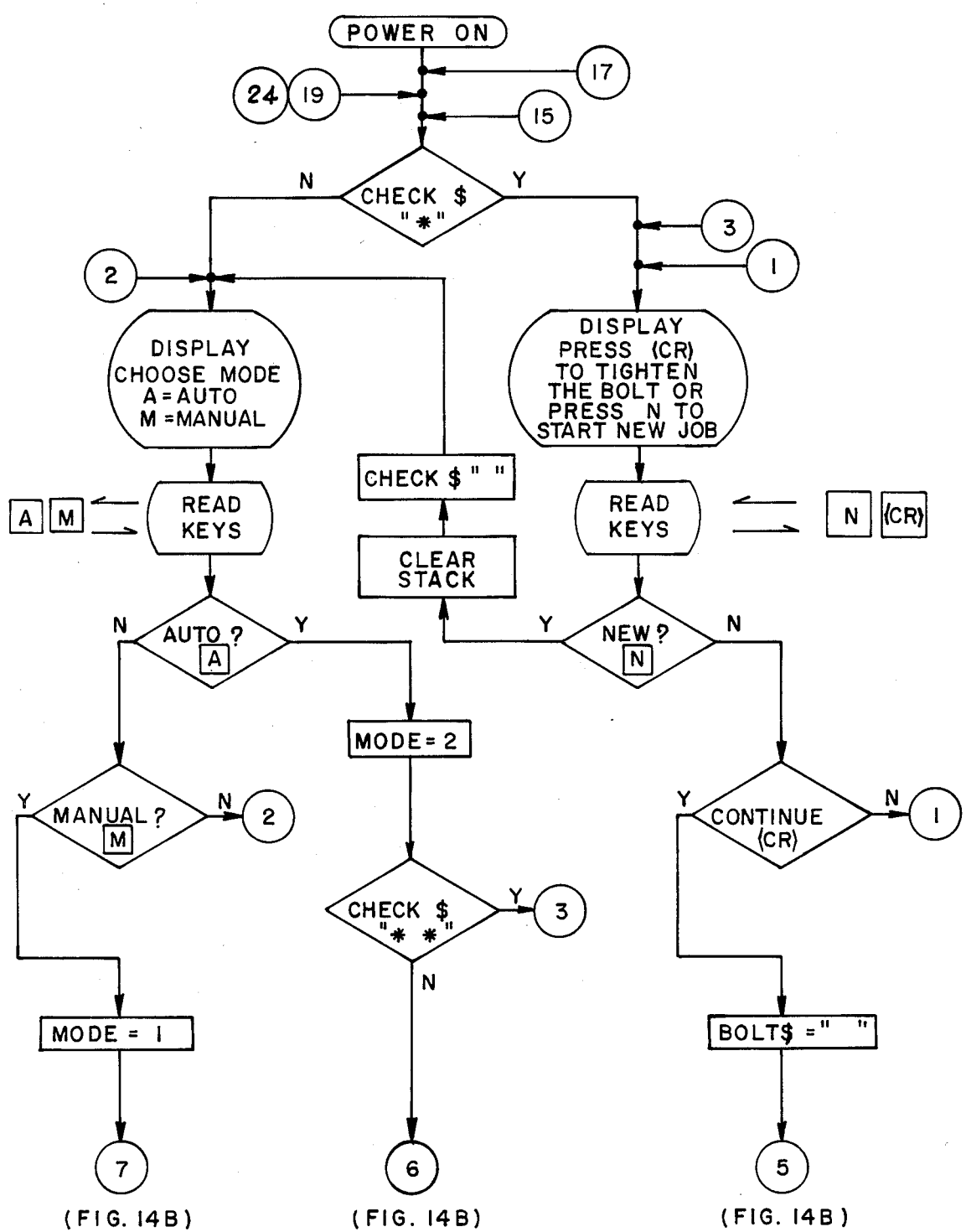

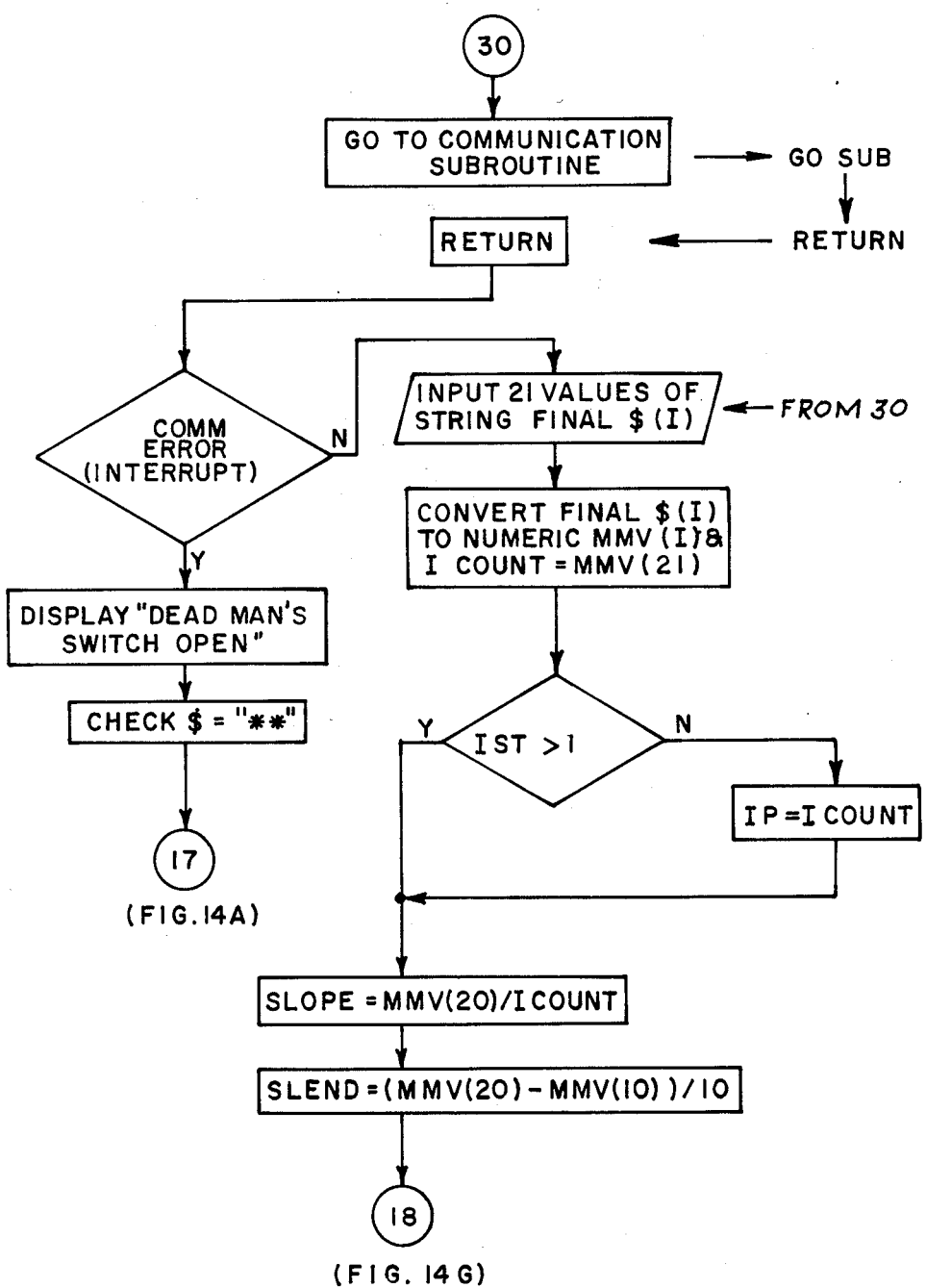

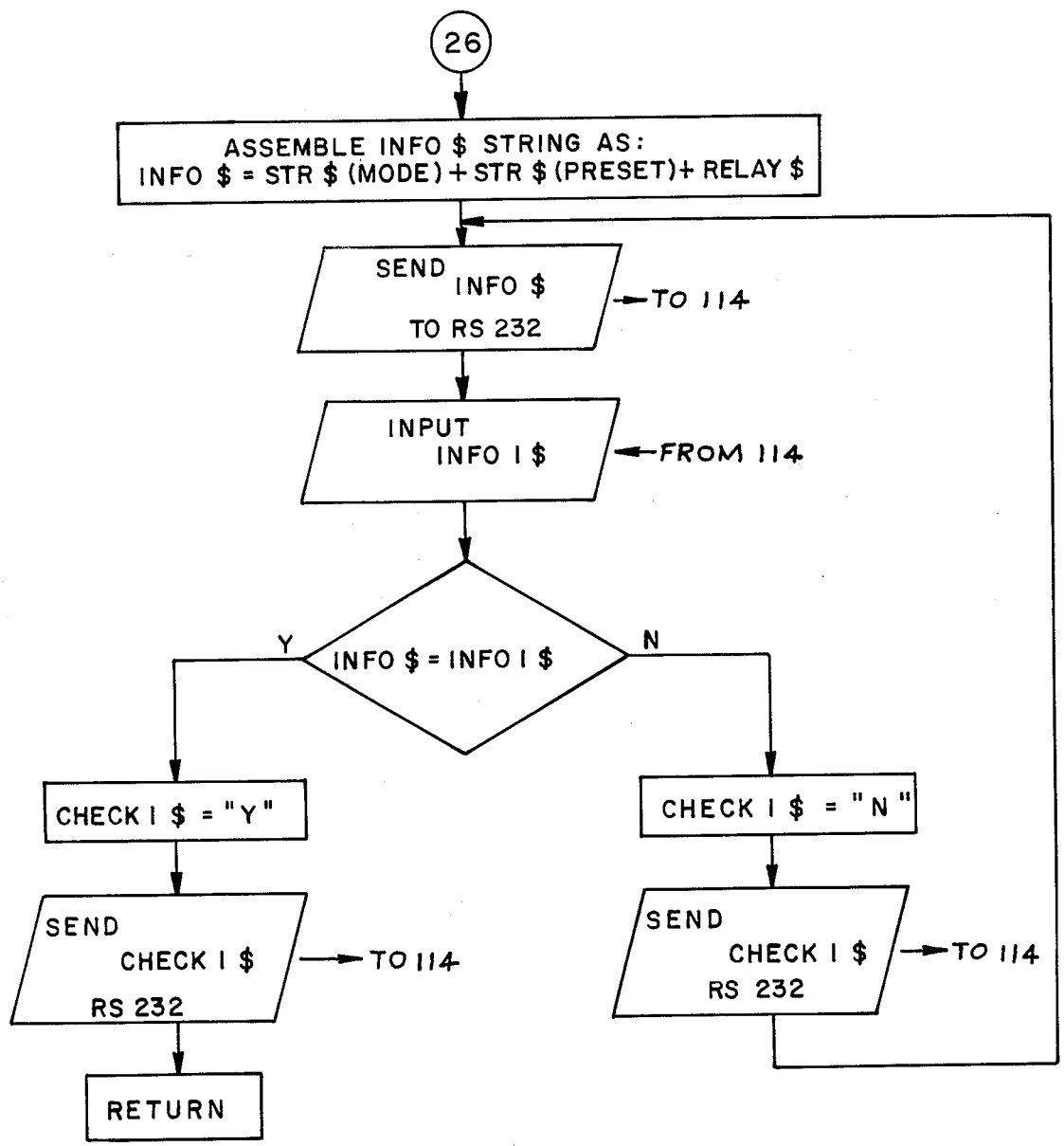

APPARATUS AND METHOD FOR DETERMINING TORQUE, PRESENTING DIGITAL TORQUE READOUT AND AUTOMATIC CYCLING AND TERMINATION OF WRENCH OPERATION IN A TORQUE WRENCH SYSTEM

FIELD OF THE INVENTION

This invention relates to the field of fluid powered torque wrenches. More particularly, this invention relates to the field of torque measurement of fluid powered torque wrenches, automatic cycling of fluid powered torque wrenches and automatic termination of the tightening operation when a predetermined torque is delivered to a fastening element.

DISCUSSION OF THE PRIOR ART

Fluid powered torque wrenches are well known in the art. By way of example, one type of a ratcheting, hydraulically powered torque wrench is disclosed in U.S. Pat. No. 3,745,858. An improved version of that torque wrench is disclosed in application Ser. No. 745,404, filed June 14, 1985 now U.S. Pat. No. 4,674,368. Both U.S. Pat. No. 3,745,858 and application Ser. No. 745,404 are owned by the assignee hereof and are incorporated herein by reference.

In operating hydraulic torque wrench systems, it is important to know the output, i.e., the torque, generated by the wrench. Prior art torque measurement systems have been susceptible to significant errors which impair the accuracy of such systems. As a result, there has been a long recognized need in the art to improve the torque measurement of such systems.

In general, prior art systems attempt to measure torque by measuring the pressure level (i.e., p.s.i.) of the pump which generates the pressurized operating fluid for the wrench. The p.s.i. output level of the pump is displayed and read on a gage to supposedly reflect the torque output of the wrench.

The above discussed prior art torque measurement systems are deficient and inaccurate in several respects. In a typical prior art system, the maximum torque produced by the tool is determined by manual adjustment of a pressure regulator in the hydraulic line which feeds the drive end of the hydraulic cylinder which powers the tool. The operator usually refers to a table or graph furnished by the manufacturer to determine the approximate cylinder pressure for a given output torque. The operator then repeatedly operates control switches in a pendant to advance and then to retract the drive cylinder of the wrench to tighten the bolt. A ratchet in the wrench converts this reciprocating cylinder motion into continuous clockwise or counterclockwise motion of the nut. The operator keeps operating the switches until the wrench stalls at the preselected pressure. Both the pressure selection and operation of the wrench takes operator skill and time.

Meanwhile a second mechanic must hold the reaction end of the wrench against a reaction surface on the workpiece. If he does not do this the wrench will not ratchet properly (because of backlash between drive bar and socket, socket and nut, etc.).

The torque produced by prior present hydraulic wrenches is determined by reading p.s.i. measurements on a hydraulic pressure gage on the pumping system which powers the wrench. One of the more significant problems with these prior art systems is that they sense and display pressure (p.s.i.) levels, whereas torque (ft. lbs.) is the true parameter of interest, because bolt tightening specifications are expressed in torque. Since a pump may be used with a variety of wrenches (developing different amounts of torque for the same supply pressure), means must be provided to account for the different wrenches. Some systems merely provide a gage calibrated in pump pressure, plus supplemental conversion charts to convert pressure to torque for various wrenches. Other prior art systems attempt to present a torque readout or sorts by the use of a pressure gage marked in several torque ranges rather than in psi values. However, a different torque range or scale must be used for each wrench size, making the system susceptible to error and misinterpretation. All of this can be very confusing to and can be misread or misinterpreted by the operator, and can lead to incorrect torques on the bolts being tightened.

In prior art systems, the wrench must be manually cycled a number of times by the operator to reach a desired torque level; and the operator must manually reset a relief valve to change the desired torque level to be delivered to a fastener by the wrench. Both of these requirements depend on the accuracy and reliability of the operator and present opportunities for error. Manual cycling is time consuming, since the operator must decide to initiate each wrench cycle and do so. The present invention reduces to time required to tighten a fastener by the feature of automatic cycling of the wrench. Also, when the wrench cycle terminates on each stroke, the operator does not know whether the bolt is fully tightened to its desired torque level or the wrench has simply bottomed out. This can lead to serious error if the operator mistakes bottoming out in a cycle for full tightening. That potential for serious error is eliminated by the present invention where the wrench is automatically recycled until the desired torque level is reached.

SUMMARY OF THE INVENTION

The above discussed and other problems and deficiencies of the prior art are eliminated or significantly reduced by the present invention. In accordance with the present invention, the parameter of interest, i.e., torque, is determined and displayed in a digital readout. By determining torque and presenting a digital readout of the measured torque, the present invention alleviates or eliminates the problems which made the prior art systems error prone and inaccurate. Also, a desired torque level is selected and the wrench is automatically cycled to achieve the predetermined torque level, and then operation is terminated.

In accordance with the present invention, torque is determined by a system which includes a transducer which converts the operating pressure of a hydraulic wrench to an analog electrical signal. That analog signal is then digitized, delivered as an input to a microprocessor or computer. The output of a temperature transducer is also digitized and delivered to the microprocessor to compensate for temperature of the pressure transducer. Another input informs the microprocessor or computer of the particular wrench being used in the system. The microprocessor or computer then operates on the input to produce an output signal commensurate with torque. That torque output signal is then delivered to and displayed on a numeric (or alpha/numeric) display as a direct readout of torque. The output from the microprocessor can be programmed to produce a torque output in any desired system of units (e.g. pound-feet or Newton-meters).

The system of the present invention has a principal feature and advantage of presenting torque as a direct readout in a digital display. This does away with the need for the use of conversion charts or tables to convert psi to torque and eliminates a serious source of error in prior art systems. Also when the operator is adjusting the manually operated pressure relief valve to preset the cutoff torque of the wrench, the operator is guided by a real time direct digital display of the torque which each setting of the relief valve would produce, rather than being guided by readings on a pressure gage. As a result, the operator can adjust cutoff pressure to the nearest desired lb-ft (or equivalent), whereas with prior art systems the operator can only set the valve to the nearest cardinal point on the gage, which may be 25 to 50 lb-ft apart. The system of the present invention also has the dual capability to display pump pressure on the digital readout if that parameter is of interest. The system also is capable of direct digital readout of torque for a range of wrench sizes used with the system, thus eliminating the need for gages with overlaps or multiple displays for different wrenches.

The system of the present invention also has a principal feature and advantage of automatic cycling of the wrench until a preselected torque level is reached, whereupon the supply of pressurized operating fluid to the wrench is discontinued to terminate operation of the wrench. This automatic cycling and termination feature has the significant advantages of faster operation of the wrench, elimination or reduction of operator error, more reliable and accurate operation of the wrench to impose the desired torque on the fastening element, and the ability to obtain a documented history of the tightening of the fastener.

The above discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

FIG. 5 is a block diagram showing the microprocessor and associated components.

FIG. 5A is a schematic diagram of a power supply unit used in the present invention.

FIG. 7 is a version of the block diagram of FIG. 1 modified for the automatic cycling and termination of the present invention;

FIG. 8 is a version of the functional diagram of FIG. 2 modified for the automatic cycling and termination of the present invention;

FIGS. 9C and 9D are flow charts for the automatic cycling and termination feature of the present invention;

FIG. 10 is a version of the block diagram of FIG. 5 modified for the automatic cycling and termination of the present invention;

FIGS. 11—13 are graphs of pressure vs time showing automatic cycling and termination;

FIGS. 14A-14(K) are flow charts of the microprocessor or computer program for the control computer for automatic cycling and termination.

DESCRIPTION OF THE INVENTION

Figure 1:
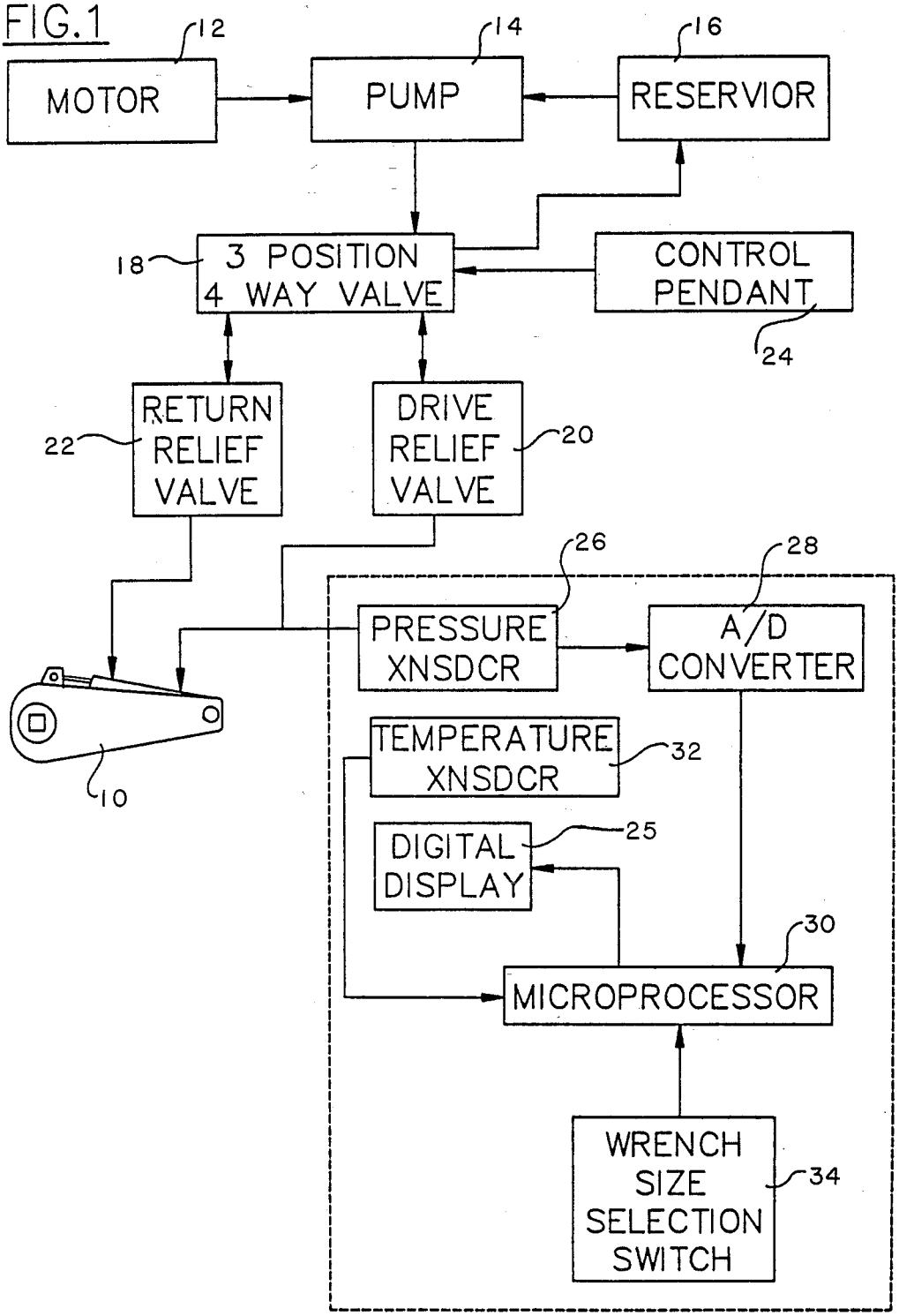
FIG. 1 is a block diagram of the torque measurement and digital torque readout system of the present invention.

Referring first to FIG. 1, a block diagram is shown of the overall system of the present invention. The system includes a conventional hydraulically powered torque wrench 10 (such as identified above) which is powered by a motor 12 and pump 14 supplied from a fluid reservoir 16. Pump 14 delivers pressurized hydraulic fluid to wrench 10 via a manually adjustable pressure relief valve 20, a 3 position 4 way valve 18 and drive and relief valve 22. A control pendant 24 (which may be suspended on a cable and be hand or foot operated, or may be mounted on the wrench or on some other part of the system) controls the position of valve 18 to operate wrench 10 in either a drive stroke or a return stroke. Manually adjustable pressure regulator 20 is set (and can be adjusted as may be required) to establish a maximum pressure level. Return relief valve 22 is typically set to operate at some relatively low pressure (e.g., 400 p.s.i.) to prevent overpressurization of the return side of the drive cylinder of the wrench. Wrench 10 includes a ratchet mechanism so that the wrench can be repeatedly cycled to tighten a fastener such as a nut or bolt. The elements 10–24 described above are all found in a prior art wrench operating system.

Still referring to FIG. 1, the system of the present invention also includes apparatus for determining and for the digital display of the real time torque level of the wrench. That apparatus includes a pressure transducer 26 which senses the pressure level on the drive side of the wrench and generates a voltage output signal. That voltage signal from transducer 26 is delivered to an analog to digital converter 28 (which includes a multiplexer 40, a comparator 42 and a D/A converter 45 (see FIGS. 2 and 4)) which, in turn, is connected to a microprocessor 30. A temperature sensor 32 (an AD 590 transducer) senses the temperature at which the pressure transducer is operating and delivers a temperature input signal to microprocessor 30 which compensates for temperature deviation from a standard 75° F. "room temperature". A wrench size selection switch unit 34 delivers an input signal to microprocessor 30 based on the size of the wrench being used in the system. Microprocessor 30 is programmed to process the various input signals and generate a digital output of the real time torque level of the wrench as it operates which is displayed on a liquid crystal (LCD) display 25.

Figure 2:
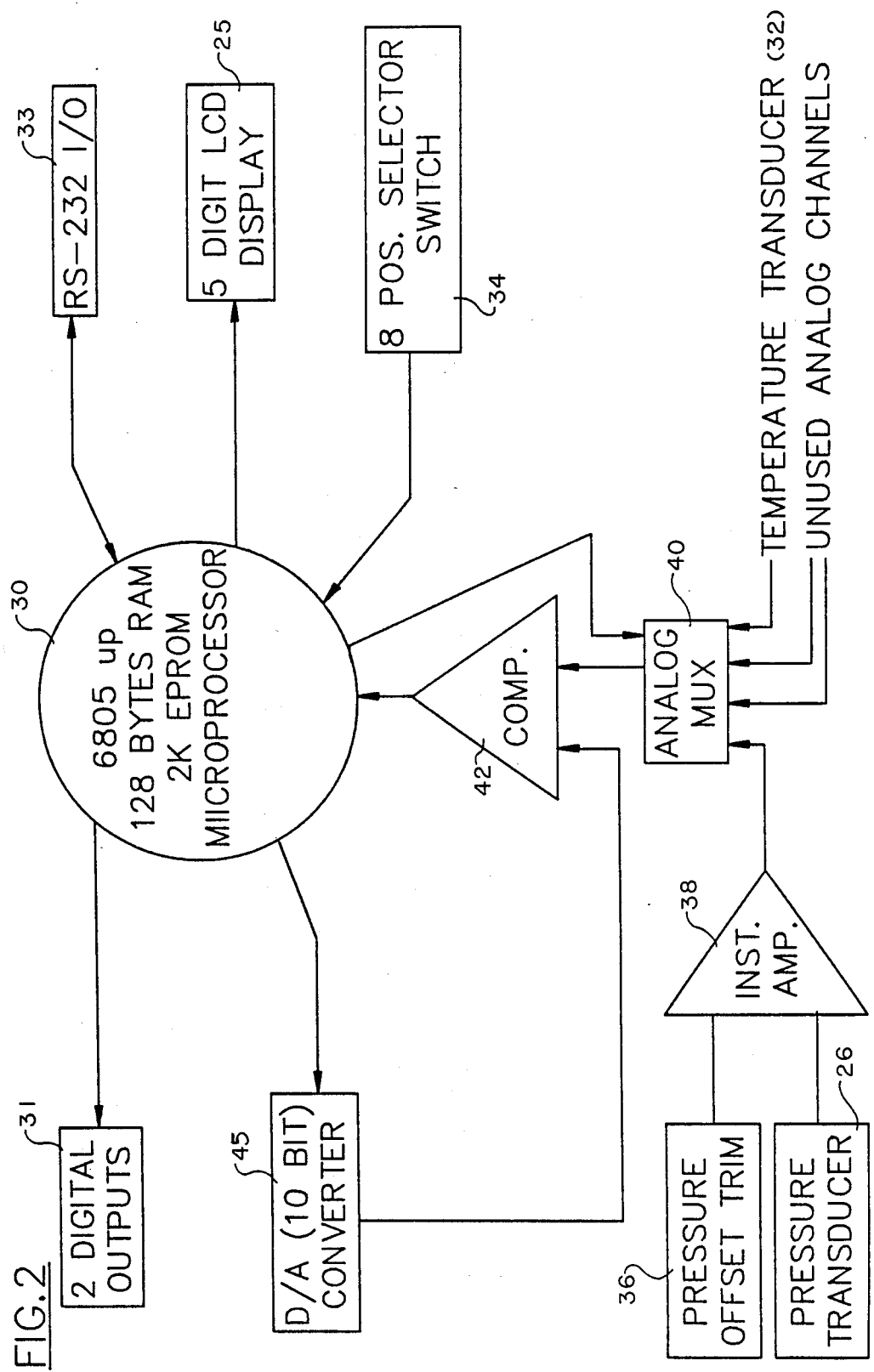
FIG. 2 is a functional diagram of the digital torque readout system of the present invention.

Referring now to FIG. 2, a functional diagram of the torque measuring and display system is shown. Pressure transducer 26 is a half bridge strain gage transducer such as an Model MFP 0–10,000 transducer available from DJ Instruments. The output signal from transducer 26 is balanced against a pressure offset trim bridge 36, and the signals from transducer 26 and trim bridge 36 are delivered to an instrumentation amplifier 88. The output from instrumentation amplifier 38 is delivered to an analog multiplexer 40 which also receives an input signal from temperature transducer 32. Based on a control signal from microprocessor 30, multiplexer 40 delivers either the pressure signal or the temperature signal to a comparator 42. Microprocessor 30 delivers digital signals to digital to analog converter 44 which, in turn, delivers analog voltage to comparator 42. Comparator 42 compares the input from multiplexer 40 (either pressure or temperature signals) with the input from D/A converter 44. When the input to comparator 42 from multiplexer 40 exceeds the output from D/A converter 44, the output state of comparator 42 delivers a low logic signal to microprocessor 30. When the input to comparator 42 from multiplexer 40 is lower than the output from D/A converter 44, the output state of comparator 42 delivers a high logic signal to microprocessor 30. The microprocessor 30 determines the pressure or temperature level by matching the D/A converter output to the pressure or temperature sensor.

Wrench size selector switch unit 34 also delivers an input signal to microprocessor 30 to inform the microprocessor of the size of the wrench being operated. The signal from selector switch unit 34 determines a ratio or multiplication factor and offset factor which is stored in permanent memory and which is used by microprocessor 30 to convert the pressure information (as temperature compensated) to a torque value. Microprocessor 30 then generates a torque signal which is delivered to and displayed on LCD display unit 25.

Microprocessor 30 also has the capacity to drive other digital outputs 31 and communicate with an external computer 33.

Figure 4:
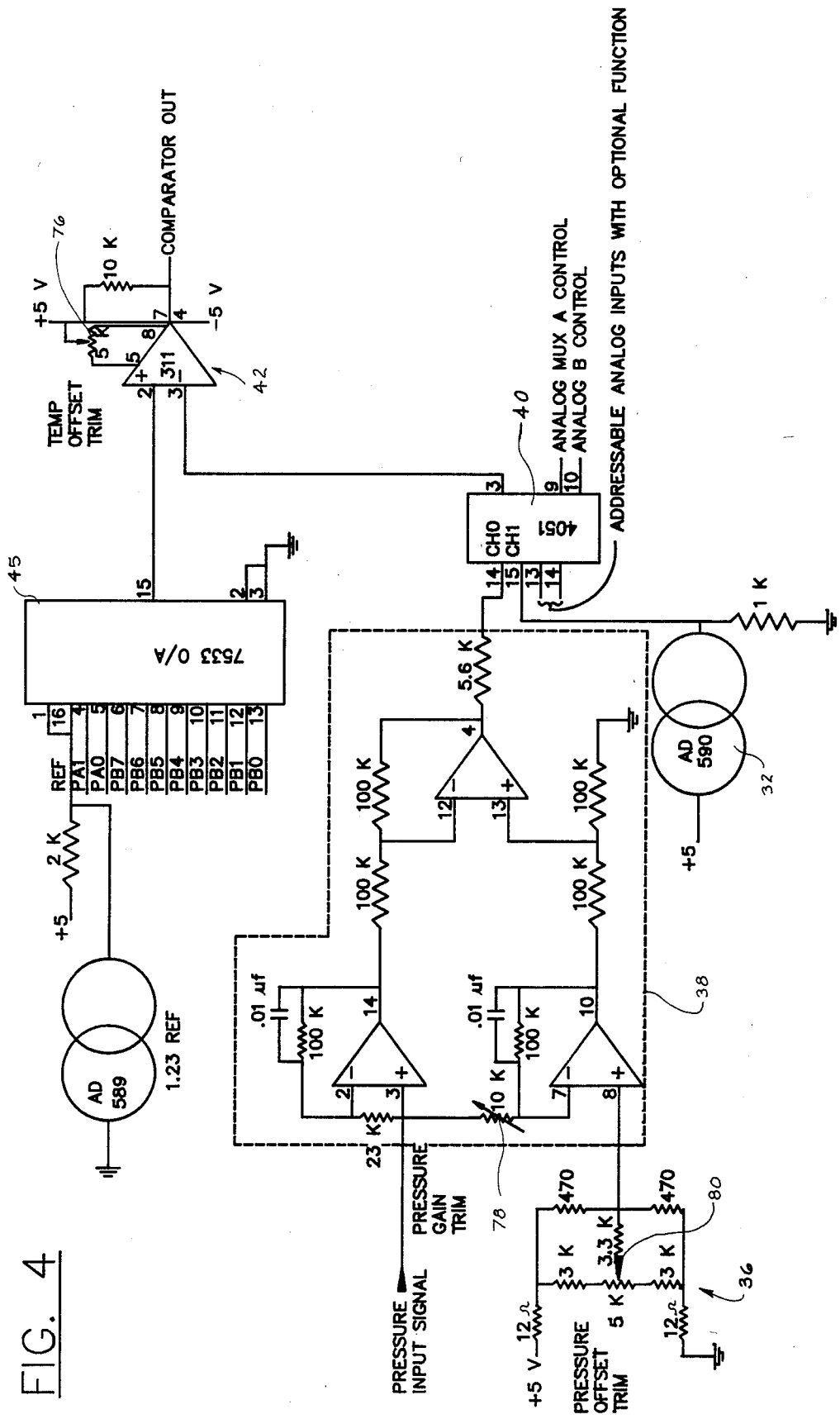
FIG. 4 is a schematic showing signal conditioner and analog to digital logic circuitry for use in the system of the present invention.
Figure 6:
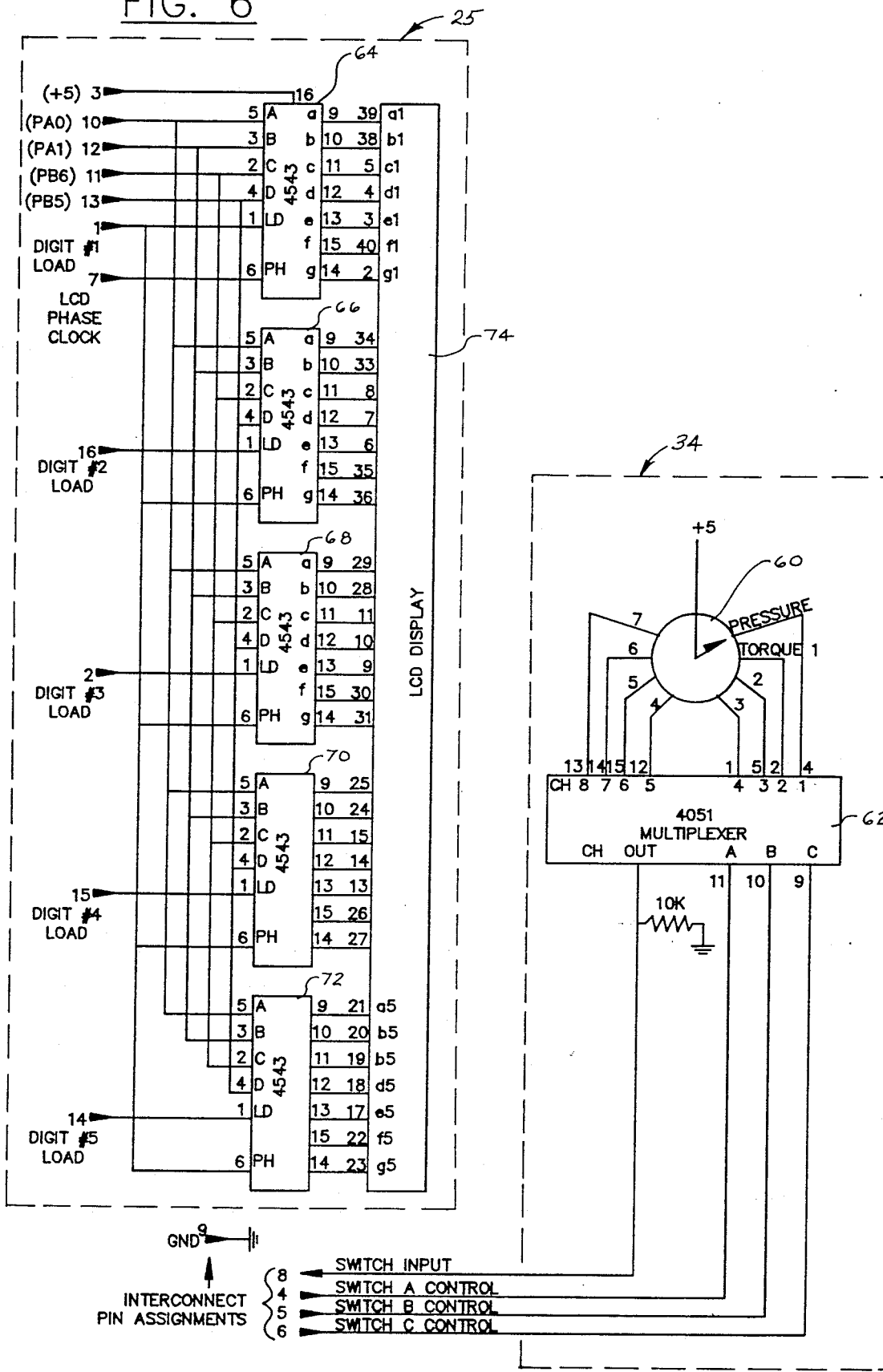
FIG. 6 is a block diagram of the selector switch and LCD display board used in the present invention.

Referring now to a combined consideration of FIGS. 4, 5 and 6, microprocessor 30 is a 6805 CMOS microprocessor that provides for control of LCD display unit 25, and measurement of temperature and pressure. Microprocessor 30 contains 128 bytes of random access memory (RAM) and is interfaced with a 2K 2716 erasable programmable read only memory (EPROM) 48. Measurement and control functions are provided by 16 input/output (I/O) lines that are an integral part of microprocessor 30. The microprocessor system also includes an output latch 50 with tri-stat outputs between EPROM 48 and microprocessor 30. Twelve outputs from microprocessor 30 are provided for control using two 6 bit 4174 flip-flop latches 52, 54. Ten of those outputs also interface with 10 bit digital to analog converter 44 (ICL 7533), (see FIG. 4). The system regulates its own power to +5 volts consuming a maximum of 50 ma of current at this voltage. The microprocessor is driven by a 3.79 MH oscillator 56.

Referring particularly to FIG. 4, the pressure signal from gage pressure transducer 26 is delivered to instrumentation amplifier 38. The output from transducer 26 (which is a half bridge transducer) varies from approximately 2.4 to 2.5 mv over a pressure range of from 0 to 10,000 p.s.i. That output is balanced against a pressure offset trim resistance bridge 36, and the difference is taken by amplifier 38. The output from amplifier 38 (which is an analog voltage signal commensurate with wrench operating pressure) is delivered to a 4501 analog multiplexer 40. Multiplexer 40 also receives analog voltage inputs commensurate with pressure transducer temperature from temperature transducer 32. Multiplexer 40 is connected to and receives control signals from microprocessor 30 (on the lines marked Mux A Control and Mux B control). As determined by the software program, microprocessor 30 will signal multiplexer 40 to pass either the pressure input voltage signal or the temperature input voltage signal to comparator 42 (LM311).

The analog voltage signal (pressure or temperature) from multiplexer 40 is determined by comparator 42, the 10 bit digital to analog converter 44, and the microprocessor 30. The conversion is controlled by a software algorithm that applies a binary search of digital voltage values to D/A converter 44 for delivery to comparator 42. When the input from D/A converter 44 to comparator 42 is within 1 bit of the input (i.e., pressure or temperature signal) from multiplexer 40 to comparator 42, the digital value of the pressure or temperature is equivalent to that digital value applied to the D/A converter 44. This informs the microprocessor of the pressure or temperature level by equating it to the voltage level in converter 44 set by the microprocessor.

Upon determining the digital voltage, the system software causes the microprocessor 30 to repeat the comparison process 32 times to obtain an average voltage level of the pressure or temperature signal over 5 milliseconds of time. Then, as an additional filtering step, the software causes 16 repeats of the 5 ms (32 readings) step for both temperature and pressure readings prior to the steps of temperature compensation and conversion of pressure readings to torque measurement (both of which are accomplished in the microprocessor under control of the algorithms of the software program).

A multiple position selection switch 60 (see FIG. 6) of switch unit 34 interfaces with microprocessor 30 to compute and display torque for wrenches of different sizes. In the present system, switch 60 is an 8 position switch to be used to display torque readings for 7 different size wrenches (switch torque positions 2-8); and one switch position is used for display of pressure when it is desired to know that parameter. Switch 60 is connected to a 4051 analog switch multiplexer 62. Switch multiplexer 62 receives three TTL digital signals from microprocessor 30 (Switch A Control, Switch B Control, Switch C Control) at inputs marked A, B and C, respectively. All of the positions of switch 60 are connected to one of eight input channels of multiplexer 62, the output of which, in turn, is connected to the "Switch Input" pin on microprocessor 30. Each individual switch position (positions 1-8) of switch 60 is connected to the channel "OUT" by a different binary code on the pins A, B, C of multiplexer 62 from the microprocessor, thus providing eight switch position indicators. Microprocessor 30 interrogates switch multiplexer 62 at the rate of 25 times per second to determine the position at which rotary switch 60 is set. Under the control of the software program, calibration or conversion coefficients are applied to the pressure signals to convert them to torque values, which are then displayed on the LCD display system.

As shown in FIG. 5, latch 52 interfaces microprocessor 30 with multiplexer 40 via the lines marked Analog Mux A Control and Analog Mux B Control; and latch 52 also interfaces the microprocessor with switch multiplexer 62 via the lines marked Switch Mux A Control, Switch Mux B Control and Switch Mux C Control. Similarly, latch 54 interfaces microprocessor 30 with the 5 display drivers 64-72 of digital display unit 25 via the Display Digit Load Lines 1-5.

Referring to FIG. 5A, the power supply to the system is shown. Voltage regulator 84 provides voltage regulation to +5V. Voltage regulator 86 provides precision voltage regulation to −5 volts for comparator 42.

Referring to FIG. 6, microprocessor 30 is connected through 5 4543 display drivers 64-72 to an LCD display 74 of display unit 25. The drivers 64-72 convert BCD outputs from microprocessor 30 to the 7 segments comprising each digit to be displayed. A clock generated by timed interrupts within the microprocessor system (from pin 10 on latch 54) is used to generate an AC clock to the LCD display to prevent burn-in of digits on the LCD. All other tasks in the system are also scheduled by interrupts generated by this 25 Hz clock. The output to LCD 74 is updated every 16 interrupts (about 0.6 seconds) under control of the program software.

It should be noted that the system of the present invention also simplifies and makes more accurate the preset operation whereby pressure relief valve is adjusted to set the maximum operating pressure of the system. In the present system, the operator sees the pressure level digitally displayed in real time as he sets valve 20. Furthermore, the operator can accurately set valve 20 to a desired level rather than being limited to the cardinal points on a gage.

The digital torque readout (DTR) system of the present invention should be calibrated for pressure and temperature before initial operation or if there is reason to believe the temperature or pressure transducer has drifted.

Calibration is effected by selection of a special operating mode (under control of the microprocessor and the system software) through selector switch 60. Microprocessor 30 is powered, whereupon display 74 will show an array of 5 digits of 8. Selector switch 60 is then cycled from position 1 to position 2 and back to position 1. Selector position 1 will then display pressure and position 6 (torque position 5) will display the temperature correction factor multiplied by 256.

Temperature calibration is effected first with switch 60 in position 6, at which the temperature will be displayed on LCD 74, with 256 being equivalent to 75° F. room temperature. Temperature calibration is then carried out by adjusting a potentiometer 76 in the circuit of comparator 42 until the temperature reading is 256 (75° F., i.e., standard "room temperature"). Thereafter, during normal operation of the system, temperature transducer 32 compensates for operating temperatures different from 75° F.

After temperature calibration is done, the system is calibrated for pressure. To effect pressure calibration, the linear behavior of pressure transducer 26 must be matched to a calibrated pressure gage.

The offset and gain of each individual transducer is adjusted by potentiometers 80 and 78, respectively, until the linear behavior of the transducer is within 2% of the actual pressure.

The DTR system of the present invention is controlled by microprocessor 30 and the software program in EPROM 48. Much of the program and its operation have been described in the course of the foregoing description. The entire program stored in EPROM 48 is set forth in Table 1 below (attached hereto as an appendix). The program of Table 1 has five columns. Column (1) is a 4 digit hexadecimal address column; column (2) is a column showing the 4 digit hexadecimal machine code representation of columns (3) and (4); column (3) shows the operand or op code; column (4) shows the argument; column (5) lists remarks briefly explaining the nature of the operation being carried out. Those skilled in the art will find the program listed in Table I to be a complete and precise description of each step carried out in the program of the present invention. Accordingly, for purposes of clarity and brevity, only the major operations carried out by the program will be described in general terms (in addition to the program description already given in the foregoing discussion of hardware and operation).

Figure 3B:
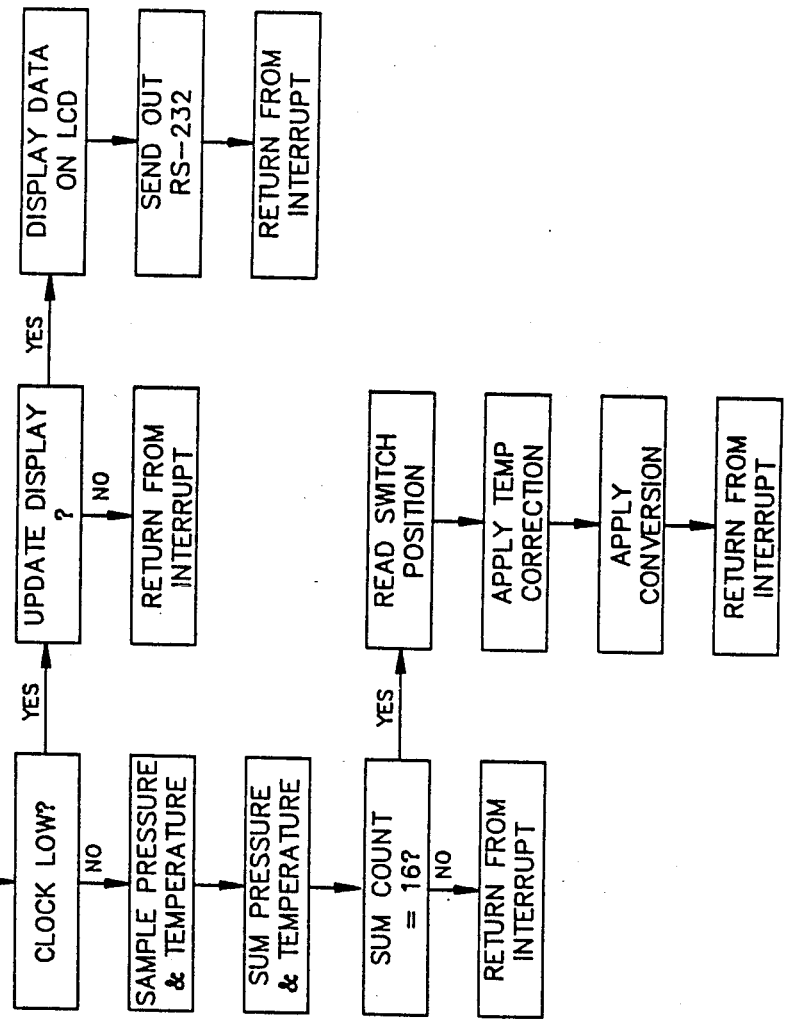
FIGS. 3A and 3B show a flow chart of the microprocessor or computer program for the digital torque readout system of the present invention.
Figure 3A:
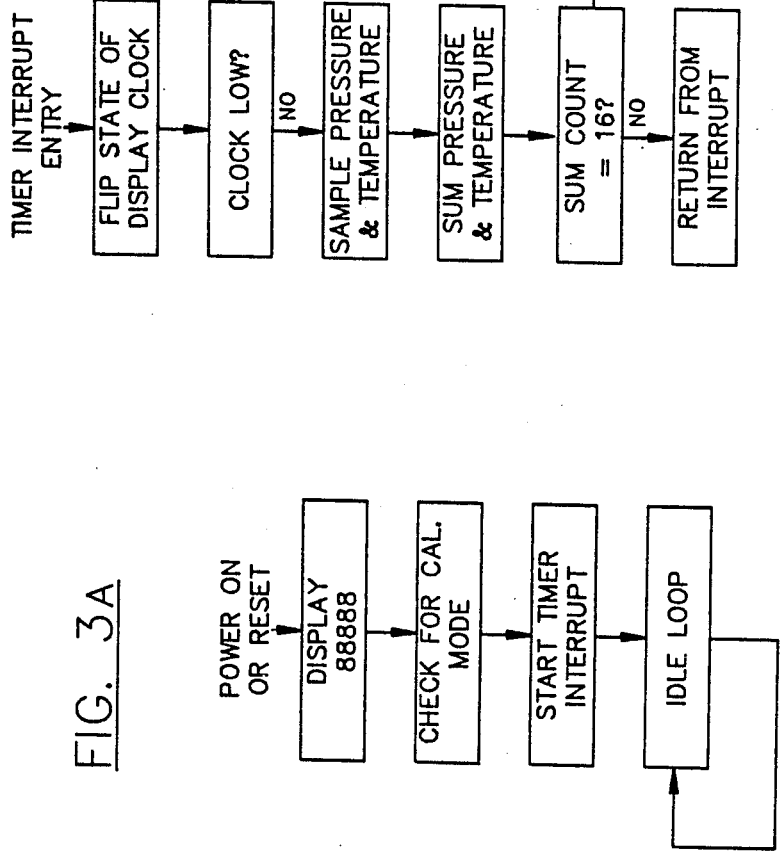

Referring to FIGS. 3A and 3B, a flow chart of the principal features of the program are shown. FIG. 3A shows the program for processor initialization and calibration. FIG. 3B shows the main operating program.

Referring first to FIG. 3A, on powering up the system, a display of five 8 digits appears on display 74. Then, the program checks to see if the calibration mode has been initiated. The 25 Hz timer interrupt clock is started and goes to an idle loop if the calibration mode has been initiated.

If the calibration mode has not been initiated, a timer interrupt signal is delivered to flip the state of the display clock. If the clock is high, the program directs the microprocessor to determine the pressure and temperature readings (this is done 32 times); and an attempt is made to repeat for 16 times the 32 readings of pressure and temperature. The 16 repeats are synchronized to the timer interrupt signal. After the 16th reading, the microprocessor reads the position of selector switch 60, then temperature correction is applied to the pressure reading, and the pressure is converted to torque per the conversion algorithm in the program.

If the clock is low and after the 16th reading, a signal is delivered to update the LCD display. After the 16th reading, a signal is delivered to update the display before receipt of a timer interrupt signal, inputs are delivered to update the display on the display 74. If an external computer is connected to the system, signals may also be delivered to it when the display is updated. As described previously, the main part of the program is interrupt driven by the 25 Hz clock in the system.

Those skilled in the art will understand that the present invention presents a unique method and apparatus for determining actual torque being applied to a fastening element by a powered wrench. The torque is determined in real time and presented as a digital display. This invention overcomes problems of long standing and meets a long felt need in the art. Furthermore, this invention simplifies operation of power wrenches, improves their accuracy and reliability, and eliminates serious sources of error in the prior art.

By providing for direct digital readout of torque, the present invention overcomes the several previously discussed problems of the prior art associated with the use of pressure gage readouts.

The embodiment of FIGS. 7-14K presents a system for automatic cycling of wrench operation and termination of wrench operation when a predetermined torque has been imposed on a fastener element.

From a system standpoint the automatic cycling and shut off embodiment involves the addition of several components to the block diagram of FIG. 1. The modified system is shown in FIG. 7 and includes an advance relay 110 and a retract relay 112 in lines between microprocessor 30 and three position four-way valve 18. A signal from microprocessor 30 to close advance relay 110 will result in valve 18 being positioned to deliver hydraulic fluid to drive or advance wrench 10, and a signal from the microprocessor to open relay 110 will result in valve 18 being positioned in its null or recirculating position where the fluid from pump 14 is returned to reservoir 16. Similarly, a signal from the microprocessor to close retract valve 112 will result in valve 18 being positioned to deliver hydraulic fluid to retract wrench 10, and a signal from the microprocessor to open relay 112 will put valve 18 in its null or recirculating position. The modified system also includes a control computer 114 which communicates with microprocessor 30, a keyboard 116 for inputting data to control computer 114 and a display 118 associated with control computer 114. A printer 120 may be included to provide a permanent record of the history of tightening of the fastener. As shown in FIG. 8, the functional diagram of FIG. 2 is also modified by connecting the two digital outputs from 31 to advance relay 110 and retract relay 112. Also, with reference to FIG. 10 (which is the modified block diagram of FIG. 5), advance relay 112 is connected to pin 8 of microprocessor 30, retract relay 110 is connected to pin 7 of latch 52, and control computer 114 is connected to RS-232 out (33(O)) for delivery of signals from microprocessor 30 to control computer 114 and to RS-232 input (33 (I)) for delivery of signals from control computer 114 to microprocessor 30.

Computer 114 may, e.g. be a programmable Epson Model HX 20 computer, or it may be a programmable hand held unit which may also incorporate the control pendant 24 into a single housing.

Referring to FIGS. 7 and 8, the desired torque level to be delivered to a fastener is inputted to computer 114 via keyboard 116 by an operator. The operator selects a torque level which control computer 114 converts to a pressure level (for the selected wrench), and which in turn is converted to an advance cycle interrupt voltage level which is communicated to microprocessor 30. Control computer 114 communicates with microprocessor 30 to operate advance and retract relays 110 and 112 to cycle valve 18 and, hence, cycle wrench 10. In the operation of the system of FIG. 7, drive relief valve 20 is set to its maximum level, so valve 20 is effectively out of the system and maximum operating hydraulic pressure is controlled by pressure transducer 26, microprocessor 30, computer 114 and relays 110 and 112. Of course, it will be understood that microprocessor 30 could be incorporated into control computer 14.

In the system of FIGS. 7-14K, the setting of a torque level in computer 114 will, through the system software and microprocessor 30, deliver a signal to close advance relay 110 to position valve 18 to deliver pressurized fluid to advance wrench 10 (which is mounted on an element to be fastened) to tighten a fastener. As wrench 10 advances in its operating stroke, pressure transducer 26 senses the increasing pressure in wrench 22 as the fastener is tightened. When the wrench bottoms out at the end of any stroke (prior to the final stroke), there is a large and rapid increase in pressure which is sense by transducer 26 and delivered (via comparator 42) as a digital signal to microprocessor 30. Instead of displaying the pressure level (as determined by comparator 42) as in the previous embodiment, microprocessor 30 is programmed to compare the sensed pressure level (a voltage level) with the advance cycle interrupt voltage level signal from control computer 114. When the sensed pressure level exceeds the maximum selected pressure (for the desired torque) microprocessor 30 then opens advance relay 110 to place valve 18 in the null position. As described hereinafter, the increase in pressure is, through the system software, recognized as the end of a stroke by computer 114. When that happens, computer 114 makes a decision to recycle, which causes microprocessor 30 to signal retract relay 112 to close and thus position valve 18 to deliver pressurized fluid to retract wrench 10. After a predetermined time lapse, signals from microprocessor 30 then open retract relay 112 and close advance relay 110 to position valve 18 to again deliver pressurized fluid to wrench 10 to again advance the wrench to tighten the fastener. This cycling is repeated until computer 114, through the system of software, determines that the fastener has been tightened to the desired torque. Then, computer 114 will terminate operation of the system; and display 118 will show that the desired torque level has been reached; and a permanent record of the history of tightening of the fastener is obtained from the printer 120.

It will be understood that the system may be operated in the measurement and display mode of FIGS. 1-6 or in the automatic cycling and cut-off mode of FIGS. 7-14K. In the former mode, computer 114, keyboard 116, display 118, printer 120 and relays 110 and 112 will be inoperative and wrench selection switch 34 and display 25 will be operative. In the latter mode, wrench size selection switch 34 and display 25 are inoperative, relays 110 and 112 are operative, the display is on display 118, and wrench size selection, torque level and historical information for documentation (such as date, bolt number, operator identification, joint designation) are inputted to computer 114 via keyboard 116. The automatic cycling and cut-off system can also be operated in what may be called a semi-automatic mode where the operator manually initiates each advance and retract stroke by inputting commands to keyboard 116. This semi-automatic mode provides a way to override the fully automatic system if that is desired.

The automatic cycling and cut off system (and also the semi-automatic or manual version thereof) is controlled by microprocessor 30, its software program (in EPROM 48), control computer 114 and its software program. Much of the programs and their operation have or will be described herein in the course of describing the operation of the system. The modified program stored in EPROM 48 for the automatic (and semi-automatic) system is set forth in Table II below (attached hereto as an appendix) and is set forth in the same format as Table I. The entire program stored in control computer 114 is set forth in Table III in BASIC. Those skilled in the art will find the programs of Tables II and III and the flow charts of FIGS. 9A-9D and 14A-14K to be a complete and precise description of each step carried out in the program of the present invention. A listing of variables for the programs of FIGS. 14A-14K is found in Table IV. Accordingly, for purposes of clarity and brevity only the major operation carried out by the programs will be described in general terms.

Referring to a joint consideration of FIGS. 9A-9D (with reference also to FIG. 10), the flow chart for the program of microprocessor 30 is shown for the automatic cycling and termination mode of operation. On powering up the system (shown in FIG. 9A), the operation is as described with respect to FIG. 3A, with the additional step that signals are delivered from microprocessor 30 to open advance and retract relays 110 and 112, whereby valve 18 is in its null or recirculating position. In that position of valve 18, all fluid from pump 14 is recirculated to reservoir 16 and no fluid is delivered to wrench 10. As with the system of FIG. 3A, after checking for calibration mode, a signal is delivered to flip the state of the delay clock; and, if the clock is high the program directs microprocessor 30 to determine pressure and temperature readings (32 times repeated 16 times). If the clock is low and after the 16th reading, microprocessor 30 interrogates the input 33(I) on pin 2 (see FIG. 10) to see if there is an input (RS-232 interrupt signal) from computer 114. If there is no input 33(I), the system will operate in the display mode to display on LCD 25. If there is an input 33(I) from computer 114 (as there will be if the system is being operated in the automatic cycling mode), the program shown in FIGS. 9C and 9D, which is incorporated in the program for microprocessor 30 in EPROM 48, controls the operation of the microprocessor 30.

Referring to FIG. 9C, microprocessor 30 reads an information string sent to it from control computer 114. Microprocessor 30 then sends (echoes) that information string back to control computer 114 to verify that the information string is correct. If microprocessor 30 has received the correct information string, that is confirmed by another input from control computer 114. If the information was not correct, the cycle is repeated. If the information is correct, then microprocessor 30 examines the information string. The first character determines whether the system is being operated manually (i.e., semi-automatically) (mode 1) or automatically (mode 2); the 2nd-5th characters give the microprocessor 30 the desired cut off pressure level in millivolts; and the last character identifies which relay (110 or 112) is to be closed. Depending on the last character, the ADVANCE or RETRACT cycle will be operated.

Figure 9B:
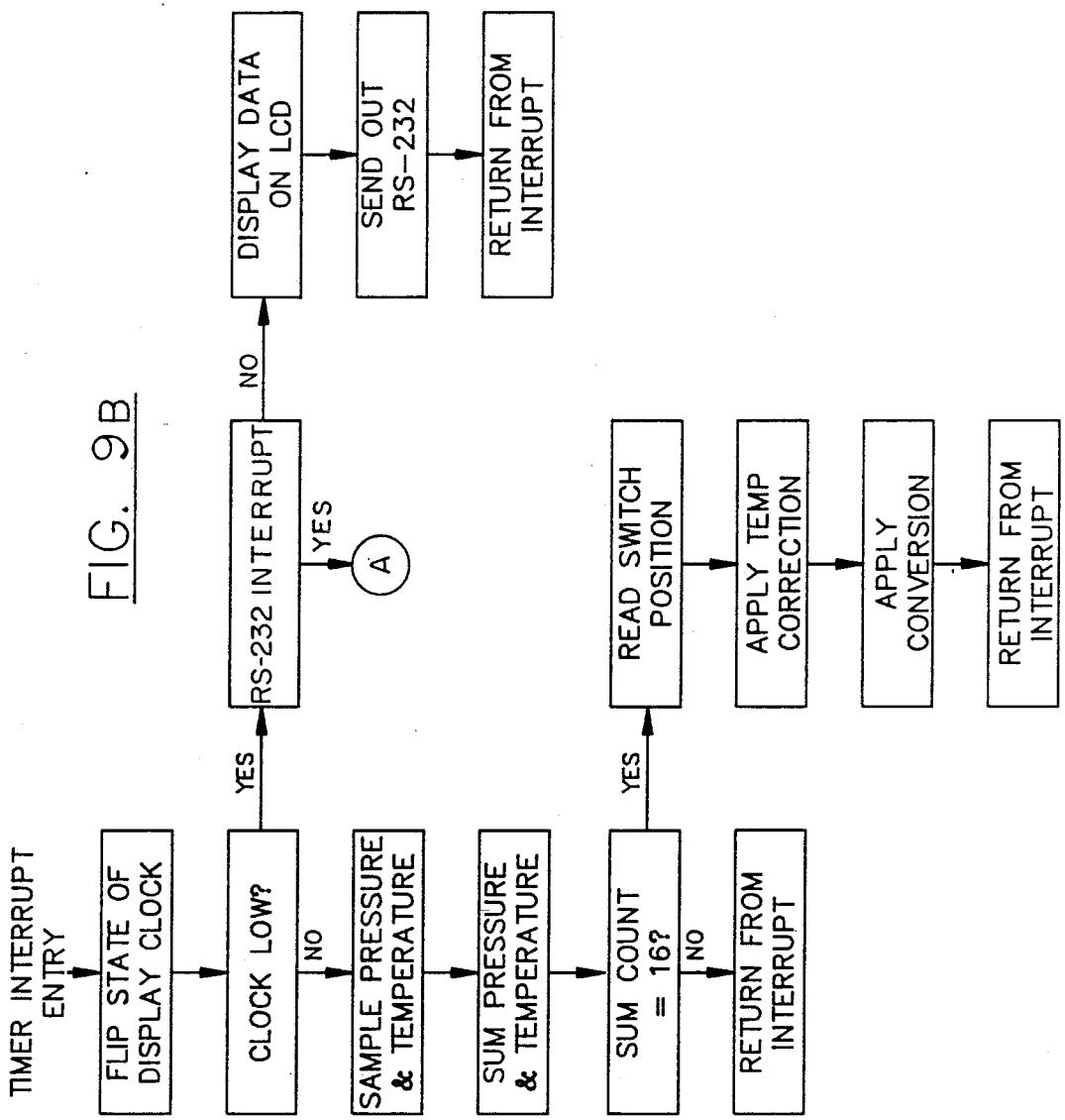
FIG. 9B is a version of the flow chart of FIG. 3B modified for the automatic cycling and termination of the present invention.
Figure 9A:
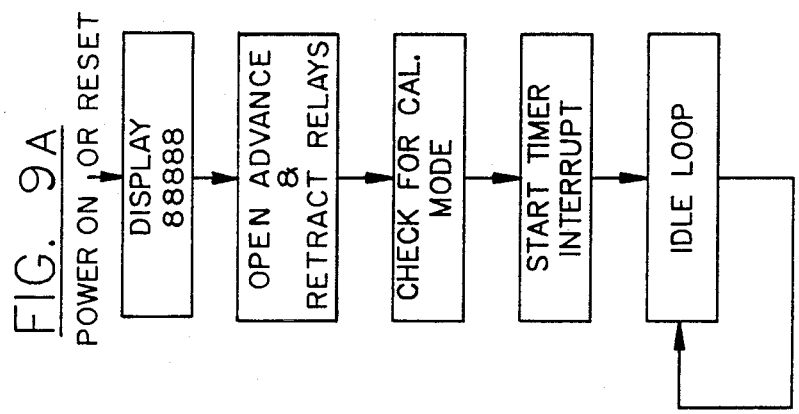
FIG. 9A is a version of the functional diagram of FIG. 3A modified for the automatic cycling and termination of the present invention.

Referring to FIG. 9D, and if the system is operating automatically, if the RETRACT cycle is operated, relay 112 is closed to position valve 18 to initiate the retract operation of the wrench. Then, microprocessor 30 looks for the next signal (any character) from computer 114, which is time delayed by computer 114. When that next signal appears, microprocessor 30 opens retract relay 112 to terminate the retract cycle. Microprocessor 30 then sends a check character to computer 114 to confirm that the retract operation is complete. The cycle then returns to Start Timer Interrupt (FIG. 9A).

Still referring to FIG. 9D (and still with the system operating on automatic), if the ADVANCE cycle is operated, a reading counter in the memory (I) which counts the number of pressure signals from transducer 32 is set to "0" and relay 110 is closed to position valve 18 to initiate the advance stroke of the wrench. Microprocessor 30 then reads the signal from pressure transducer 26 (temperature compensated in the microprocessor) by the same logic process previously described with respect to FIG. 3B for the clock high situation. Microprocessor 30 then checks to determine whether the system is being operated in the automatic or manual (semi-automatic) modes. With the system in the automatic mode, if the reading counter (I) is not greater than 0 (i.e., no pressure (mmv) readings have yet been counted) and if the pressure sensed by transducer 26 is not greater than 0, the reading counter I is not incremented. Then a rolling storage in the memory stores the last 20 readings from the transducer 26. If any signal is received from computer 114 (e.g., an emergency stop), the system shuts down. Otherwise, the cycle is repeated (at (5)). On this recycling I will have been incremented; and when the reading from pressure transducer 26 exceeds the preset value (as inputted to computer 114 through keyboard 116), advance relay 110 will be opened to change the position of valve 18 and terminate the advance stroke of wrench 10. Microprocessor 30 then looks again to see whether the system is in manual (semi-automatic) (1) or automatic (2) mode. If in the automatic mode, the last 20 readings of transducer 26 and the reading count I are sent to control computer 114 and the cycle then returns to Start Timer Interrupt (FIG. 9A) for the next cycle of operation of the system to be initiated by controller 114 (which will be a retract cycle unless the desired level of torque has been applied to the fastener element).

If the system is operated in the manual (i.e., semi-automatic) mode, the operator initiates the advance stroke though keyboard 116; the microprocessor automatically terminates the advance stroke when the pressure sensed by transducer 26 exceeds the preset pressure; display 118 tells the operator to recycle and the operator initiates the retract stroke through keyboard 116; and the retract stroke is automatically terminated after a predetermined time period; and the wrench bottomed out and the desired advance cycle is repeated.

Figure 11:
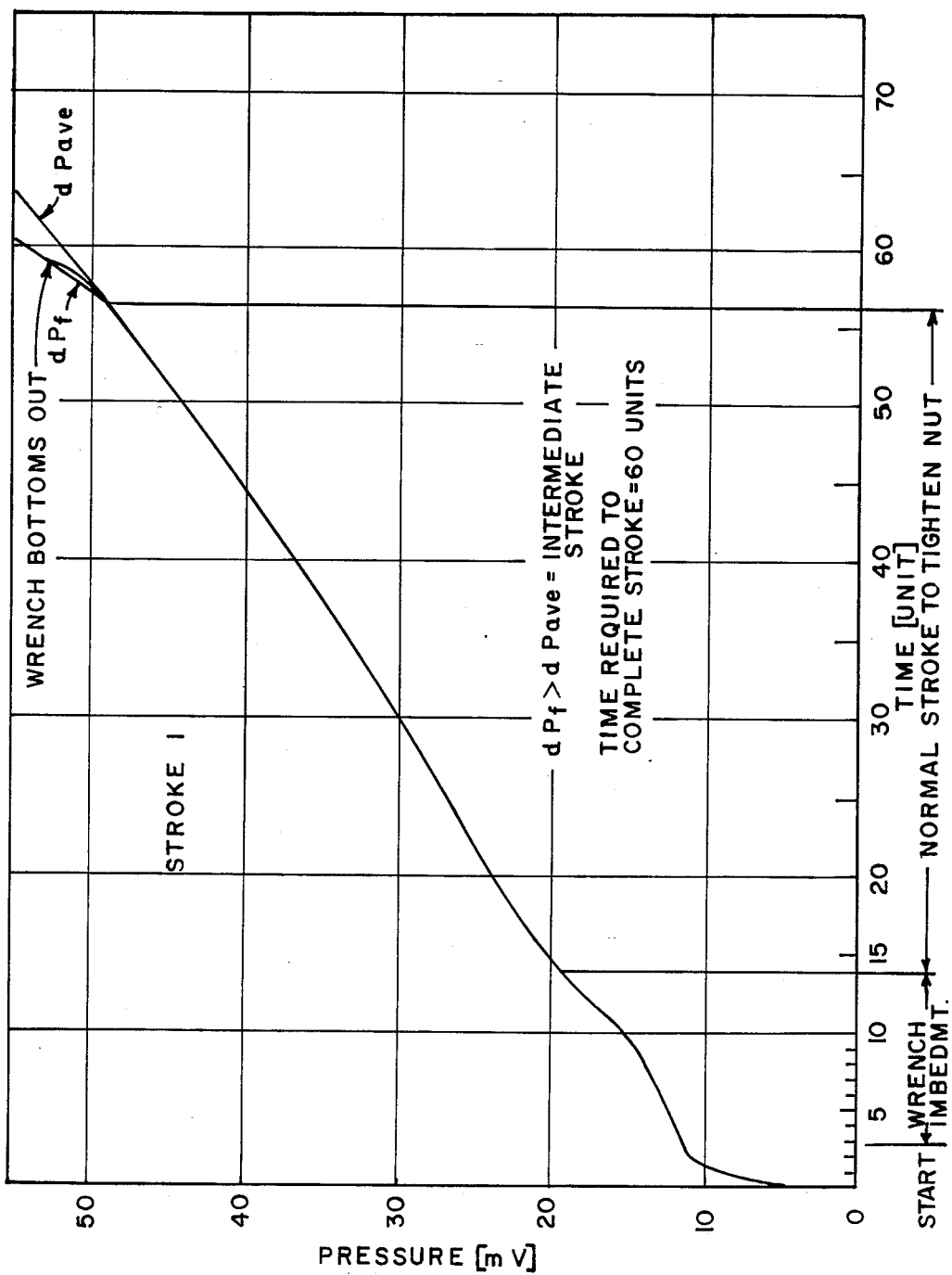

The automatic cycling torque control system uses an algorithm developed from FIGS. 11-13 to determine the status of the tightening cycle. As shown in FIGS. 11-13, three conditions are possible when the wrench is operated in the advance mode: (1) It is possible that the wrench is in an intermediate stroke i.e., the wrench bottomed out and the desired preset torque value has not yet been applied to the fastener (shown in FIG. 11); (2) The wrench has experienced its final stroke, i.e., the preset torque value has been applied to the fastener (shown in FIG. 12); (3) The wrench did not cycle properly, i.e., no ratcheting occured (FIG. 12).

FIG. 11 shows a plot of wrench operation for a normal intermediate cycle of operation, i.e., prior to the preset torque level being reached. FIG. 11 is a plot of the fluid pressure in the wrench vs time. The pressure rise as the wrench is advanced is plotted, and the slope of that line, which is the rate of change of pressure with time, is indicated as dPave. When the wrench bottoms out, the pressure increases considerably in a short period of time as the fluid pressure builds up against the cylinder wall. That higher rate of pressure increase is indicated as $dP_f$. The condition of $dP_f$ (over the last 10 data points) being greater than dPave over a set period of time units (e.g., 60 units) means that the wrench has completed an intermediate stroke, the final fastener torque level has not yet been reached, and the wrench should be recycled. In the automatic system, recycling would be automatic. In the semi-automatic system, the operator must observe for himself that the wrench has bottomed out and the operator must manually operate the keyboard to retract and recycle the wrench; or the operator must visually determine that the wrench is in mid-stroke and thus has reached the cut-off torque level.

Referring to FIG. 12, $dP_f$ is greater that dPave, but the time required to complete the stroke is less than 90% of the time required for the prior stroke (e.g., a FIG. 11 stroke). This means that the stroke is a no ratchet stroke, and the operator will be signaled, e.g. by audio or visual means, to correct wrench mounting and/or retract and recycle the wrench.

Referring to FIG. 13, $dP_f$ (for the last 10 data points) is less than dPave. This means that the predetermined torque level been applied to the fastener and that transducer 26 has sensed the cut-off pressure level, thus resulting in opening advance relay 110 to end the flow of pressurized fluid to the wrench. The predetermined torque level has been reached, and display 118 signals the operator to move the wrench to the next fastener to be tightened.

The flow chart for the program for controller computer 114 (Epson HX 20) is shown in FIGS. 14A-14K, and the program is set forth in Table III. As shown in FIGS. 14A-14D, the control computer 114 begins the wrench cycling routine by cueing the operator through display 118 for the pertinent job information and the torque to be applied to the fastener. The operator then inputs through keyboard 116 the pertinent data such as wrench size, torque level, and historical data. If the torque inputted by the operator is larger than the output available from the wrench specified by the operator, the computer will signal the operator on display 11 and request a new wrench or torque parameter. The controller calculates the wrench fluid pressure necessary to achieve the torque selected by the operator and then calculates the millivolt equivalent for the torque.

Figure 14B:
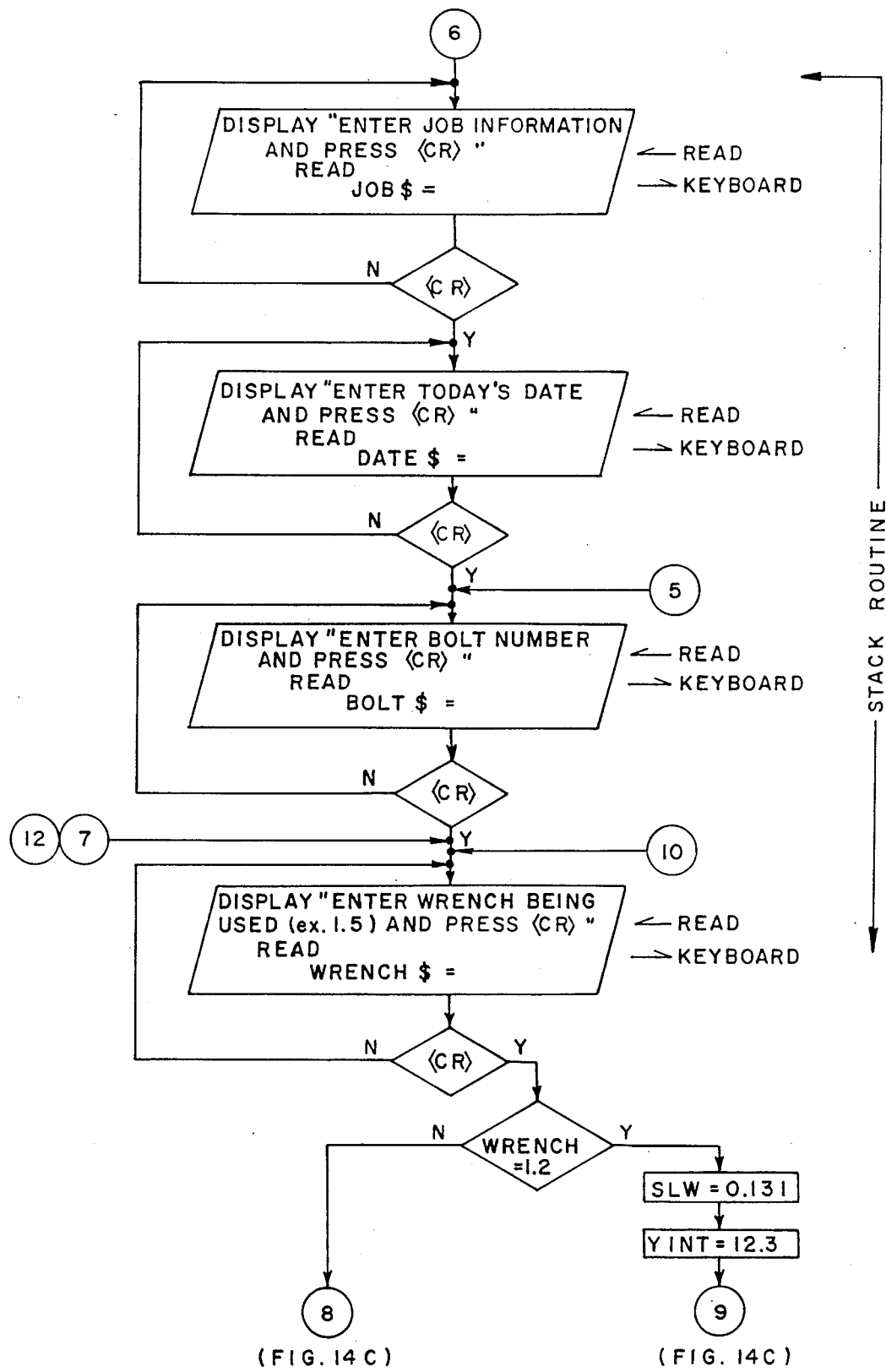
Figure 14C:
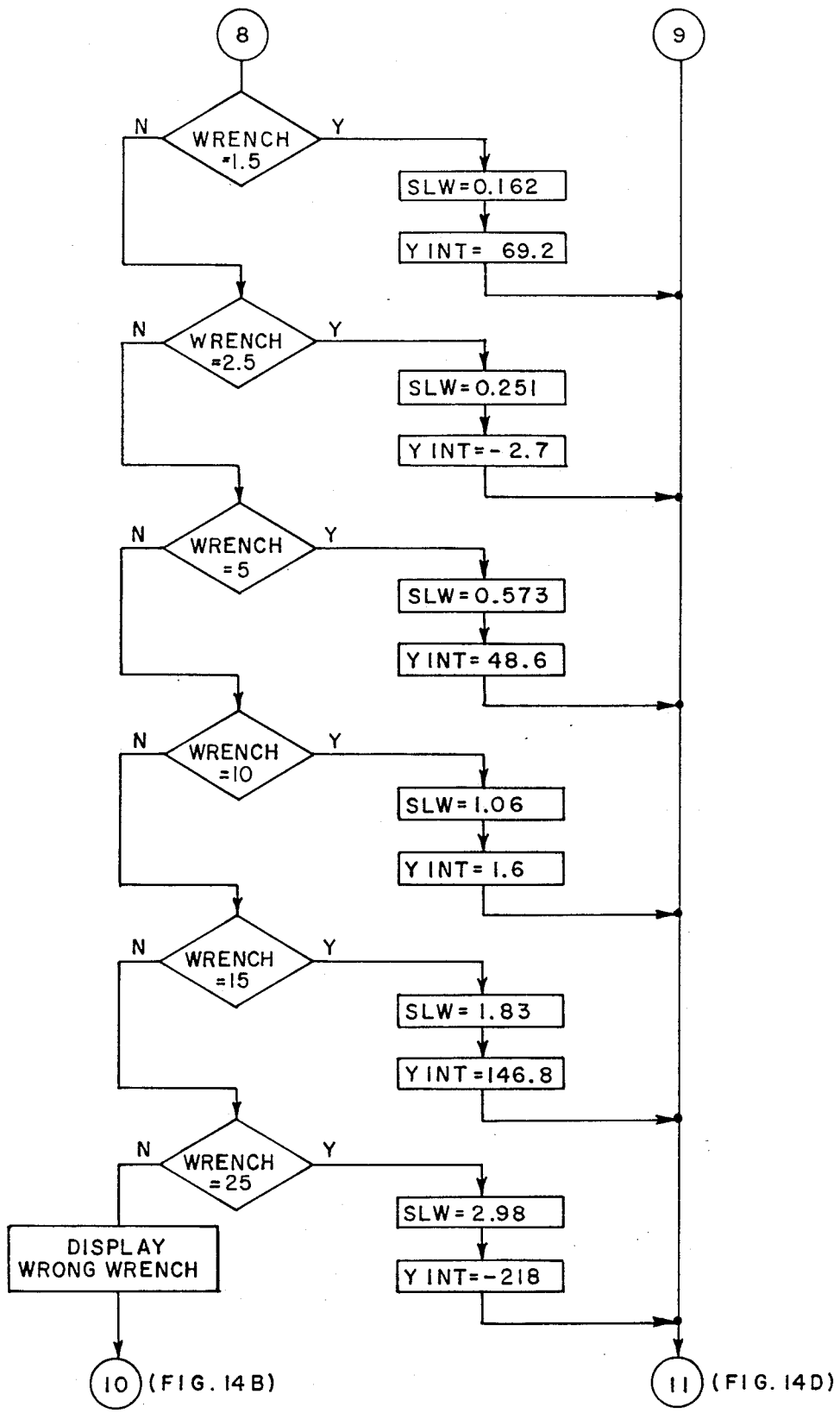
Figure 14D:
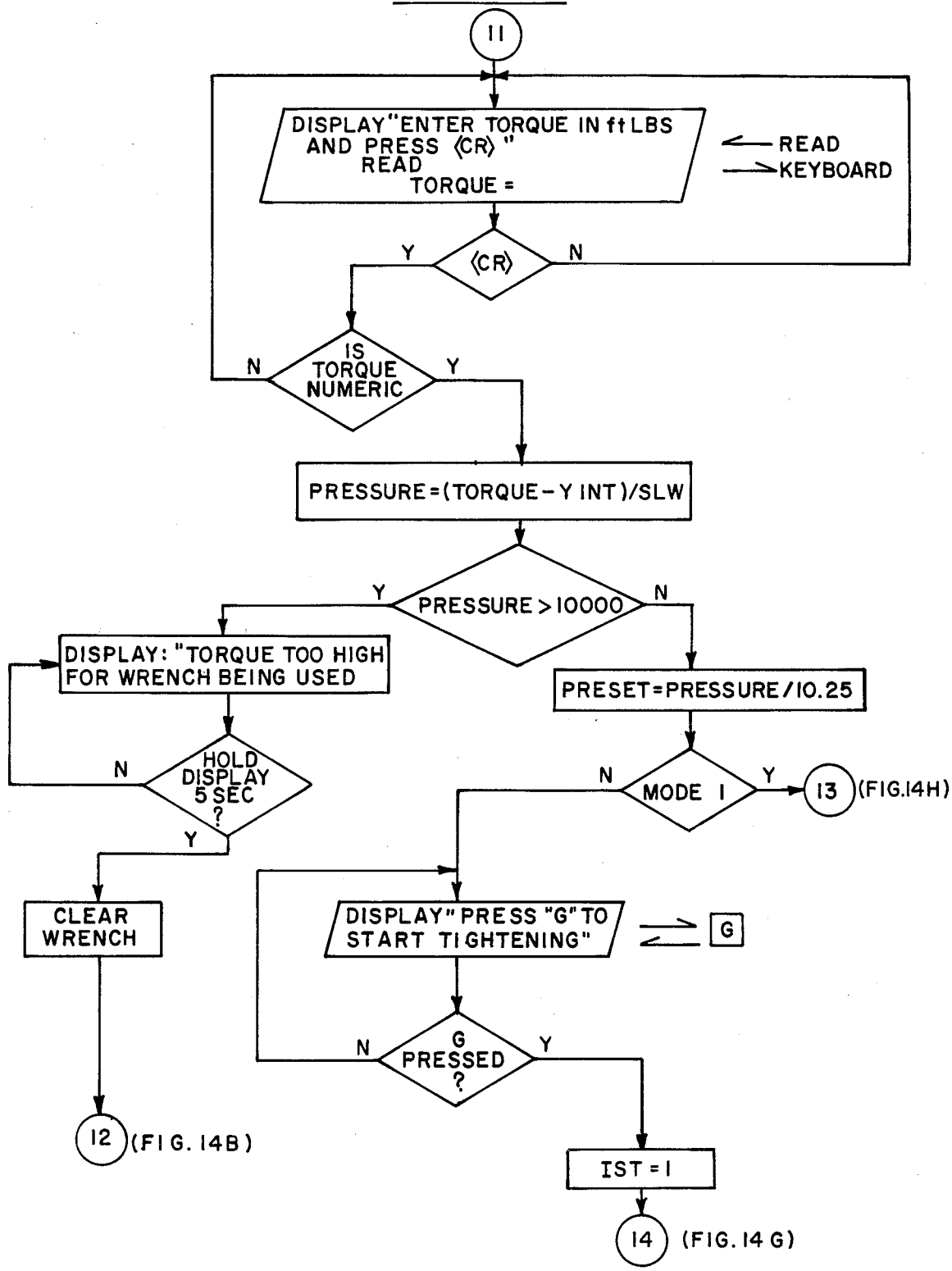

The operator then presses the "go" (G) key to initiate operation (see FIG. 14D). The G key is a dead man's switch; it must be manually pressed during all cycling of the wrench; and wrench cycling will stop if the key is released. After pressing the "go" key, the data is assembled by computer 114 with a mode designation character and a relay designation character; and the controller 114 sends these characters to microprocessor (30) (See Communication Subroutine FIGS. 14 J,K). The mode designates between automatic cycling (mode 2) and manual cycling (mode 1) as determined by operator input.

The relay designation character signals microprocessor (30) to close the advance (110) or retract (112) relay.

Figure 14E:
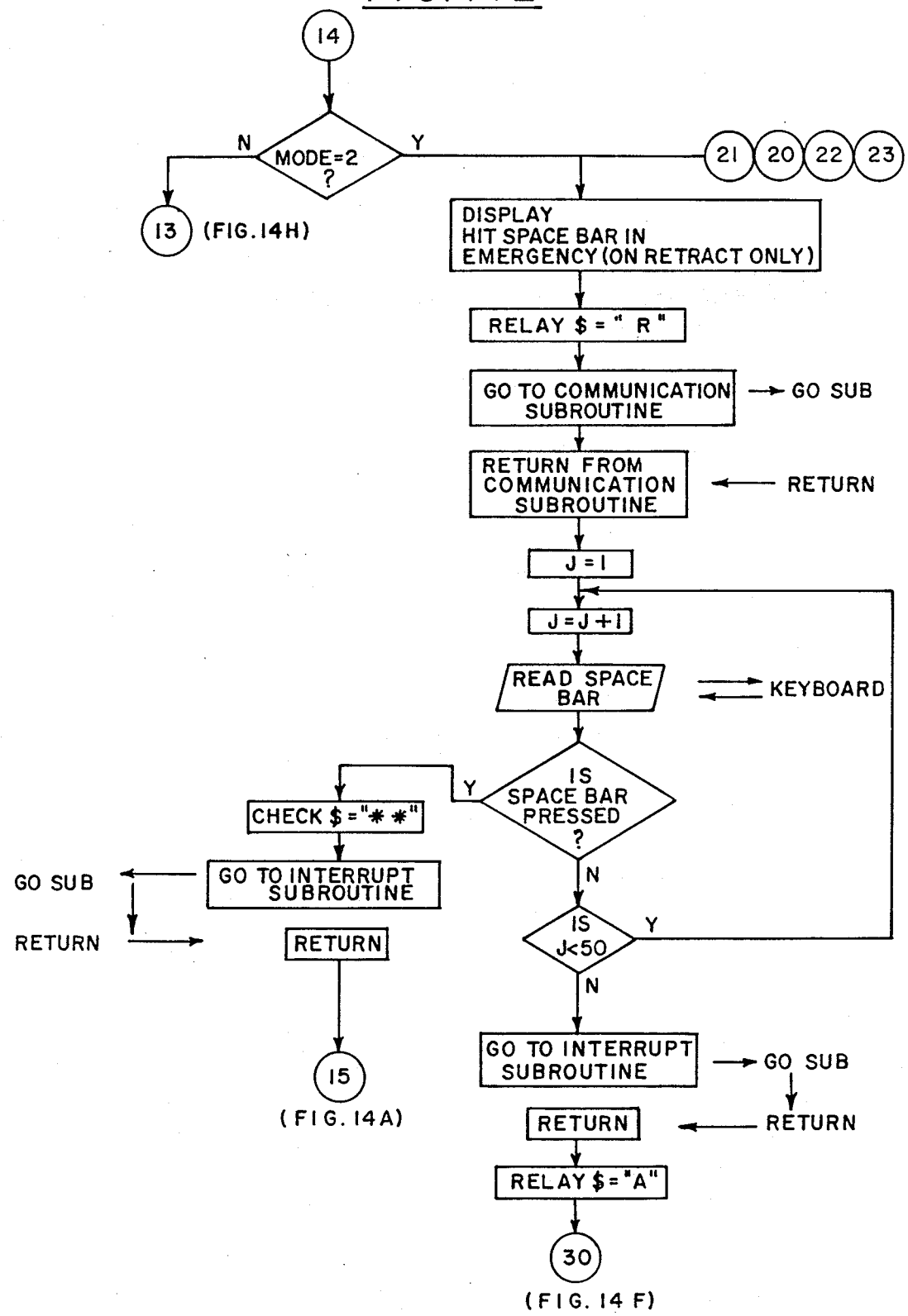
Figure 14G:
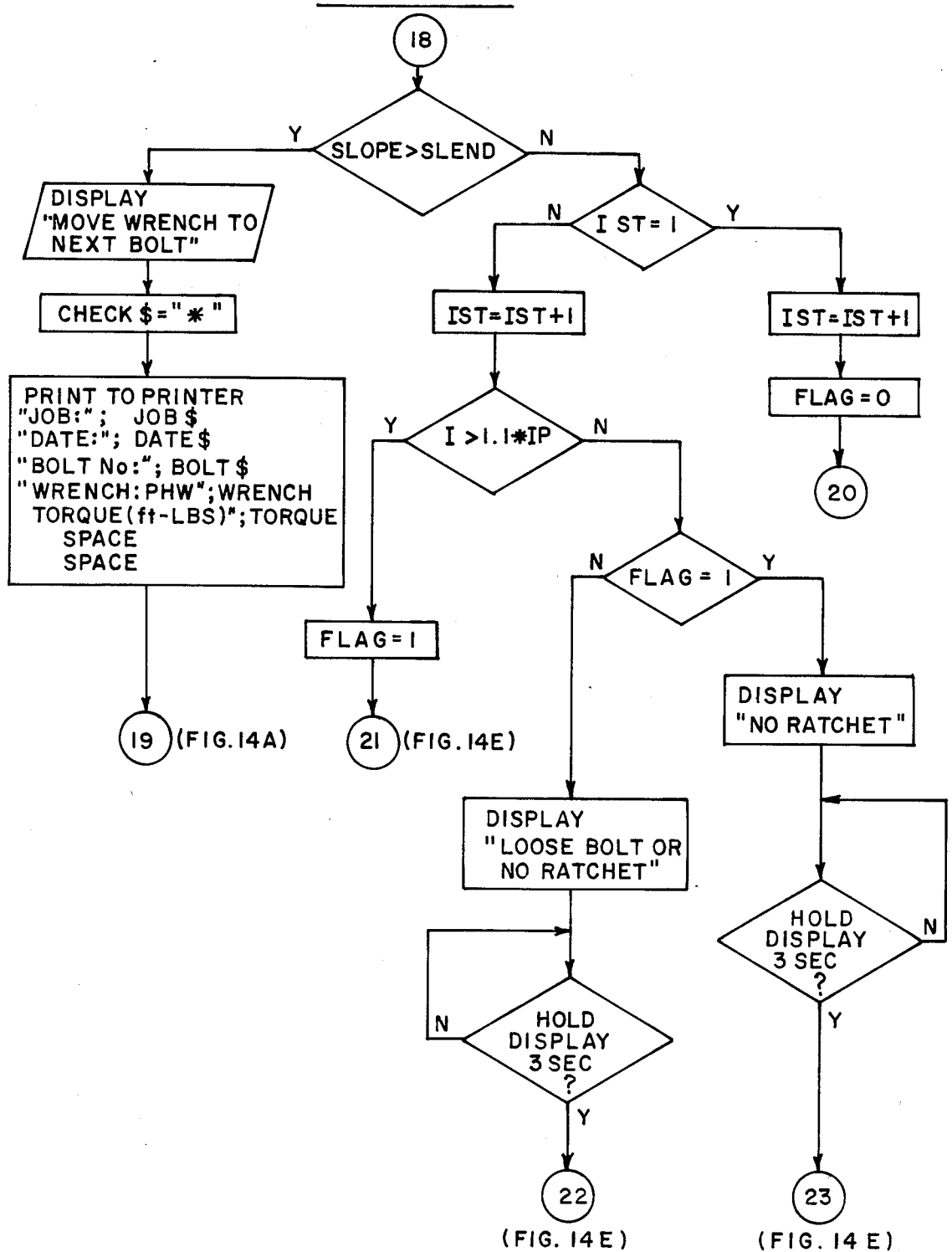

Referring to FIG. 14E, the program makes sure that the wrench is retracted (Relay $=R). The program then counts the time period J to complete the retract stroke and then goes to the Interrupt Subroutine (FIG. 14I) to signal microprocessor 30 to terminate the retract stroke. The program then returns to close the advance relay (FIG. 14E). The program goes through the Communication Subroutine (FIGS. 14J,K) again to assemble the communication string with the mode designation, preset pressure level and relay designation character in control computer 114. This information string is then communicated to microprocessor 30 from control computer 114 to cause microprocessor 30 to close the advance relay and start the tightening cycle of the wrench. For the advance stroke microprocessor 30 closes the advance relay and monitors the pressure transducer 26 (via comparator 42) until the pressure reaches the predetermined level selected by the controller 114. When this pressure is reached, microprocessor 30 opens advance relay 110, thereby stopping the advance of the wrench.

As the wrench advances, microprocessor 30 stores the last 20 pressure reading of comparator 42. When the advance cycle is interrupted these 20 data points plus one a number representing the total number of pressure readings taken over the complete cycle (i.e. 21 data points in all) are sent to computer 114 (See FIGS. 9D and 14F).

Referring to FIG. 14F, the program for controller 114 then calculates an average slope (Pressure/$time$) for the just completed cycle by dividing the final pressure reading by the total number of readings taken. This is represented as dPave on FIGS. 11-13. The controller 114 then calculates the slope $dP_f$(Pressure/$time$) for the last 10 points taken during the cycle:

$$(P_{20} - P_{10})/10 = dP_f$$

where $P_{20}$ is the last pressure reading and $P_{10}$ is the 10th pressure reading in a string of 20 leading up to $P_{20}$.

The controller 114 then compares final slope $dP_f$ to the average slope dPave and compares the total number of points for this cycle to the last cycle to determine which of the following three conditions exist:

(a) If $dP_f$ is greater than dPave (FIG. 11), and as long as 1.1× the number of pressure readings taken is equal to or greater than the number of readings taken on the immediately preceeding stroke. This condition is an intermediate stroke and the fastener is not yet tight. Another stroke is required.

(b) If $dP_f$ is greater than dPave (FIG. 12) and the number of readings taken is not greater than 1.1 times the number of readings taken on the immediately preceeding stroke. This condition is a "no ratchet" stroke, and a no ratchet stroke signal is displayed on display 118. The operator is advised to check the wrench set-up and another stroke is required to be initiated by the operator.

(c) If $dP_f$ is less than dPave (FIG. 13). This condition means that the wrench has stopped turning in mid stroke and the pressure target has been reached. Therefore, this is the last stroke and the operator is advised to move the wrench to the next fastener; and the printer supplies a print out of the torque level and historical data.

Figure 14H:
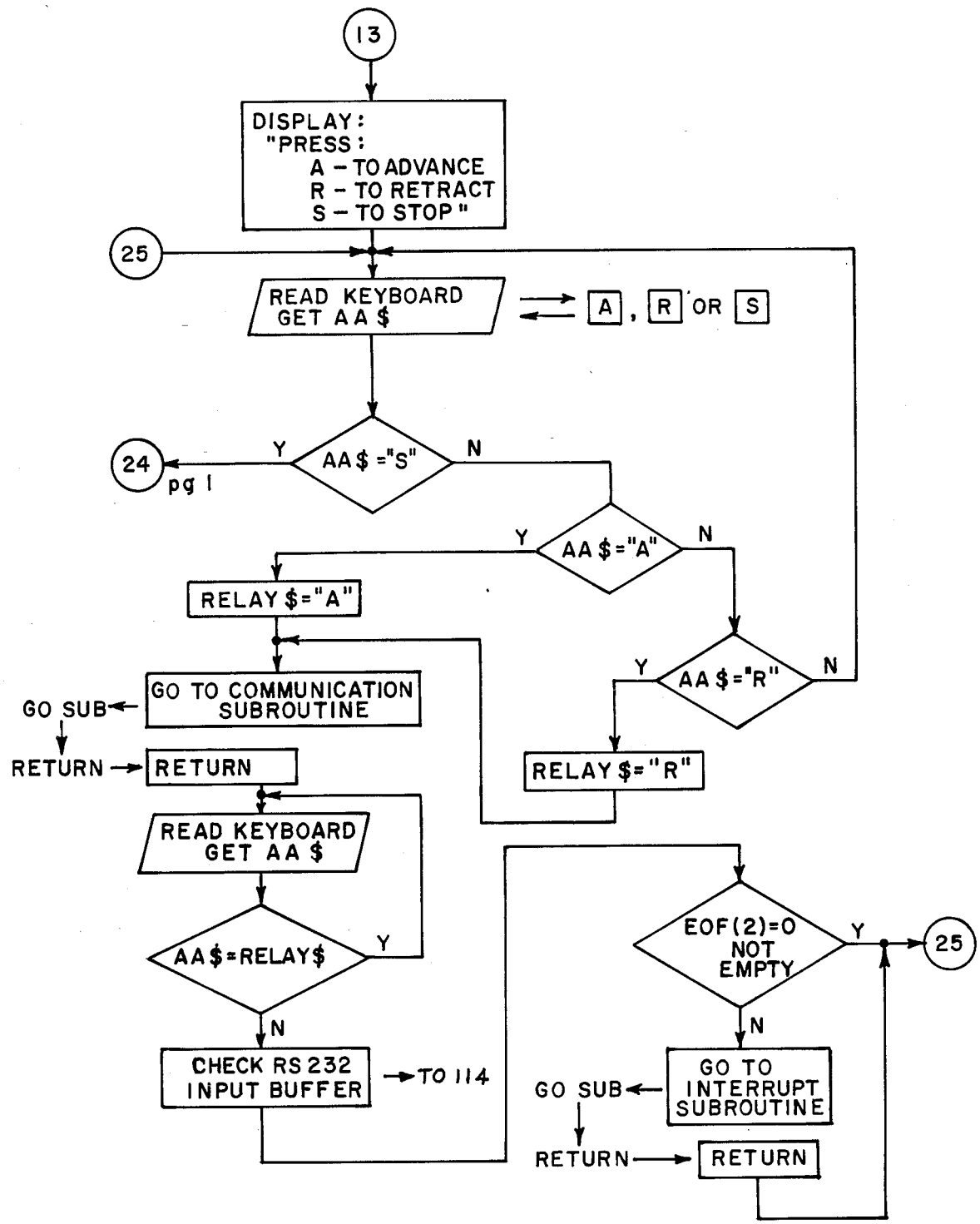
Figure 141:
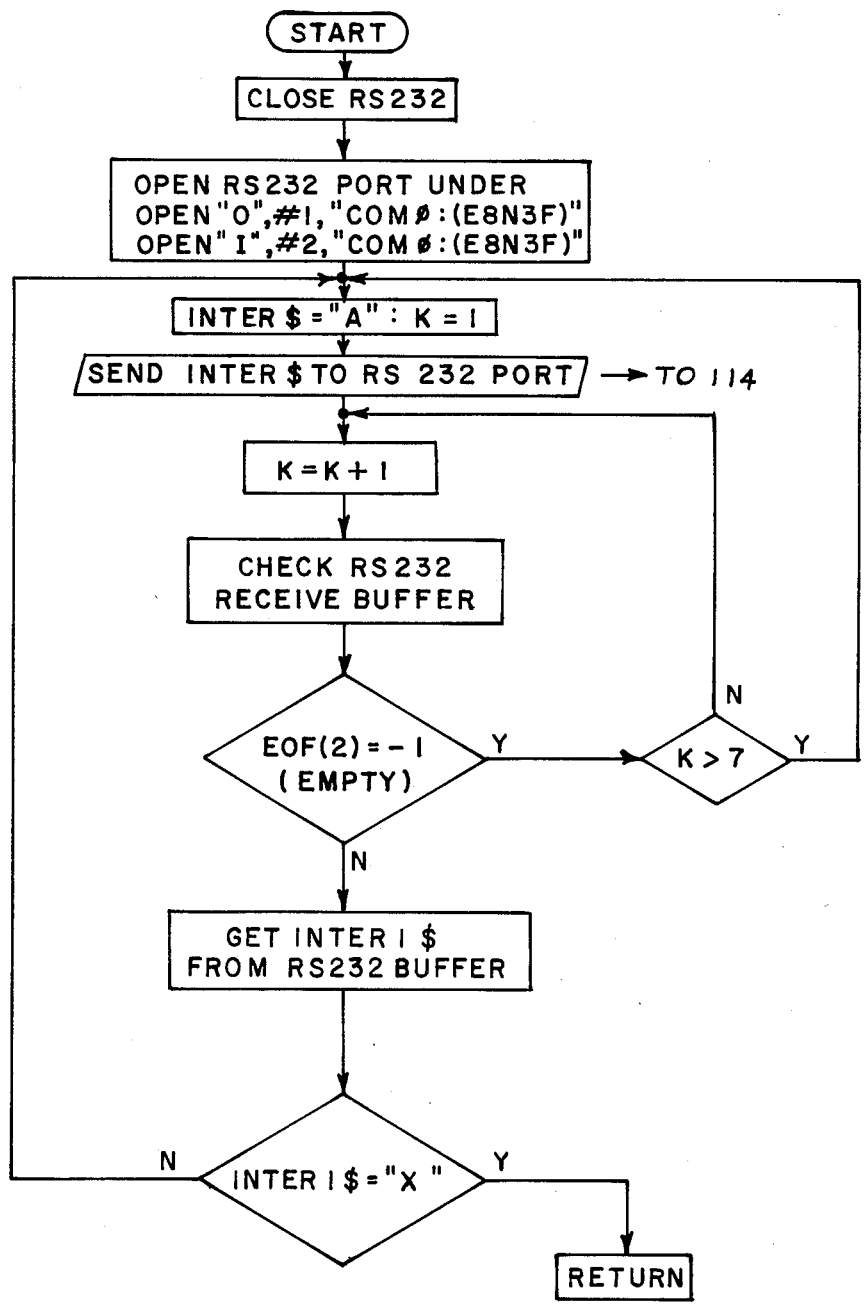
Figure 14J:
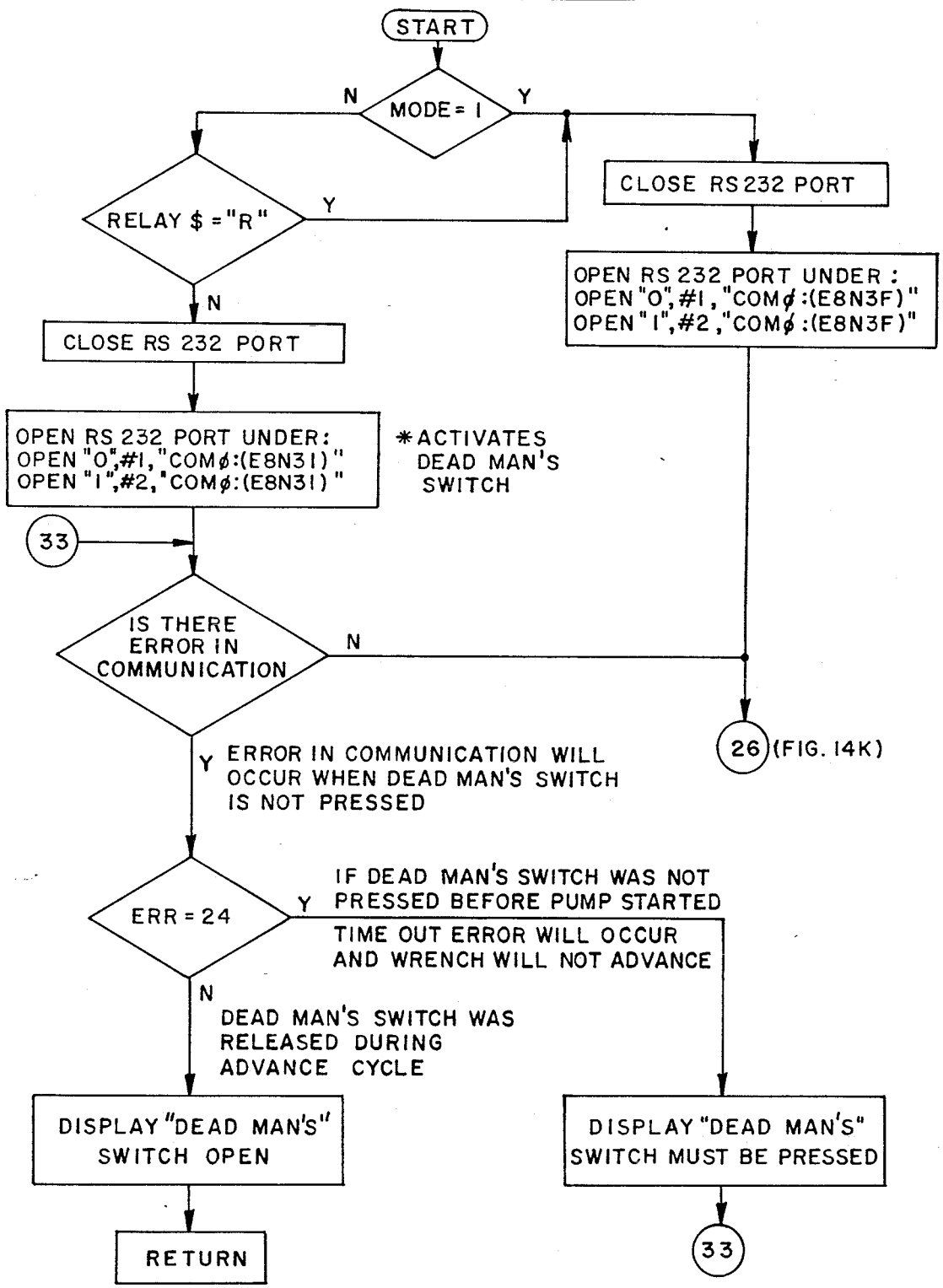

FIG. 14H shows the flow chart for the manual (semiautomatic) mode of operation.

In accordance with another feature of the present invention, the torque-turn relationship can be used to determine the nut factor, K, and to determine the preload on the fastener; and the cut-off torque level can be adjusted to assure that the desired preload (i.e. force) is imposed on the fastener system.

In making up a joint, e.g. a flange with a ring of bolts, an objective is to establish the same preloading (i.e. force) in each fastener. However, the lubricity of each fastener unit e.g. a bolt and a nut) will differ from one fastener unit to another, for a variety of reasons, such as lubrication, dirt, galling, etc. The present invention provides a method to equalize or more nearly equalize the preload in each fastener unit, to thus provide a more optimum joint.

As the bolt is being tightened on each intermediate stroke of the wrench, pressure data is being obtained which can be used to determine the torque-turn relationship, the nut factor and preload. As the wrench turns through an angle $\theta$ for the entire forward stroke, numerous pressure readings P are taken and the data is stored in the memory of computer 114 or microprocessor 30. The difference $\Delta P$ in pressure between the pressure $P_2$ at the end of the stroke and $P_1$ at the beginning of the stroke is commensurate with the torque T imposed on the fastener during the stroke. $P_1$ is the pressure at which the pressure increase during a stroke approaches the linear range after a short initial part of the stroke (see, e.g. FIGS. 11-13).

By combining three known theoretical equations used in bolting, it is possible to determine the approximate nut factor K and preload for a particular fastener unit in a joint. The short term torque - preload equation is $$T = K \, D F_p \tag{1}$$

where:
T = applied torque (in.-lbs.)
D = nominal bolt diameter (in.)
$F_p$ = preload in the bolt (lbs.)
K = nut factor The theoretical turn - preload equation is $$F_p = \theta \frac{K_B K_J}{K_B + K_J} \frac{Pi}{360} \tag{2}$$

where:
$\theta$ = turn of the nut (degrees)
$K_B$ = bolt stiffness (lbs./in.)
$K_J$ = joint stiffness (lbs./in.)
Pi = pitch of the threads (in.)
$F_p$ = preload ($K_B$ and $K_J$ are determined in known manner from the material and geometry of bolt and joint, respectively). The torque-pressure equation for determining torque produced by a given wrench is $$T = A_c \, PL \tag{3}$$

where
$A_c$ = cross-sectional area of wrench drive cylinder (in.$^2$)
L = length of lever arm of the wrench (in.)
P = cylinder pressure (psi)

From equations (1), (2) and (3), the following equation is derived for the nut factor during each stroke $$K = \frac{\Delta P}{\Delta \theta} \left[ \frac{L \, A_c}{D \left( \frac{K_B K_J}{K_B + K_J} \right) \frac{Pi}{360}} \right] \tag{4}$$

where
K = nut factor
L = length of wrench lever arm (in.)
$A_c$ = cross sectional area of wrench piston
$K_B$ = bolt stiffness (lbs/in)
$K_J$ = joint stiffness (lbs/in)
D = nom. diam of bolt
$\Delta P$ = change in pressure during wrench stroke ($P_2 - P_1$) (psi)
$\Delta \theta$ = angular stroke of wrench or change in "angle" of nut;
Pi = pitch of threads (inch) With K known, the torque to be applied to obtain a desired preload can be adjusted in accordance with Equation (1) to obtain a desired preload in each fastener unit in a joint.

The importance of this feature is that it provides a way to take into account the nut factor differences in each fastener unit to arrive at a final joint configuration where all fastener units have the same or nearly the same preload. As indicated earlier, ideally each fastener unit in a joint should have the same preload. By deriving the nut factor K and then adjusting the torque T to obtain a target preload, the present system makes it possible to approach the ideal of equal preload in all fastener units in a joint.

In accordance with this system, the nut factor K can be determined for each tightening stroke of the wrench; or it may be determined for only the one or two strokes prior to the final stroke. With the nut factor K known, the torque T needed to obtain a desired preload can be determined from Equation (1), and then the selected cut-off torque inputted to the system of FIGS. 7-14K can be changed to the new level determined by the analysis of the torque-turn relationship. This adjustment of the selected cut-off torque can be done automatically by a program in computer 114, or it may be done manually by the operator.

In addition to predetermining the torque to be applied to obtain a desired preload in a fastener unit, this system also can provide an indication of incipient galling of a bolt and prevent irrevocable damage to the threads. Incipient galling is signalled by a significant increase in nut factor; the occurrence of which tells the operator not to increase the cut-off torque level. Instead, the nut is loosened, and the threads of the bolt are cleaned, filed, lubricated or otherwise treated to avoid galling. Since galled threads must be removed by machining, this feature can lead to significant savings.

To implement this torque-turn system, a digital plotter 25A in FIG. 7 replaces the digital readout 25 of FIG. 1. Digital plotter 25A is connected to microprocessor 30 to receive all of the pressure readings from microprocessor 30 during the tightening stroke. (See flow chart 9D where these pressure readings are sent to digital plotter 25A just upstream of the decision block MMV>PRESET). Digital plotter 25A produces Pressure versus Time plots like those shown in FIGS. 11-13 for each stroke of the wrench. Each fastener typically requires several (e.g. 3-7) wrench strokes to reach a preset torque. The operator selects an intermediate stroke (i.e, neither the first or the last) and preferably a middle stroke of the series of strokes to conduct the above described process for determining K and $F_p$ and redetermining the cut off torque level to obtain the desired preload. Preferably, to refine the process, the operator should use the data of the middle third of the Pressure vs Time plot to determine $\Delta P$ and use $\frac{1}{3} \theta$ for the turn data. Thus, with reference to FIG. 11, the operator would use the pressure levels at the time readings of 27 and 43 to determine a $P_1$ of 27 MMV and a $P_2$ of 38 MMV. (Of course, these MMV readings have to be multiplied by some constant factor (10.25 in this case) to convert the MMV readings to their equivalent pressure values.

In some applications, e.g. large studs and bolts for pressure vessels, pipelines and the like, it is a common practice to tighten the fastener in several passes. That is, in one pass all fasteners are tightened to a torque of e.g. 100 ft. lbs., then to 200 ft. lbs. in a second pass and then to the final torque of e.g. 300 ft. lbs. in a third pass. In this case, the torque-turn process for K determination, preload determination and torque redetermination can be carried out a the end of an intermediate pass, and a final cut-off torque can be determined for the final pass.

While the torque-turn/nut factor method has been described in terms of a method to be carried out manually by the operator, it will be understood that the method may be automated an carried out by computer control with an appropriate program.

While preferred embodiments have been shown and described, various modifications and substitutions may be made thereto without departing from the spirit and scope of the invention. Accordingly, it is to be understood that the present invention has been described by way of illustrations and not limitation.

```
  1.     2       3       4           5
0000                    ;PAGE ZERO AND SYMBOL ASSIGNMENTS
0000            LBYTE   EQU     1       ;PORT FOR LOW BYTE D/A
0001            HBYTE   EQU     0       ;PORT FOR HIGH BYTE D/A
0000            CHAN    EQU     1       ;LOW 3 BITS SELECT ONE OF EIGHT CHANNELS
0001            CHC     EQU     0       ;LOCATION OF CHANNEL CONTROL (BIT 3)
0000            COUT    EQU     0       ;COMPARATOR OUTPUT FROM D/A
0000            RSO     EQU     0       ;ROTARY SWITCH INPUT TO CPU
001A            RPOS    EQU     1AH     ;POSITION OF ROTARY SWITCH
0010            ADHB    EQU     10H     ;HIGH BYTE OF A/D CONVERSION
0011            ADLB    EQU     ADHB+1  ;LOW BYTE OF A/D CONVERSION
0011            DBCD    EQU     11H     ;LOCATION OF LSB OF BCD VALUES TO DISP
0000            LOB     EQU     0       ;LOW ORDER HALF-NIBBLE FOR DISPLAY
0001            HOB     EQU     1       ;HIGH ORDER HALF-NIBBLE FOR DISPLAY
0016            DP      EQU     16H     ;DISPLAY DIGIT MASK POSITION
0010            IVAL    EQU     10H     ;TWO BYTE INTERGER TO CONVERT TO BCD
0012            BVAL    EQU     12H     ;START OF SECOND BYTE OF BCD CONVERSION
0017            LCDC    EQU     17H     ;LCD CLOCK (BIT 5)
0018            CHAR    EQU     18H     ;TEMP CHAR LOCATION FOR RS232 OUTPUT CHAR
0005            OUT     EQU     5       ;OUTPUT BIT OF OUTPUT PORT (PA4)
0000            PUT     EQU     0       ;RS-232 OUTPUT PORT ASSIGNMENT
0019            COUNT   EQU     19H     ;TEMP COUNT WORD
001B            PH      EQU     1BH     ;MOST SIG BYTE OF MULTIPLICAND
001C            PL      EQU     PH+1    ;LEAST SIG BYTE OF MULTIPLICAND
001D            TEMPA   EQU     PL+1    ;MULTIPLIER AND MOST SIG BYTE OF RESULT
001E            TEMPB   EQU     TEMPA+1 ;MULTIPLIER AND NEXT MOST SIG BYTE OF RESULT
001F            QH      EQU     TEMPB+1 ;THIRD SIG BYTE OF MULTIPLY RESULT
0020            QL      EQU     QH+1    ;LEAST SIG BYTE OF MULTIPLY RESULT
0021            APS     EQU     QL+1    ;ALTERNATE PRINT SWITCH FOR TEMP/PRES
0022            GCNT    EQU     APS+1   ;BIT COUNT FOR RS232 GET CHAR SUBROUTINE
0023            OFSET   EQU     GCNT+1  ;A/D OFFSET ON POWER UP
0010            UDD     EQU     16      ;UPDATE DISPLAY DELAY TIME
0025            TCHAN   EQU     OFSET+2 ;A/D CHANNEL SELECTED TO CONVERT
0026            MODE    EQU     TCHAN+1 ;(0) CALIBRATE (1) NORMAL
0027            TH      EQU     MODE+1
0028            TL      EQU     TH+1
0029            SH      EQU     TL+1
002A            SL      EQU     SH+1

0100                    ORG     100H
0100 A6FF       STRT:   LDA     #0FFH
0102 B705               STA     5       ;SET PORT TO OUTPUTS
0104 A66F               LDA     #6FH
0106 B704               STA     4       ;SET HIGH BYTE DATA DIRECTION
0108 3F08               CLR     8       ;RESET TIMER DATA REG.
010A A606               LDA     #6       ;PRESCALE=128-ENABLE INTER-TIMER
010C B709               STA     9       ;TIMER CONTROL REG.
010E 3F17               CLR     LCDC    ;CLEAR LCD CLOCK STATE
0110 1A17               BSET    5,LCDC
0112 A600               LDA     #0
0114 B711               STA     DBCD    ;INITIALIZE DISPLAY TO ALL BLANKS
0116 A603               LDA     #3
0118 B700               STA     LOB
011A 1A00               BSET    OUT,PUT ;INITIALIZE RS232 STATE
011C 3F1B               CLR     PH
011E 3F1C               CLR     PL
0120 3F27               CLR     TH
0122 3F28               CLR     TL
0124 A610               LDA     #UDD
0126 B721               STA     APS
0128 A6C0               LDA     #0C0H
012A B701               STA     HOB
012C 1600               BSET    3,LOB
012E 1700               BCLR    3,LOB
0130 3F23               CLR     OFSET
0132 3F24               CLR     OFSET+1
```

```
0134 3F26          CLR    MODE
0136 A608          LDA    #8
0138 CD0171        JSR    LDIS        ;SET DISPLAY TO ALL 8'S
013B CD02A4        JSR    INPS
013E B61A          LDA    RPOS        ;CHECK FOR POSITION ZERO ON SWITCH
0140 2622          BNE    STN
0142 3C23          INC    OFSET       ;SET LOW ORDER BIT
0144 3F11          CLR    ADLB
0146 1C11          BSET   6,ADLB
0148 3F10   STK:   CLR    ADHB
014A CD02A4  STL:  JSR    INPS
014D B61A          LDA    RPOS
014F 2702          BEQ    STM         ;LOOK FOR NON-ZERO SWITCH POSITION
0151 1223          BSET   1,OFSET
0153 3C10   STM:   INC    ADHB
0155 26F3          BNE    STL
0157 3C11          INC    ADLB
0159 26ED          BNE    STK
015B CD02A4        JSR    INPS
015E B61A          LDA    RPOS
0160 2602          BNE    STN
0162 1423          BSET   2,OFSET
0164 B623   STN:   LDA    OFSET
0166 3F23          CLR    OFSET
0168 A107          CMP    #7          ;CHECK FOR ROTARY SWITCH SEQUENCE FOR CALIBRATE
016A 2702          BEQ    STO
016C 3C26          INC    MODE        ;SET MODE TO NON-ZERO
016E 9A     STO:   CLI                ;ALLOW INTERRUPTS
016F 20FE   MAIN:  BRA    MAIN        ;MAIN LOOP

0171                      ;SUBROUTINE TO DISPLAY TO VALUE IN ACCA
0171 AE04   LDIS:  LDX    #4
0173 E711   LDIS1: STA    DBCD,X
0175 5A            DECX
0176 2AFB          BPL    LDIS1
0178 CD0221        JSR    DISP
017B 81            RTS
017C                      ;SUBROUTINE TO INPUT A CHARACTER
017C                      ;THIS ROUTINE IS INTERRUPT DRIVEN
017C                      ;THE RS232 INPUT IS CONNECTED TO THE INTERRUPT LINE
017C A608   GETC:  LDA    #8
017E B722          STA    GCNT
0180 2E01          BIL    GET0        ;CHECK FOR NOISE
0182 80            RTI                ;RETURN - FALSE START
0183 4D     GET0:  TSTA               ;DELAY 3 CLOCK CYCLES
0184 CD01C9        JSR    DELAY       ;WAIT ONE BIT TIME
0187 2E03          BIL    GET1        ;CHECK STATE OF INTERRUPT INPUT
0189 99            SEC                ;SET CARRY FOR A HIGH LEVEL
018A 2003          BRA    GET2
018C 98     GET1:  CLC
018D 2000          BRA    GET2        ;TIMING EQUALIZATION
018F 3618   GET2:  ROR    CHAR        ;ROTATE BIT TO FORM CHARACTER
0191 3A22          DEC    GCNT
0193 26EE          BNE    GET0
0195 CD01C9        JSR    DELAY
0198 B618          LDA    CHAR
019A A47F          AND    #7FH
019C A153          CMP    #"S"
019E 2701          BEQ    GET3
01A0 80            RTI
01A1 A602   GET3:  LDA    #2
01A3 80            RTI                ;RETURN

01A4                      ;SUBROUTINE TO PRINT A CHAR ON ASSIGNED RS232 OUTPUT
01A4 B718   PUTC:  STA    CHAR
01A6 A609          LDA    #9          ;PUT OUT NINE BITS
01A8 B719          STA    COUNT
01AA 98            CLC                ;START BIT
01AB 2002          BRA    PUTC2
```

```
      1     2      3       4       5

01AD 3618.  PUTC5:  ROR    CHAR    ;GET NEXT BIT FROM MEMORY
      01AF 2404   PUTC2:  BCC    PUTC3   ;SET OR CLEAR PORT DEPENDING ON DATA
      01B1 1A00           BSET   OUT,PUT
      01B3 2004           BRA    PUTC4
      01B5 1B00   PUTC3:  BCLR   OUT,PUT
      01B7 2000           BRA    PUTC4   ;EQUALIZE TIMING
      01B9 CD01C9 PUTC4:  JSR    DELAY   ;MUST BE TWO BYTE INDEXED JSR FOR TIMING
      01BC 3A19           DEC    COUNT
      01BE 26ED           BNE    PUTC5   ;STILL MORE BITS?
      01C0 1C00           BSET   6,PUT   ;7 CYCLE DELAY
      01C2 1A00           BSET   OUT,PUT ;SEND STOP BIT
      01C4 AD03           BSR    DELAY   ;DELAY FOR THE STOP BIT
      01C6 AD01           BSR    DELAY   ;SECOND STOP BIT
      01C8 81             RTS
      01C9 A613   DELAY:  LDA    #13H    ;SET TO #6 FOR 9600 BAUD
      01CB 4A     DEL2:   DECA
      01CC 26FD           BNE    DEL2
      01CE 81             RTS
      01CF                ;SUBROUTINE TO MULTIPLY 16 BITS BY 16 BITS
      01CF BE1A   MULT:   LDX    RPOS
      01D1 58             LSLX           ;SHIFT LEFT FOR 16 BIT INTEGER ADDRESS
      01D2 B6047C         LDA    SFAC,X  ;MOVE MULTIPLIER INTO POSITION
      01D5 B71F           STA    QH
      01D7 B6047D         LDA    SFAC+1,X
      01DA B720           STA    QL
      01DC AE10           LDX    #16     ;MULTIPLY BY SCALING FACTOR 16 X 16
      01DE 3F1D           CLR    TEMPA
      01E0 3F1E           CLR    TEMPB
      01E2 361F           ROR    QH
      01E4 3620           ROR    QL
      01E6 240C   NIT:    BCC    ROTAT
      01E8 B61E           LDA    TEMPB
      01EA BB1C           ADD    PL
      01EC B71E           STA    TEMPB
      01EE B61D           LDA    TEMPA
      01F0 B91B           ADC    PH
      01F2 B71D           STA    TEMPA
      01F4 361D   ROTAT:  ROR    TEMPA
      01F6 361E           ROR    TEMPB
      01F8 361F           ROR    QH
      01FA 3620           ROR    QL
      01FC 5A             DECX
      01FD 26E7           BNE    NIT
      01FF B61F           LDA    QH
      0201 BA1E           ORA    TEMPB
      0203 2717           BEQ    NUL1
      0205 BE1A           LDX    RPOS    ;DO DOUBLE PRECISION ADD OF OFFSET
      0207 58             LSLX
      0208 98             CLC
      0209 B61F           LDA    QH
      020B DB0491         ADD    OFAC+1,X
      020E B711           STA    ADLB
      0210 B61E           LDA    TEMPB
      0212 D90490         ADC    OFAC,X
      0215 B710           STA    ADHB
      0217 A480           AND    #80H
      0219 2601           BNE    NUL1
      021B 81             RTS
      021C 3F11   NUL1:   CLR    ADLB
      021E 3F10           CLR    ADHB
      0220 81             RTS

0221                ;SUBROUTINE TO DISPLAY DATA
      0221 AE03   DISP:   LDX    #3
      0223 E612   DIL2:   LDA    DBCD+1,X
      0225 2607           BNE    DIL1
      0227 A60A           LDA    #0AH
      0229 E712           STA    DBCD+1,X
```

```
    1    2      3         4       5
  022B 5A              DECX
  022C 2AF5            BPL     DIL2
  022E 3F16    DIL1:   CLR     DP
  0230 3C16            INC     DP
  0232 AE04            LDI     #4
  0234 1100    DLOP:   BCLR    0,LOB
  0236 1300            BCLR    1,LOB
  0238 E611            LDA     DBCD,X
  023A A403            AND     #3
  023C BB00            ADD     LOB
  023E B700            STA     LOB
  0240 E611            LDA     DBCD,X
  0242 A40C            AND     #12
  0244 48              LSLA
  0245 48              LSLA
  0246 48              LSLA
  0247 48              LSLA
  0248 B701            STA     HOB
  024A B616            LDA     DP
  024C 3816            LSL     DP
  024E BA01            ORA     HOB
  0250 BA17            ORA     LCDC
  0252 B701            STA     HOB
  0254 1600            BSET    3,LOB
  0256 1700            BCLR    3,LOB   ;LATCH DISPLAY DIGIT SELECT
  0258 B601            LDA     HOB
  025A A4C0            AND     #0C0H
  025C BA17            ORA     LCDC
  025E B701            STA     HOB
  0260 1600            BSET    3,LOB
  0262 1700            BCLR    3,LOB
  0264 5A              DECX
  0265 2ACD            BPL     DLOP
  0267 81              RTS

0268                 ;SUBROUTINE TO CONVERT BINARY TO BCD FOR DISPLAY ON LCD
  0268 AE03    BTBCD:  LDI     #3
  026A 6F12    BLOP:   CLR     BVAL,X
  026C 5A              DECX
  026D 2AFB            BPL     BLOP
  026F AE06            LDI     #6
  0271 98      LOP:    CLC
  0272 B611    LOOP:   LDA     IVAL+1
  0274 DB029D          ADD     TAB+1,X
  0277 B711            STA     IVAL+1
  0279 B610            LDA     IVAL
  027B D9029C          ADC     TAB,X
  027E B710            STA     IVAL
  0280 2B06            BMI     DWN
  0282 54              LSRX
  0283 6C12            INC     BVAL,X
  0285 59              ROLX
  0286 20EA            BRA     LOOP
  0288 98      DWN:    CLC
  0289 B611            LDA     IVAL+1
  028B B2029D          SBC     TAB+1,X
  028E B711            STA     IVAL+1
  0290 B610            LDA     IVAL
  0292 D2029C          SBC     TAB,X
  0295 B710            STA     IVAL
  0297 5A              DECX
  0298 5A              DECX
  0299 2AD6            BPL     LOP
  029B 81              RTS             ;RETURN
  029C FFF6    TAB:    DW      -10
  029E FF9C            DW      -100
  02A0 FC18            DW      -1000
  02A2 D8F0            DW      -10000
```

```
02A4                    ;SUBROUTINE TO DETERMINE POSITION OF ROTARY SWITCH
02A4 AE08       INPS:   LDX     #8          ;MAX POSITIONS IS EIGHT
02A6 3F01               CLR     CHAN
02A8 1400               BSET    2,CHC
02AA 1500               BCLR    2,CHC
02AC 3F1A               CLR     RPOS
02AE 08000F     INPS1:  BRSET   4,RS0,INPS2
02B1 3C1A               INC     RPOS        ;INC POSITION OF SWITCH
02B3 B601               LDA     CHAN        ;SET 4051 TO NEXT POSITION
02B5 AB08               ADD     #8
02B7 B701               STA     CHAN
02B9 1400               BSET    2,CHC       ;CLOCK INTO 4174
02BB 1500               BCLR    2,CHC
02BD 5A                 DECX
02BE 26EE               BNE     INPS1
02C0 81        INPS2:   RTS

02C1                    ;SUBROUTINE FOR A/D CONVERSION WITH 10 BIT D/A
02C1 D60472     ADC:    LDA     TCHN,X
02C4 B701               STA     CHAN
02C6 B725               STA     TCHAN
02C8 1400               BSET    2,CHC       ;LATCH CHANNEL DATA
02CA 1500               BCLR    2,CHC
02CC 3F01       RPT:    CLR     LBYTE       ;CLEAR D/A PORTS
02CE 1100               BCLR    0,HBYTE
02D0 1300               BCLR    1,HBYTE
02D2 3F10               CLR     ADHB        ;CLEAR OLD A/D READING
02D4 3F11               CLR     ADLB
02D6 AE20               LDX     #32         ;SET TO TRACK ANALOG INPUT FOR 8 READINGS
02D8 1200               BSET    1,HBYTE     ;DO BINARY SEARCH TO FIND NEW A/D VALUE
02DA 0F0002             BRCLR   7,COUT,C1
02DD 1300               BCLR    1,HBYTE
02DF 1000       C1:     BSET    0,HBYTE
02E1 0F0002             BRCLR   7,COUT,C2
02E4 1100               BCLR    0,HBYTE
02E6 1E01       C2:     BSET    7,LBYTE
02E8 0F0002             BRCLR   7,COUT,C3
02EB 1F01               BCLR    7,LBYTE
02ED 1C01       C3:     BSET    6,LBYTE
02EF 0F0002             BRCLR   7,COUT,C4
02F2 1D01               BCLR    6,LBYTE
02F4 1A01       C4:     BSET    5,LBYTE
02F6 0F0002             BRCLR   7,COUT,C5
02F9 1B01               BCLR    5,LBYTE
02FB 1801       C5:     BSET    4,LBYTE
02FD 0F0002             BRCLR   7,COUT,C6
0300 1901               BCLR    4,LBYTE
0302 1601       C6:     BSET    3,LBYTE
0304 0F0002             BRCLR   7,COUT,C7
0307 1701               BCLR    3,LBYTE
0309 1401       C7:     BSET    2,LBYTE
030B 0F0002             BRCLR   7,COUT,C8
030E 1501               BCLR    2,LBYTE
0310 1201       C8:     BSET    1,LBYTE
0312 0F0002             BRCLR   7,COUT,C9
0315 1301               BCLR    1,LBYTE
0317 1001       C9:     BSET    0,LBYTE
0319 0F0002             BRCLR   7,COUT,C10
031C 1101               BCLR    0,LBYTE
031E                                        ;TRACK SELECTED ANALOG SIGNAL
031E 0F001D     C10:    BRCLR   7,COUT,IRD  ;INCREMENT READING UNTIL COMP. IS HIGH
0321 3A01       DRD:    DEC     LBYTE       ;DEC READING UNTIL COMP. IS LOW
0323 B601               LDA     LBYTE
0325 A1FF               CMP     #0FFH       ;CHECK FOR UNDERFLOW
0327 2610               BNE     LCHK        ;BRANCH IF NO UNDERFLOW
0329 B600               LDA     HBYTE
032B A403               AND     #3
032D 2608               BNE     LOK         ;BRANCH IF ZERO
```

```
032F 3F01         CLR    LBYTE       ;SET TO LOWEST VALUE
0331 1100         BCLR   0,HBYTE
0333 1300         BCLR   1,HBYTE
0335 2022         BRA    ADRD
0337 3A00  LOK:   DEC    HBYTE       ;DECREMENT HIGH BYTE
0339 0E00E5 LCHK: BRSET  7,COUT,DRD  ;STAY IN LOOP UNTIL COMP. IS LOW
033C 201D         BRA    ADRD        ;ADD IN READING
033E 3C01  IRD:   INC    LBYTE       ;INC READING UNTIL COMP. IS LOW
0340 2614         BNE    HCHK        ;CHECK FOR LOW BYTE OVERFLOW
0342 B600         LDA    HBYTE       ;CHECK AND INC HIGH BYTE OF D/A
0344 A403         AND    #3          ;MASK OUT D/A HIGH ORDER BITS
0346 A103         CMP    #3          ;CHECK FOR MAX VALUE
0348 260A         BNE    HOK         ;BRANCH IF NOT MAX
034A A6FF         LDA    #0FFH       ;SET D/A TO MAX VALUE
034C B701         STA    LBYTE
034E 1000         BSET   0,HBYTE
0350 1200         BSET   1,HBYTE
0352 2005         BRA    ADRD
0354 3C00  HOK:   INC    HBYTE
0356 0F00E5 HCHK: BRCLR  7,COUT,IRD  ;BRANCH IF COMPARATOR IS LOW
0359 98    ADRD:  CLC                ;DOUBLE PRECISON ADD OF A/D CONV.
035A B601         LDA    LBYTE
035C BB11         ADD    ADLB
035E B711         STA    ADLB
0360 B600         LDA    HBYTE
0362 A403         AND    #3
0364 B910         ADC    ADHB
0366 B710         STA    ADHB
0368 5A           DECX
                                     ; TRACK SIGNAL FOR EIGHT READINGS
0369 26B3         BNE    C10
036B AE05         LDX    #5
036D 3410  RSFT:  LSR    ADHB        ;DIVIDE READING BY 32
036F 3611         ROR    ADLB
0371 5A           DECX
0372 26F9         BNE    RSFT
0374 B610         LDA    ADHB        ;CHECK PRESURE FOR LESS THAN 150 PSI
0376 A4FF         AND    #0FFH
0378 2606         BNE    ADCC        ;RETURN IF PRESURE IS GREATER
037A B611         LDA    ADLB
037C A4E0         AND    #0E0H
037E 2701         BEQ    ADCD
0380 81    ADCC:  RTS
0381 3F10  ADCD:  CLR    ADHB
0383 3F11         CLR    ADLB
0385 81           RTS                ;RETURN FROM SUBROUTINE

0386              ;DOUBLE PRECISION ADD/FILTER ROUTINE FOR A/D
0386 98    DADD:  CLC                ;CLEAR CARRY
0387 B61C         LDA    PL
0389 BB11         ADD    ADLB
038B B71C         STA    PL
038D B61B         LDA    PH
038F B910         ADC    ADHB
0391 B71B         STA    PH
0393 81           RTS

0394              ;TIMER USED TO PROVIDE CLOCK FOR LCD DISPLAY ON PB4
0394 1F09  TINTP: BCLR   7,9         ;CLEAR INTERRUPT
0396 3F01         CLR    HOB
0398 9A           CLI                ;ALLOW INTERRUPTS FROM RS232 TO HAVE PRIORITY
0399 0A172A       BRSET  5,LCDC,TI1
039C 1A01         BSET   5,HOB
039E 1600         BSET   3,LOB
03A0 1700         BCLR   3,LOB
03A2 1A17         BSET   5,LCDC
03A4 2016         BRA    TI2
03A6              ;PRINT OUT A/D VALUE ON RS232 LINE
```

| 1 | 2 | 3 | 4 | 5 |
|---|---|---|---|---|
| 03A6 AE04 | PRINT: | LDX | #4 | |
| 03A8 E611 | PRIN1: | LDA | DBCD,X | ;GET HIGH ORDER VALUE |
| 03AA AB30 | | ADD | #30H | ;CONVERT TO ASCII VALUE |
| 03AC CD01A4 | | JSR | PUTC | ;SEND CHARACTER |
| 03AF 5A | | DECX | | |
| 03B0 2AF6 | | BPL | PRIN1 | |
| 03B2 A60D | | LDA | #13 | ;ASCII CARRIAGE RETRUN |
| 03B4 CD01A4 | | JSR | PUTC | |
| 03B7 A60A | | LDA | #10 | ;ASCII LINE FEED |
| 03B9 CD01A4 | | JSR | PUTC | |
| 03BC B621 | TI2: | LDA | APS | |
| 03BE A110 | | CMP | #UDD | |
| 03C0 2603 | | BNE | TERM | |
| 03C2 CD0221 | | JSR | DISP | ;DISPLAY VALUE ON LCD |
| 03C5 80 | TERM: | RTI | | |
| 03C6 1B01 | TI1: | BCLR | 5,HOB | |
| 03C8 1600 | | BSET | 3,LOB | |
| 03CA 1700 | | BCLR | 3,LOB | |
| 03CC 1B17 | | BCLR | 5,LCDC | |
| 03CE CD02A4 | | JSR | INPS | ;GET POSITION OF ROTARY SWITCH |
| 03D1 BE1A | | LDX | RPOS | ;SET CHANNEL SWITCH POSITION |
| 03D3 270A | | BEQ | TI4 | ;ALLOW PRESURE DISPLAY DURING CALIBRATE |
| 03D5 B626 | | LDA | MODE | |
| 03D7 2606 | | BNE | TI4 | |
| 03D9 5C | | INCX | | |
| 03DA 5C | | INCX | | ;CALIBRATE MODE ALLOWS TEMP AND ZERO DISPLAY |
| 03DB 5C | | INCX | | |
| 03DC 5C | | INCX | | |
| 03DD BF1A | | STX | RPOS | |
| 03DF CD02C1 | TI4: | JSR | ADC | ;GET A VALUE FROM THE A/D CONVERTER(ADLB+ADHB) |
| 03E2 CD03B6 | | JSR | DADD | ;ADD/FILTER A/D READING |
| 03E5 AE09 | | LDX | #9 | |
| 03E7 CD02C1 | | JSR | ADC | |
| 03EA 98 | | CLC | | ;DOUBLE PRECISION ADD TEMP |
| 03EB B628 | | LDA | TL | |
| 03ED BB11 | | ADD | ADLB | |
| 03EF B728 | | STA | TL | |
| 03F1 B627 | | LDA | TH | |
| 03F3 B910 | | ADC | ADHB | |
| 03F5 B727 | | STA | TH | |
| 03F7 3A21 | | DEC | APS | |
| 03F9 26F6 | | BNE | TI3 | |
| 03FB A610 | | LDA | #UDD | |
| 03FD B721 | | STA | APS | |
| 03FF AE04 | | LDX | #4 | ;DIVIDE BY 16 |
| 0401 341B | FSHFT: | LSR | PH | |
| 0403 361C | | ROR | PL | |
| 0405 5A | | DECX | | |
| 0406 26F9 | | BNE | FSHFT | |
| 0408 B61A | | LDA | RPOS | |
| 040A 2704 | | BEQ | TCO | |
| 040C B626 | | LDA | MODE | |
| 040E 2753 | | BEQ | TI5 | |
| 0410 AE04 | TCO: | LDX | #4 | ;DIVIDE TEMP BY 16 |
| 0412 3427 | FSHFO: | LSR | TH | |
| 0414 3628 | | ROR | TL | |
| 0416 5A | | DECX | | |
| 0417 26F9 | | BNE | FSHFO | |
| 0419 B61A | | LDA | RPOS | ;SAVE IT |
| 041B B712 | | STA | BVAL | |
| 041D B61B | | LDA | PH | |
| 041F B729 | | STA | SH | |
| 0421 B61C | | LDA | PL | |
| 0423 B72A | | STA | SL | |
| 0425 B627 | | LDA | TH | |
| 0427 B71B | | STA | PH | |
| 0429 B628 | | LDA | TL | |
| 042B B71C | | STA | PL | |
| 042D A609 | | LDA | #9 | |

| 1 | 2 | 3 | 4 | 5 |
|---|---|---|---|---|
| 042F B71A | | STA | RPOS | |
| 0431 CD01CF | | JSR | MULT | ;GET TEMP COEF |
| 0434 AE10 | | LDX | #16 | ;MULTIPLY COEF TIMES A/D VALUE |
| 0436 3F1D | | CLR | TEMPA | |
| 0438 3F1E | | CLR | TEMPB | |
| 043A 3610 | | ROR | ADHB | |
| 043C 3611 | | ROR | ADLB | |
| 043E 240C | SNXT: | BCC | SROT | |
| 0440 B61E | | LDA | TEMPB | |
| 0442 BB2A | | ADD | SL | |
| 0444 B71E | | STA | TEMPB | |
| 0446 B61D | | LDA | TEMPA | |
| 0448 B929 | | ADC | SH | |
| 044A B71D | | STA | TEMPA | |
| 044C 361D | SROT: | ROR | TEMPA | |
| 044E 361E | | ROR | TEMPB | |
| 0450 3610 | | ROR | ADHB | |
| 0452 3611 | | ROR | ADLB | |
| 0454 5A | | DECX | | |
| 0455 26E7 | | BNE | SNXT | |
| 0457 B610 | | LDA | ADHB | ;TEMP CORRECTED COEF IS IN QH AND TEMPB |
| 0459 B71C | | STA | PL | |
| 045B B61E | | LDA | TEMPB | |
| 045D B71B | | STA | PH | |
| 045F B612 | | LDA | BVAL | |
| 0461 B71A | | STA | RPOS | |
| 0463 CD01CF | T15: | JSR | MULT | |
| 0466 CD0268 | | JSR | BTBCD | ;CONVERT READING TO BCD IVAL -> BVAL |
| 0469 3F1B | | CLR | PH | |
| 046B 3F1C | | CLR | PL | ;ZERO A/D READINGS |
| 046D 3F28 | | CLR | TL | |
| 046F 3F27 | | CLR | TH | |
| 0471 80 | TI3: | RTI | | |
| 0472 | | | | ;DATA ARRAYS |
| 0472 01 | TCHN: | DB | 1 | ;LIST OF CHANNEL ASSIGNMENTS BY SWITCH POSITION |
| 0473 01 | | DB | 1 | ;OLD VALUE WAS 4 |
| 0474 01 | | DB | 1 | ;PRESSURE TRANSDUCER CHANNEL |
| 0475 01 | | DB | 1 | |
| 0476 01 | | DB | 1 | |
| 0477 01 | | DB | 1 | |
| 0478 01 | | DB | 1 | |
| 0479 01 | | DB | 1 | |
| 047A 02 | | DB | 2 | ;OLD VALUE WAS 0 |
| 047B 02 | | DB | 2 | ;OLD VALUE WAS 6 |
| 047C | | | | ;LIST OF SCALING FACTORS FOR EACH CHANNEL |
| 047C 0A40 | SFAC: | DW | 2624 | ;PRESURE=A/D VALUE * 10.25 |
| 047E 0165 | | DW | 357 | ;HW1.2  .136040 |
| 0480 01DA | | DW | 474 | ;HW1.5  .180521 |
| 0482 02A7 | | DW | 679 | ;HW2.5  .258794 |
| 0484 0612 | | DW | 1554 | ;HW5    .592266 |
| 0486 0AF2 | | DW | 2802 | ;HW10  1.067680 |
| 0488 136F | | DW | 4975 | ;HW15  1.896100 |
| 048A 1E96 | | DW | 7830 | ;HW25  2.984000 |
| 048C 0100 | | DW | 256 | |
| 048E 0050 | | DW | 80 | ;GAIN FOR TEMP COMPENSATION |
| 0490 | | | | ;ALTERNATE GAINS FOR CHANNELS 6 AND 7 |
| 0490 | | | | ;2KT .248229 (651) OFFSET=31.8903 |
| 0490 | | | | ;4KT .644688 (1692) OFFSET = -0.1497 |
| 0490 0000 | OFAC: | DW | 0 | ;LIST OF OFFSETS TO APPLY FOR EACH SWITCH POS. |
| 0492 FFFE | | DW | -2 | ;HW1.2   -2.2560 |
| 0494 0000 | | DW | 0 | ;HW1.5   -0.4664 |
| 0496 FFF8 | | DW | -8 | ;HW2.5   -7.5469 |
| 0498 FFEF | | DW | -17 | ;HW5    -16.6689 |
| 049A 0014 | | DW | 20 | ;HW10    20.4478 |
| 049C FFC6 | | DW | -58 | ;HW15   -58.2979 |
| 049E FF26 | | DW | -218 | ;HW25  -218.0900 |

```
  1    2        3        4          5
04A0 0000       DW       0
04A2 0088       DW       184        ;OFFSET FOR TEMP COMPENSATION

1FF8            ORG      1FF8H
1FF8 0394       DW       TINTP      ;TIMER SERVICE VECTOR
1FFA            ORG      1FFAH
1FFA 017C       DW       GETC       ;INTERRUPT ROUTINE TO PROCESS CHARACTER INPUT
1FFE            ORG      1FFEH
1FFE 0100       DW       STRT       ;POWER UP - RESET-VECTOR
0000            END
```

| | | | | | | | | | |
|---|---|---|---|---|---|---|---|---|---|
| ADC | 02C1 | COUNT | 0019 | HOB | 0001 | OUT | 0005 | STK | 0148 |
| ADCC | 0380 | COUT | 0000 | HOK | 0354 | PH | 001B | STL | 014A |
| ADCD | 0381 | DADD | 0386 | INPS | 02A4 | PL | 001C | STM | 0153 |
| ADHB | 0010 | DBCD | 0011 | INPS1 | 02AE | PRIN1 | 03A8 | STN | 0164 |
| ADLB | 0011 | DEL2 | 01CB | INPS2 | 02C0 | PRINT | 03A6 | STO | 016E |
| ADRB | 0339 | DELAY | 01C9 | IRB | 033E | PUT | 0000 | STRT | 0100 |
| APS | 0021 | DIL1 | 022E | IVAL | 0010 | PUTC | 01A4 | TAB | 029C |
| BLOP | 026A | DIL2 | 0223 | LBYTE | 0001 | PUTC2 | 01AF | TCHAN | 0025 |
| BTBCD | 0268 | DISP | 0221 | LCDC | 0017 | PUTC3 | 01B5 | TCHN | 0472 |
| BVAL | 0012 | BLOP | 0234 | LCHK | 0339 | PUTC4 | 01B9 | TCO | 0410 |
| C1 | 02DF | DP | 0016 | LBIS | 0171 | PUTC5 | 01AD | TEMPA | 001D |
| C10 | 031E | DRD | 0321 | LBIS1 | 0173 | QH | 001F | TEMPB | 001E |
| C2 | 02E6 | DWN | 0288 | LOB | 0000 | QL | 0020 | TERM | 03C5 |
| C3 | 02ED | FSHF0 | 0412 | LOK | 0337 | ROTAT | 01F4 | TH | 0027 |
| C4 | 02F4 | FSHFT | 0401 | LOOP | 0272 | RPOS | 001A | TI1 | 03C6 |
| C5 | 02FB | GCNT | 0022 | LOP | 0271 | RPT | 02CC | TI2 | 03BC |
| C6 | 0302 | GET0 | 0183 | MAIN | 016F | RSFT | 036D | TI3 | 0471 |
| C7 | 0309 | GET1 | 018C | MODE | 0026 | RSO | 0000 | TI4 | 03DF |
| C8 | 0310 | GET2 | 018F | MUL1 | 021C | SFAC | 047C | TI5 | 0463 |
| C9 | 0317 | GET3 | 01A1 | MULT | 01CF | SH | 0029 | TINTP | 0394 |
| CHAN | 0001 | GETC | 017C | NIT | 01E6 | SL | 002A | TL | 002B |
| CHAR | 0018 | HBYTE | 0000 | OFAC | 0490 | SNIT | 043E | UBD | 0010 |
| CHC | 0000 | HCHK | 0356 | OFSET | 0023 | SROT | 044C | | |

TABLE II

```
  1    2        3        4          5
0000                     ;PAGE ZERO AND SYMBOL ASSIGNMENTS
0001            LBYTE    EQU      1      ;PORT FOR LOW BYTE D/A
0000            HBYTE    EQU      0      ;PORT FOR HIGH BYTE D/A
0001            CHAN     EQU      1      ;LOW 3 BITS SELECT ONE OF EIGHT CHANNELS
0000            CHC      EQU      0      ;LOCATION OF CHANNEL CONTROL (BIT 3)
0000            COUT     EQU      0      ;COMPARATOR OUTPUT FROM D/A
0000            RSO      EQU      0      ;ROTARY SWITCH INPUT TO CPU
001A            RPOS     EQU      1AH    ;POSITION OF ROTARY SWITCH
0010            ADHB     EQU      10H    ;HIGH BYTE OF A/D CONVERSION
0011            ADLB     EQU      ADHB+1 ;LOW BYTE OF A/D CONVERSION
0011            DBCD     EQU      11H    ;LOCATION OF LSB OF BCD VALUES TO DISP
0000            LOB      EQU      0      ;LOW ORDER HALF-NIBBLE FOR DISPLAY
0001            HOB      EQU      1      ;HIGH ORDER HALF-NIBBLE FOR DISPLAY
0016            DP       EQU      16H    ;DISPLAY DIGIT MASK POSITION
0010            IVAL     EQU      10H    ;TWO BYTE INTERGER TO CONVERT TO BCD
0012            BVAL     EQU      12H    ;START OF SECOND BYTE OF BCD CONVERSION
0017            LCDC     EQU      17H    ;LCD CLOCK (BIT 5)
0017            BCNT     EQU      LCDC   ;COUNT OF CHARACTERS IN BUFFER
0018            CHAR     EQU      18H    ;TEMP CHAR LOCATION FOR RS232 OUTPUT CHAR
0005            OUT      EQU      5      ;OUTPUT BIT OF OUTPUT PORT (PA4)
0000            PUT      EQU      0      ;RS-232 OUTPUT PORT ASSIGNMENT
0019            COUNT    EQU      19H    ;TEMP COUNT WORD
001B            PH       EQU      1BH    ;MOST SIG BYTE OF MULTIPLICAND
001C            PL       EQU      PH+1   ;LEAST SIG BYTE OF MULTIPLICAND
001D            TEMPA    EQU      PL+1   ;MULTIPLIER AND MOST SIG BYTE OF RESULT
001E            TEMPB    EQU      TEMPA+1 ;MULTIPLIER AND NEXT MOST SIG BYTE OF RESULT
001F            QH       EQU      TEMPB+1 ;THIRD SIG BYTE OF MULTIPLY RESULT
0020            QL       EQU      QH+1   ;LEAST SIG BYTE OF MULTIPLY RESULT
0021            GCNT     EQU      QL+1   ;BIT COUNT FOR RS232 GET CHAR SUBROUTINE
```

| 1 | 2 | 3 | 4 | 5 |
|---|---|---|---|---|
| 0022 |  | OFSET | EQU | GCNT+1 ;A/D OFFSET ON POWER UP |
| 0023 |  | TCHAN | EQU | OFSET+1 ;A/D CHANNEL SELECTED TO CONVERT |
| 0024 |  | MODE | EQU | TCHAN+1 |
| 0025 |  | TH | EQU | MODE+1 |
| 0026 |  | TL | EQU | TH+1 |
| 0027 |  | SH | EQU | TL+1 |
| 0028 |  | SL | EQU | SH+1 |
| 0029 |  | MMVH | EQU | SL+1 ;TARGET MV READING |
| 002A |  | MMVL | EQU | MMVH+1 |
| 002B |  | RELAY | EQU | MMVL+1 ;ADVANCE OR RETRACT MODE |
| 002C |  | BUF | EQU | RELAY+1 |
| 0100 |  |  | ORG | 100H |
| 0100 | A6FF | STRT: | LDA | #0FFH |
| 0102 | B705 |  | STA | 5 ;SET PORT TO OUTPUTS |
| 0104 | A67F |  | LDA | #7FH |
| 0106 | B704 |  | STA | 4 ;SET HIGH BYTE DATA DIRECTION |
| 0108 | 1A00 |  | BSET | OUT,PUT ;INITIALIZE RS232 STATE |
| 010A | 1D00 |  | BCLR | 6,HBYTE ;RESET ADVANCE RELAY |
| 010C | 1900 |  | BCLR | 4,HBYTE ;RESET RETRACT RELAY |
| 010E | 3F17 |  | CLR | BCNT |
| 0110 | 3F1B |  | CLR | PH |
| 0112 | 3F1C |  | CLR | PL |
| 0114 | 3F25 |  | CLR | TH |
| 0116 | 3F26 |  | CLR | TL |
| 0118 | 3F22 |  | CLR | OFSET |
| 011A | 4F |  | CLRA |  |
| 011B | CD042B |  | JSR | ADC |
| 011E | 3F29 |  | CLR | MMVH |
| 0120 | 3F2A |  | CLR | MMVL |
| 0122 | 9A |  | CLI | ;ALLOW INTERRUPTS |
| 0123 | 3F17 | MAIN: | CLR | BCNT |
| 0125 | B617 | MAIN0: | LDA | BCNT ;BUFFER REL. ADDRESS POINTER |
| 0127 | A106 |  | CMP | #6 |
| 0129 | 2BFA |  | BMI | MAIN0 ;WAIT FOR AT LEAST SEVEN CHARACTERS |
| 012B | B62C |  | LDA | BUF ;GET FIRST CHAR |
| 012D | A403 |  | AND | #03 |
| 012F | 4A |  | DECA |  |
| 0130 | B724 |  | STA | MODE |
| 0132 | A102 |  | CMP | #2 |
| 0134 | 2603 |  | BNE | MA1 |
| 0136 | CC0204 |  | JMP | NMAIN |
| 0139 | 3F2A | MA1: | CLR | MMVL |
| 013B | 3F29 |  | CLR | MMVH |
| 013D | A604 |  | LDA | #4 |
| 013F | B723 |  | STA | TCHAN ;GET SET TO CONVERT 4 DIGIT NUMBER TO BINARY |
| 0141 | AE01 |  | LDX | #1 |
| 0143 | 98 |  | CLC |  |
| 0144 | 392A | MAIN1: | ROL | MMVL ;MULTIPLY BY 10 USING SHIFTS AND ADD |
| 0146 | 3929 |  | ROL | MMVH |
| 0148 | B62A |  | LDA | MMVL |
| 014A | B719 |  | STA | COUNT |
| 014C | B629 |  | LDA | MMVH |
| 014E | B71A |  | STA | RPOS |
| 0150 | 392A |  | ROL | MMVL |
| 0152 | 3929 |  | ROL | MMVH |
| 0154 | 392A |  | ROL | MMVL |
| 0156 | 3929 |  | ROL | MMVH |
| 0158 | B619 |  | LDA | COUNT |
| 015A | BB2A |  | ADD | MMVL |
| 015C | B72A |  | STA | MMVL |
| 015E | B61A |  | LDA | RPOS |
| 0160 | B929 |  | ADC | MMVH |
| 0162 | B729 |  | STA | MMVH |
| 0164 | E62C |  | LDA | BUF,X ;GET NEXT CHAR |
| 0166 | A40F |  | AND | #0FH ;STRIP OFF ASCII |
| 0168 | 98 |  | CLC | ;RESET CARRY |
| 0169 | BB2A |  | ADD | MMVL ;DOUBLE PRECISION ADD |
| 016B | B72A |  | STA | MMVL |
| 016D | 4F |  | CLRA |  |
| 016E | B929 |  | ADC | MMVH |
| 0170 | B729 |  | STA | MMVH |
| 0172 | 5C |  | INCX |  |

| 1 | 2 | 3 | 4 | 5 |
|---|---|---|---|---|
| 0173 3A23 | | DEC | TCHAN | |
| 0175 26CD | | BNE | MAIN1 | ;CHECK FOR LAST OF 4 CHARS |
| 0177 E62C | | LDA | BUF,X | ;GET RELAY MODE CHARACTER |
| 0179 A403 | | AND | #03 | ;STRIP OFF LEAST SIG BITS |
| 017B 4A | | DECA | | |
| 017C B72B | | STA | RELAY | ;(0) ADVANCE MODE (1) RETRACT MODE |
| 017E 3F18 | | CLR | CHAR | ;SEND STRING BACK TO USER AND VERIFY |
| 0180 A609 | | LDA | #9 | |
| 0182 B721 | | STA | GCNT | |
| 0184 B624 | | LDA | MODE | |
| 0186 4C | | INCA | | |
| 0187 AB30 | | ADD | #30H | |
| 0189 CD030D | | JSR | PUTC | ;SEND BACK MODE CHAR |
| 018C B629 | | LDA | MMVH | |
| 018E B710 | | STA | ADHB | |
| 0190 B62A | | LDA | MMVL | |
| 0192 B711 | | STA | ADLB | |
| 0194 CD03D2 | | JSR | BTBCD | |
| 0197 AE03 | | LDX | #3 | |
| 0199 E611 | MAIN2: | LDA | DBCD,X | ;SEND BACK PRESET IN MV |
| 019B AB30 | | ADD | #30H | |
| 019D CD030D | | JSR | PUTC | |
| 01A0 5A | | DECX | | |
| 01A1 2AF6 | | BPL | MAIN2 | |
| 01A3 B62B | | LDA | RELAY | ;GET RELAY MODE |
| 01A5 2604 | | BNE | MAIN3 | |
| 01A7 A641 | | LDA | #"A" | |
| 01A9 2002 | | BRA | MAIN4 | |
| 01AB A652 | MAIN3: | LDA | #"R" | |
| 01AD CD030D | MAIN4: | JSR | PUTC | ;SEND RELAY MODE |
| 01B0 A60D | | LDA | #13 | ;CARRIAGE RETURN |
| 01B2 CD030D | | JSR | PUTC | ;SEND IT |
| 01B5 B621 | MA2: | LDA | GCNT | ;WAIT FOR CONFIRM CHARACTER |
| 01B7 A109 | | CMP | #9 | |
| 01B9 27FA | | BEQ | MA2 | |
| 01BB B618 | | LDA | CHAR | |
| 01BD A159 | | CMP | #"Y" | |
| 01BF 270A | | BEQ | MA5 | |
| 01C1 A6FF | | LDA | #255 | |
| 01C3 4A | STLL: | DECA | | ;STALL FOR CARRIAGE RETURN LINE FEED |
| 01C4 4C | | INCA | | |
| 01C5 4A | | DECA | | |
| 01C6 26FB | | BNE | STLL | |
| 01C8 CC0123 | | JMP | MAIN | |
| 01CB A6FF | MA5: | LDA | #255 | |
| 01CD 4A | MA8: | DECA | | |
| 01CE 4C | | INCA | | |
| 01CF 4A | | DECA | | |
| 01D0 26FB | | BNE | MA8 | |
| 01D2 B62B | | LDA | RELAY | |
| 01D4 272C | | BEQ | MAIN6 | ;CHECK FOR RELAY MODE |
| 01D6 1800 | | BSET | 4,HBYTE | ;CLOSE RETRACT RELAY |
| 01D8 A609 | | LDA | #9 | |
| 01DA B721 | | STA | GCNT | ;WAIT FOR INPUT CHAR BEFORE OPENING |
| 01DC B621 | MAIN5: | LDA | GCNT | |
| 01DE A109 | | CMP | #9 | ;RETRACT RELAY |
| 01E0 27FA | | BEQ | MAIN5 | |
| 01E2 1900 | | BCLR | 4,HBYTE | ;OPEN RETRACT |
| 01E4 A658 | | LDA | #"X" | ;SEND CHAR TO MAIN COMPUTER |
| 01E6 CD030D | | JSR | PUTC | |
| 01E9 A60D | | LDA | #13 | ;SEND C.R. |
| 01EB CD030D | | JSR | PUTC | |
| 01EE CC0123 | | JMP | MAIN | ;RETURN TO MAIN WAIT LOOP |
| 01F1 B61C | SPRN: | LDA | PL | ;MODE TO PRINT SINGLE A/D VALUE |
| 01F3 B711 | | STA | ADLB | |
| 01F5 B618 | | LDA | PH | |
| 01F7 B710 | | STA | ADHB | |
| 01F9 CD03D2 | | JSR | BTBCD | |
| 01FC CD053B | | JSR | PRINT | |
| 01FF CC0123 | | JMP | MAIN | ;RETURN TO MAIN INPUT LOOP |
| 0202 1C00 | MAIN6: | BSET | 6,HBYTE | ;CLOSE ADVANCE RELAY |
| 0204 3F1A | NMAIN: | CLR | RPOS | ;BUFFER ADDRESS POINTER |
| 0206 A609 | | LDA | #9 | |

| 1 | 2 | 3 | 4 | 5 |
|---|---|---|---|---|
| 0208 | B721 | | STA | GCNT |
| 020A | 3F16 | | CLR | DP |
| 020C | 3F22 | | CLR | OFSET ;CLEAR MEASUREMENTS COUNTER |
| 020E | | | | ;TIGHT MEASUREMENT-COMPARE LOOP |
| 020E | A6FF | MAIN7: | LDA | #255 ;STALL LOOP TO MEET 50 MEAS/SEC. |
| 0210 | 4A | MA3: | DECA | |
| 0211 | 4C | | INCA | |
| 0212 | 4A | | DECA | |
| 0213 | 4C | | INCA | |
| 0214 | 4A | | DECA | |
| 0215 | 26F9 | | BNE | MA3 |
| 0217 | AE00 | | LDX | #0 ;GET CHANNEL |
| 0219 | CD042B | | JSR | ADC ;GET PRESSURE READING |
| 021C | BE10 | | LDX | ADHB ;MOVE READING |
| 021E | BF1B | | STX | PH |
| 0220 | BE11 | | LDX | ADLB |
| 0222 | BF1C | | STX | PL |
| 0224 | AE09 | | LDX | #9 ;GET TEMP |
| 0226 | CD042B | | JSR | ADC |
| 0229 | B611 | | LDA | ADLB ;MOVE READING |
| 022B | B726 | | STA | TL |
| 022D | B610 | | LDA | ADHB |
| 022F | B725 | | STA | TH |
| 0231 | CD04F0 | | JSR | CTEMP ;DO TEMPERATURE CORRECTION |
| 0234 | B624 | | LDA | MODE |
| 0236 | A102 | | CMP | #2 ;CHECK FOR SINGLE READ MODE (EXTRA) |
| 0238 | 27B7 | | BEQ | SPRN |
| 023A | BE1A | | LDX | RPOS |
| 023C | B61C | | LDA | PL |
| 023E | E72D | | STA | BUF+1,X |
| 0240 | B61B | | LDA | PH |
| 0242 | E72C | | STA | BUF,X |
| 0244 | B624 | | LDA | MODE ;CHECK FOR MODE 1 OR 0 IN PROG |
| 0246 | 270C | | BEQ | MA4 |
| 0248 | B61C | | LDA | PL |
| 024A | BA1B | | ORA | PH |
| 024C | 2706 | | BEQ | MA4 |
| 024E | 3C22 | | INC | OFSET ;COUNT NUMBER OF MEASURES |
| 0250 | 2602 | | BNE | MA4 |
| 0252 | 3C16 | | INC | DP ;DOUBLE PRECISION |
| 0254 | 3C1A | MA4: | INC | RPOS ;INC BUFFER POINTER TO NEXT POS |
| 0256 | 3C1A | | INC | RPOS |
| 0258 | B61A | | LDA | RPOS |
| 025A | A128 | | CMP | #40 ;RING BUFFER LIMIT |
| 025C | 2602 | | BNE | MAIN9 |
| 025E | 3F1A | | CLR | RPOS ;START OVER |
| 0260 | B621 | MAIN9: | LDA | GCNT |
| 0262 | A109 | | CMP | #9 |
| 0264 | 2659 | | BNE | MAIN8 ;KICK OUT IF A CHARACTER IS INPUT |
| 0266 | 98 | | CLC | ;ACTUAL PRESURE - DESIRED PRESSURE |
| 0267 | B61C | | LDA | PL |
| 0269 | B22A | | SBC | MMVL |
| 026B | B61B | | LDA | PH |
| 026D | B229 | | SBC | MMVH |
| 026F | 2B9D | | BMI | MAIN7 ;BRANCH IF PRESSURE IS NOT REACHED |
| 0271 | 1D00 | | BCLR | 6,HBYTE |
| 0273 | B624 | | LDA | MODE |
| 0275 | 2737 | | BEQ | PRN2 ;NO PRINTOUT FOR MODE 1 |
| 0277 | BE1A | | LDX | RPOS |
| 0279 | BF17 | | STX | BCNT ;SAVE POSITION OF RING BUFFER |
| 027B | BE1A | PRN1: | LDX | RPOS |
| 027D | E62D | | LDA | BUF+1,X ;PRINT LAST 20 MEASUREMENTS |
| 027F | B711 | | STA | ADLB |
| 0281 | E62C | | LDA | BUF,X |
| 0283 | B710 | | STA | ADHB |
| 0285 | CD03D2 | | JSR | BTBCD ;CONVERT VALUE FROM BINARY TO BCD |
| 0288 | CD053B | | JSR | PRINT |
| 028B | 3C1A | | INC | RPOS |
| 028D | 3C1A | | INC | RPOS |
| 028F | B61A | | LDA | RPOS |
| 0291 | A128 | | CMP | #40 ;CHECK FOR END OF RING BUFFER |
| 0293 | 2602 | | BNE | PRN1A |

```
02295 3F1A                CLR    RPOS    ;RESET BUFFER POINTER
02297 B617      PRN1A:    LDA    BCNT
02299 B11A                CMP    RPOS
0229B 26DE                BNE    PRN1    ;LAST VALUE TO PRINT?
0229D B622                LDA    OFSET
0229F B711                STA    ADLB
02A1 B616                 LDA    DP      ;PRINT NO. OF MEASUREMENTS
02A3 B710                 STA    ADHB
02A5 CD03D2               JSR    BTBCD
02A8 CD053B               JSR    PRINT
02AB CC0123               JMP    MAIN    ;END OF PRINT LOOP
02AE B618      PRN2:      LDA    PH
02B0 B710                 STA    ADHB
02B2 B61C                 LDA    PL
02B4 B711                 STA    ADLB
02B6 CD03D2               JSR    BTBCD
02B9 CD053B               JSR    PRINT
02BC CC0123               JMP    MAIN
02BF 1D00      MAIN8:     BCLR   6,HBYTE ;RESET ADVANCE RELAY
02C1 A658                 LDA    #"X"    ;SEND KICK OUT SIGNAL
02C3 CD030D               JSR    PUTC
02C6 A60D                 LDA    #13
02C8 CD030D               JSR    PUTC
02CB CC0123               JMP    MAIN    ;GO TO RESET CONDITION

02CE                      ;SUBROUTINE TO DISPLAY TO VALUE IN ACCA
02CE AE04      LDIS:      LDX    #4
02D0 E711      LDIS1:     STA    DBCD,X
02D2 5A                   DECX
02D3 2AFB                 BPL    LDIS1
02D5 CD038B               JSR    DISP
02D8 81                   RTS

02D9                      ;SUBROUTINE TO INPUT A CHARACTER
02D9                      ;THIS ROUTINE IS INTERRUPT DRIVEN
02D9                      ;THE RS232 INPUT IS CONNECTED TO THE INTERRUPT LINE
02D9 A608      GETC:      LDA    #8
02DB B721                 STA    GCNT
02DD A604                 LDA    #4
02DF 4A        GETCD:     DECA
02E0 26FD                 BNE    GETCD   ;DELAY 1/2 BIT TIME (26 CYCLES)
02E2 2E01                 BIL    GET0    ;CHECK FOR NOISE
02E4 80                   RTI            ;RETURN - FALSE START
02E5 4D        GET0:      TSTA           ;DELAY 3 CLOCK CYCLES
02E6 AD4B                 BSR    DELAY   ;WAIT ONE BIT TIME
02E8 2E03                 BIL    GET1    ;CHECK STATE OF INTERUPT INPUT
02EA 99                   SEC            ;SET CARRY FOR A HIGH LEVEL
02EB 2003                 BRA    GET2
02ED 98        GET1:      CLC
02EE 2000                 BRA    GET2    ;TIMING EQUALIZATION
02F0 3618      GET2:      ROR    CHAR    ;ROTATE BIT TO FORM CHARACTER
02F2 3A21                 DEC    GCNT
02F4 26EF                 BNE    GET0
02F6 AD3B                 BSR    DELAY
02F8 B618                 LDA    CHAR
02FA A47F                 AND    #7FH
02FC B718                 STA    CHAR
02FE B617                 LDA    BCNT
0300 A107                 CMP    #7
0302 2A08                 BPL    GET3    ;NO MORE THAN 7 INPUT CHARS IN BUFFER
0304 BE17                 LDX    BCNT
0306 B618                 LDA    CHAR
0308 E72C                 STA    BUF,X
030A 3C17                 INC    BCNT
030C 80        GET3:      RTI

030D                      ;SUBROUTINE TO PRINT A CHAR ON ASSIGNED RS232 OUTPUT
030D 9B        PUTC:      SEI            ;DISABLE INTERRUPTS
030E B718                 STA    CHAR
0310 A609                 LDA    #9      ;PUT OUT NINE BITS
0312 B719                 STA    COUNT
0314 98                   CLC            ;START BIT
0315 2002                 BRA    PUTC2
```

| 1 | 2 | 3 | 4 | 5 |
|---|---|---|---|---|
| 0317 | 3618 | PUTC5: ROR | CHAR | ;GET NEXT BIT FROM MEMORY |
| 0319 | 2404 | PUTC2: BCC | PUTC3 | ;SET OR CLEAR PORT DEPENDING ON DATA |
| 031B | 1A00 | BSET | OUT,PUT | |
| 031D | 2004 | BRA | PUTC4 | |
| 031F | 1B00 | PUTC3: BCLR | OUT,PUT | |
| 0321 | 2000 | BRA | PUTC4 | ;EQUALIZE TIMING |
| 0323 | AD0E | PUTC4: BSR | DELAY | ;MUST BE TWO BYTE INDEXED JSR FOR TIMING |
| 0325 | 3A19 | DEC | COUNT | |
| 0327 | 26EE | BNE | PUTC5 | ;STILL MORE BITS? |
| 0329 | 1000 | BSET | COUT,PUT | ;7 CYCLE DELAY |
| 032B | 1A00 | BSET | OUT,PUT | ;SEND STOP BIT |
| 032D | 9A | CLI | | ;RE-ENABLE INT'S |
| 032E | AD03 | BSR | DELAY | ;DELAY FOR THE STOP BIT |
| 0330 | AD01 | BSR | DELAY | ;SECOND STOP BIT |
| 0332 | 81 | RTS | | |
| 0333 | A606 | DELAY: LDA | #6 | ;SET TO #6 FOR 9600 BAUD |
| 0335 | 4A | DEL2: DECA | | |
| 0336 | 26FD | BNE | DEL2 | |
| 0338 | 81 | RTS | | |
| 0339 | | | ;SUBROUTINE TO MULTIPLY 16 BITS BY 16 BITS | |
| 0339 | BE1A | MULT: LDX | RPOS | |
| 033B | 58 | LSLX | | ;SHIFT LEFT FOR 16 BIT INTEGER ADDRE |
| 033C | D60557 | LDA | SFAC,X | ;MOVE MULTIPLIER INTO POSITION |
| 033F | B71F | STA | QH | |
| 0341 | D60558 | LDA | SFAC+1,X | |
| 0344 | B720 | STA | QL | |
| 0346 | AE10 | LDX | #16 | ;MULTIPLY BY SCALING FACTOR 16 X 16 |
| 0348 | 3F1D | CLR | TEMPA | |
| 034A | 3F1E | CLR | TEMPB | |
| 034C | 361F | ROR | QH | |
| 034E | 3620 | ROR | QL | |
| 0350 | 240C | NXT: BCC | ROTAT | |
| 0352 | B61E | LDA | TEMPB | |
| 0354 | BB1C | ADD | PL | |
| 0356 | B71E | STA | TEMPB | |
| 0358 | B61D | LDA | TEMPA | |
| 035A | B91B | ADC | PH | |
| 035C | B71D | STA | TEMPA | |
| 035E | 361D | ROTAT: ROR | TEMPA | |
| 0360 | 361E | ROR | TEMPB | |
| 0362 | 361F | ROR | QH | |
| 0364 | 3620 | ROR | QL | |
| 0366 | 5A | DECX | | |
| 0367 | 26E7 | BNE | NXT | |
| 0369 | B61F | LDA | QH | |
| 036B | BA1E | ORA | TEMPB | |
| 036D | 2717 | BEQ | MUL1 | |
| 036F | BE1A | LDX | RPOS | ;DO DOUBLE PRECISION ADD OF OFFSET |
| 0371 | 58 | LSLX | | |
| 0372 | 98 | CLC | | |
| 0373 | B61F | LDA | QH | |
| 0375 | DB056C | ADD | OFAC+1,X | |
| 0378 | B711 | STA | ADLB | |
| 037A | B61E | LDA | TEMPB | |
| 037C | D9056B | ADC | OFAC,X | |
| 037F | B710 | STA | ADHB | |
| 0381 | A480 | AND | #80H | |
| 0383 | 2601 | BNE | MUL1 | |
| 0385 | 81 | RTS | | |
| 0386 | 3F11 | MUL1: CLR | ADLB | |
| 0388 | 3F10 | CLR | ADHB | |
| 038A | 81 | RTS | | |
| 038B | | | ;SUBROUTINE TO DISPLAY DATA | |
| 038B | AE03 | DISP: LDX | #3 | |
| 038D | E612 | DIL2: LDA | DBCD+1,X | |
| 038F | 2607 | BNE | DIL1 | |
| 0391 | A60A | LDA | #0AH | |
| 0393 | E712 | STA | DBCD+1,X | |
| 0395 | 5A | DECX | | |
| 0396 | 2AF5 | BPL | DIL2 | |
| 0398 | 3F16 | DIL1: CLR | DP | |

```
039A 3C16              INC     DP
039C AE04              LDX     #4
039E 1100       DLOP:  BCLR    0,LOB
03A0 1300              BCLR    1,LOB
03A2 E611              LDA     DBCD,X
03A4 A403              AND     #3
03A6 BB00              ADD     LOB
03A8 B700              STA     LOB
03AA E611              LDA     DBCD,X
03AC A40C              AND     #12
03AE 48                LSLA
03AF 48                LSLA
03B0 48                LSLA
03B1 48                LSLA
03B2 B701              STA     HOB
03B4 B616              LDA     DP
03B6 3816              LSL     DP
03B8 BA01              ORA     HOB
03BA BA17              ORA     LCDC
03BC B701              STA     HOB
03BE 1600              BSET    3,LOB
03C0 1700              BCLR    3,LOB    ;LATCH DISPLAY DIGIT SELECT
03C2 B601              LDA     HOB
03C4 A4C0              AND     #0C0H
03C6 BA17              ORA     LCDC
03C8 B701              STA     HOB
03CA 1600              BSET    3,LOB
03CC 1700              BCLR    3,LOB
03CE 5A                DECX
03CF 2ACD              BPL     DLOP
03D1 81                RTS

03D2                   ;SUBROUTINE TO CONVERT BINARY TO BCD FOR DISPLAY ON LCD
03D2 AE03       BTBCD: LDX     #3
03D4 6F12       BLOP:  CLR     BVAL,X
03D6 5A                DECX
03D7 2AFB              BPL     BLOP
03D9 AE06              LDX     #6
03DB 98         LOP:   CLC
03DC B611       LOOP:  LDA     IVAL+1
03DE DB0407            ADD     TAB+1,X
03E1 B711              STA     IVAL+1
03E3 B610              LDA     IVAL
03E5 D90406            ADC     TAB,X
03E8 B710              STA     IVAL
03EA 2B06              BMI     DWN
03EC 54                LSRX
03ED 6C12              INC     BVAL,X
03EF 59                ROLX
03F0 20EA              BRA     LOOP
03F2 98         DWN:   CLC
03F3 B611              LDA     IVAL+1
03F5 D20407            SBC     TAB+1,X
03F8 B711              STA     IVAL+1
03FA B610              LDA     IVAL
03FC D20406            SBC     TAB,X
03FF B710              STA     IVAL
0401 5A                DECX
0402 5A                DECX
0403 2AD6              BPL     LOP
0405 81                RTS              ;RETURN
0406 FFF6       TAB:   DW      -10
0408 FF9C              DW      -100
040A FC18              DW      -1000
040C D8F0              DW      -10000
040E                   ;SUBROUTINE TO DETERMINE POSITION OF ROTARY SWITCH
040E AE08       INPS:  LDX     #8       ;MAX POSITIONS IS EIGHT
0410 3F01              CLR     CHAN
0412 1400              BSET    2,CHC
0414 1500              BCLR    2,CHC
0416 3F1A              CLR     RPOS
0418 08000F     INPS1: BRSET   4,RSO,INPS2
041B 3C1A              INC     RPOS     ;INC POSITION OF SWITCH
041D B601              LDA     CHAN     ;SET 4051 TO NEXT POSITION
```

| 1 | 2 | 3 | 4 | 5 |
|---|---|---|---|---|
| 041F | AB08 | | ADD | #8 |
| 0421 | B701 | | STA | CHAN |
| 0423 | 1400 | | BSET | 2,CHC ;CLOCK INTO 4174 |
| 0425 | 1500 | | BCLR | 2,CHC |
| 0427 | 5A | | DECX | |
| 0428 | 26EE | | BNE | INPS1 |
| 042A | 81 | INPS2: | RTS | |
| 042B | | | ;SUBROUTINE FOR A/D CONVERSION WITH 10 BIT D/A | |
| 042B | D6054D | ADC: | LDA | TCHN,X |
| 042E | B701 | | STA | CHAN |
| 0430 | B723 | | STA | TCHAN |
| 0432 | 1400 | | BSET | 2,CHC ;LATCH CHANNEL DATA |
| 0434 | 1500 | | BCLR | 2,CHC |
| 0436 | 3F01 | RPT: | CLR | LBYTE ;CLEAR D/A PORTS |
| 0438 | 1100 | | BCLR | 0,HBYTE |
| 043A | 1300 | | BCLR | 1,HBYTE |
| 043C | 3F10 | | CLR | ADHB ;CLEAR OLD A/D READING |
| 043E | 3F11 | | CLR | ADLB |
| 0440 | AE20 | | LDX | #32 ;SET TO TRACK ANALOG INPUT FOR 8 READINGS |
| 0442 | 1200 | | BSET | 1,HBYTE ;DO BINARY SEARCH TO FIND NEW A/D VALUE |
| 0444 | 0F0002 | | BRCLR | 7,COUT,C1 |
| 0447 | 1300 | | BCLR | 1,HBYTE |
| 0449 | 1000 | C1: | BSET | 0,HBYTE |
| 044B | 0F0002 | | BRCLR | 7,COUT,C2 |
| 044E | 1100 | | BCLR | 0,HBYTE |
| 0450 | 1E01 | C2: | BSET | 7,LBYTE |
| 0452 | 0F0002 | | BRCLR | 7,COUT,C3 |
| 0455 | 1F01 | | BCLR | 7,LBYTE |
| 0457 | 1C01 | C3: | BSET | 6,LBYTE |
| 0459 | 0F0002 | | BRCLR | 7,COUT,C4 |
| 045C | 1D01 | | BCLR | 6,LBYTE |
| 045E | 1A01 | C4: | BSET | 5,LBYTE |
| 0460 | 0F0002 | | BRCLR | 7,COUT,C5 |
| 0463 | 1B01 | | BCLR | 5,LBYTE |
| 0465 | 1801 | C5: | BSET | 4,LBYTE |
| 0467 | 0F0002 | | BRCLR | 7,COUT,C6 |
| 046A | 1901 | | BCLR | 4,LBYTE |
| 046C | 1601 | C6: | BSET | 3,LBYTE |
| 046E | 0F0002 | | BRCLR | 7,COUT,C7 |
| 0471 | 1701 | | BCLR | 3,LBYTE |
| 0473 | 1401 | C7: | BSET | 2,LBYTE |
| 0475 | 0F0002 | | BRCLR | 7,COUT,C8 |
| 0478 | 1501 | | BCLR | 2,LBYTE |
| 047A | 1201 | C8: | BSET | 1,LBYTE |
| 047C | 0F0002 | | BRCLR | 7,COUT,C9 |
| 047F | 1301 | | BCLR | 1,LBYTE |
| 0481 | 1001 | C9: | BSET | 0,LBYTE |
| 0483 | 0F0002 | | BRCLR | 7,COUT,C10 |
| 0486 | 1101 | | BCLR | 0,LBYTE |
| 0488 | | | | ;TRACK SELECTED ANALOG SIGNAL |
| 0488 | 0F001D | C10: | BRCLR | 7,COUT,IRD ;INCREMENT READING UNTIL COMP. IS HI |
| 048B | 3A01 | DRD: | DEC | LBYTE ;DEC READING UNTIL COMP. IS LOW |
| 048D | B601 | | LDA | LBYTE |
| 048F | A1FF | | CMP | #0FFH ;CHECK FOR UNDERFLOW |
| 0491 | 2610 | | BNE | LCHK ;BRANCH IF NO UNDERFLOW |
| 0493 | B600 | | LDA | HBYTE |
| 0495 | A403 | | AND | #3 |
| 0497 | 2608 | | BNE | LOK ;BRANCH IF ZERO |
| 0499 | 3F01 | | CLR | LBYTE ;SET TO LOWEST VALUE |
| 049B | 1100 | | BCLR | 0,HBYTE |
| 049D | 1300 | | BCLR | 1,HBYTE |
| 049F | 2022 | | BRA | ADRD |
| 04A1 | 3A00 | LOK: | DEC | HBYTE ;DECREMENT HIGH BYTE |
| 04A3 | 0E00E5 | LCHK: | BRSET | 7,COUT,DRD ;STAY IN LOOP UNTIL COMP. IS LOW |
| 04A6 | 201B | | BRA | ADRD ;ADD IN READING |
| 04A8 | 3C01 | IRD: | INC | LBYTE ;INC READING UNTIL COMP. IS LOW |
| 04AA | 2614 | | BNE | HCHK ;CHECK FOR LOW BYTE OVERFLOW |
| 04AC | B600 | | LDA | HBYTE ;CHECK AND INC HIGH BYTE OF D/A |
| 04AE | A403 | | AND | #3 ;MASK OUT D/A HIGH ORDER BITS |
| 04B0 | A103 | | CMP | #3 ;CHECK FOR MAX VALUE |
| 04B2 | 260A | | BNE | HOK ;BRANCH IF NOT MAX |
| 04B4 | A6FF | | LDA | #0FFH ;SET D/A TO MAX VALUE |

| 1 | 2 | 3 | 4 | 5 |
|---|---|---|---|---|
| 04B6 B701 | | STA | LBYTE | |
| 04B8 1000 | | BSET | 0,HBYTE | |
| 04BA 1200 | | BSET | 1,HBYTE | |
| 04BC 2005 | | BRA | ADRD | |
| 04BE 3C00 | HOK: | INC | HBYTE | |
| 04C0 0F00E5 | HCHK: | BRCLR | 7,COUT,IRD | ;BRANCH IF COMPARATOR IS LOW |
| 04C3 98 | ADRD: | CLC | | ;DOUBLE PRECISON ADD OF A/D CONV. |
| 04C4 B601 | | LDA | LBYTE | |
| 04C6 BB11 | | ADD | ADLB | |
| 04C8 B711 | | STA | ADLB | |
| 04CA B600 | | LDA | HBYTE | |
| 04CC A403 | | AND | #3 | |
| 04CE B910 | | ADC | ADHB | |
| 04D0 B710 | | STA | ADHB | |
| 04D2 5A | | DECX | | ; TRACK SIGNAL FOR EIGHT READINGS |
| 04D3 26B3 | | BNE | C10 | |
| 04D5 AE05 | | LDX | #5 | |
| 04D7 3410 | RSFT: | LSR | ADHB | ;DIVIDE READING BY 32 |
| 04D9 3611 | | ROR | ADLB | |
| 04DB 5A | | DECX | | |
| 04DC 26F9 | | BNE | RSFT | |
| 04DE B610 | | LDA | ADHB | ;CHECK PRESURE FOR LESS THAN 150 PSI |
| 04E0 A4FF | | AND | #0FFH | |
| 04E2 2606 | | BNE | ADCC | ;RETURN IF PRESURE IS GREATER |
| 04E4 B611 | | LDA | ADLB | |
| 04E6 A4E0 | | AND | #0E0H | |
| 04E8 2701 | | BEQ | ADCD | |
| 04EA 81 | ADCC: | RTS | | |
| 04EB 3F10 | ADCD: | CLR | ADHB | |
| 04ED 3F11 | | CLR | ADLB | |
| 04EF 81 | | RTS | | ;RETURN FROM SUBROUTINE |
| 04F0 | | ;SUBROUTINE TO MAKE A LINEAR TEMPERATURE CORRECTION | | |
| 04F0 B61A | CTEMP: | LDA | RPOS | ;SAVE IT |
| 04F2 B712 | | STA | BVAL | |
| 04F4 B61B | | LDA | PH | |
| 04F6 B727 | | STA | SH | |
| 04F8 B61C | | LDA | PL | |
| 04FA B728 | | STA | SL | |
| 04FC B625 | | LDA | TH | |
| 04FE B71B | | STA | PH | |
| 0500 B626 | | LDA | TL | |
| 0502 B71C | | STA | PL | |
| 0504 A609 | | LDA | #9 | |
| 0506 B71A | | STA | RPOS | |
| 0508 CD0339 | | JSR | MULT | ;GET TEMP COEF |
| 050B AE10 | | LDX | #16 | ;MULTIPLY COEF TIMES A/D VALUE |
| 050D 3F1D | | CLR | TEMPA | |
| 050F 3F1E | | CLR | TEMPB | |
| 0511 3610 | | ROR | ADHB | |
| 0513 3611 | | ROR | ADLB | |
| 0515 240C | SNXT: | BCC | SROT | |
| 0517 B61E | | LDA | TEMPB | |
| 0519 BB28 | | ADD | SL | |
| 051B B71E | | STA | TEMPB | |
| 051D B61D | | LDA | TEMPA | |
| 051F B927 | | ADC | SH | |
| 0521 B71D | | STA | TEMPA | |
| 0523 361D | SROT: | ROR | TEMPA | |
| 0525 361E | | ROR | TEMPB | |
| 0527 3610 | | ROR | ADHB | |
| 0529 3611 | | ROR | ADLB | |
| 052B 5A | | DECX | | |
| 052C 26E7 | | BNE | SNXT | |
| 052E B610 | | LDA | ADHB | ;TEMP CORRECTED COEF IS IN QH AND TEMPB |
| 0530 B71C | | STA | PL | |
| 0532 B61E | | LDA | TEMPB | |
| 0534 B71B | | STA | PH | |
| 0536 B612 | | LDA | BVAL | |
| 0538 B71A | | STA | RPOS | |
| 053A 81 | | RTS | | |
| 053B | | | | ;PRINT OUT A/D VALUE ON RS232 LINE |
| 053B AE03 | PRINT: | LDX | #3 | |
| 053D E611 | PRIN1: | LDA | DBCD,X | ;GET HIGH ORDER VALUE |

```
053F AB30              ADD     #30H        ;CONVERT TO ASCII VALUE
0541 CD030D            JSR     PUTC        ;SEND CHARACTER
0544 5A                DECX                ;SENDING WHATEVER WAS LAST CONVERTED
0545 2AF6              BPL     PRIN1       ;BY BTBCD SUBROUTINE
0547 A60D              LDA     #13         ;ASCII CARRIAGE RETRUN
0549 CD030D            JSR     PUTC
054C 81                RTS

054D                                       ;DATA ARRAYS
054D 01        TCHN:   DB      1           ;LIST OF CHANNEL ASSIGNMENTS BY SWITCH POSIT
054E 01                DB      1           ;OLD VALUE WAS 4
054F 01                DB      1           ;PRESSURE TRANSDUCER CHANNEL
0550 01                DB      1
0551 01                DB      1
0552 01                DB      1
0553 01                DB      1
0554 01                DB      1
0555 02                DB      2           ;OLD VALUE WAS 0
0556 02                DB      2           ;OLD VALUE WAS 6
0557                                       ;LIST OF SCALING FACTORS FOR EACH CHANNEL
0557 0A40      SFAC:   DW      2624        ;PRESURE=A/D VALUE * 10.25
0559 0158              DW      344         ;HW1.2  .131
055B 01A9              DW      425         ;HW1.5  .162
055D 0293              DW      659         ;HW2.5  .251
055F 05E0              DW      1504        ;HW5    .573
0561 0A65              DW      2661        ;HW10  1.014
0563 12C5              DW      4805        ;HW15  1.831
0565 1E96              DW      7830        ;HW25  2.984
0567 0100              DW      256
0569 0050              DW      80          ;GAIN FOR TEMP COMPENSATION 056B 0000      OFAC:   DW      0           ;LIST OF OFFSETS TO APPLY FOR EACH SWITCH PO
056D 000C              DW      12
056F 0045              DW      69
0571 FFFD              DW      -3
0573 0031              DW      49
0575 0007              DW      7
0577 0093              DW      147
0579 FF26              DW      -218
057B 0000              DW      0
057D 00B8              DW      184         ;OFFSET FOR TEMP COMPENSATION

1FFA                   ORG     1FFAH
1FFA 02D9              DW      GETC        ;INTERRUPT ROUTINE TO PROCESS CHARAC
1FFE                   ORG     1FFEH
1FFE 0100              DW      STRT        ;POWER UP - RESET VECTOR
0000                   END
```

| | | | | | | | |
|---|---|---|---|---|---|---|---|
| ADC | 042B | COUT | 0000 | INPS2 | 042A | MAIN6 | 0202 |
| ADCC | 04EA | CTEMP | 04F0 | IRD | 04A8 | MAIN7 | 020E |
| ADCD | 04EB | DBCD | 0011 | IVAL | 0010 | MAIN8 | 02BF |
| ADHB | 0010 | DEL2 | 0335 | LBYTE | 0001 | MAIN9 | 0260 |
| ADLB | 0011 | DELAY | 0333 | LCDC | 0017 | MMVH | 0029 |
| ADRD | 04C3 | DIL1 | 0398 | LCHK | 04A3 | MMVL | 002A |
| BCNT | 0017 | DIL2 | 038D | LDIS | 02CE | MODE | 0024 |
| BLOP | 03D4 | DISP | 038B | LDIS1 | 02D0 | MUL1 | 0386 |
| BTBCD | 03D2 | DLOP | 039E | LOB | 0000 | MULT | 0339 |
| BUF | 002C | DP | 0016 | LOK | 04A1 | NMAIN | 0204 |
| BVAL | 0012 | DRD | 048B | LOOP | 03DC | NXT | 0350 |
| C1 | 0449 | DWN | 03F2 | LOP | 03DB | OFAC | 056B |
| C10 | 0488 | GCNT | 0021 | MA1 | 0139 | OFSET | 0022 |
| C2 | 0450 | GET0 | 02E5 | MA2 | 01B5 | OUT | 0005 |
| C3 | 0457 | GET1 | 02ED | MA3 | 0210 | PH | 001B |
| C4 | 045E | GET2 | 02F0 | MA4 | 0254 | PL | 001C |
| C5 | 0465 | GET3 | 030C | MA5 | 01CB | PRIN1 | 053D |
| C6 | 046C | GETC | 02D9 | MA8 | 01CD | PRINT | 053B |
| C7 | 0473 | GETCD | 02DF | MAIN | 0123 | PRN1 | 027B |
| C8 | 047A | HBYTE | 0000 | MAIN0 | 0125 | PRN1A | 0297 |
| C9 | 0481 | HCHK | 04C0 | MAIN1 | 0144 | PRN2 | 02AE |
| CHAN | 0001 | HOB | 0001 | MAIN2 | 0199 | PUT | 0000 |
| CHAR | 0018 | HOK | 04BE | MAIN3 | 01AB | PUTC | 030D |
| CHC | 0000 | INPS | 040E | MAIN4 | 01AD | PUTC2 | 0319 |
| COUNT | 0019 | INPS1 | 041B | MAIN5 | 01DC | PUTC3 | 031F |

```
TYPE PUMP.BAS
10 '****** PROGRAM FOR TORQUE PRESET PUMP-WRENCH SYSTEM
20 ' ***** Written by Geoffrey Z. Kosciuk   01/09/86         ************
30 DIM MMV(21): DIM MMV$(21)
33 DIM FINAL$(21)
40 OPEN"O",#1,"COM0:(E8N3F)"
45 OPEN"I",#2,"COM0:(E8N3F)"
50 IF CHECK$= "*" THEN Y=1
60 IF CHECK$()"*" THEN Y=2
70 ON Y GOTO 1010,2000
1010 CLS
1015 PRINT " Press (CR) to tighten the bolt or"
1020 PRINT " press N to start a new job"
1030 SEY$=INKEY$
1040 IF SEY$=CHR$(13) THEN Y1=1
1050 IF SEY$="N" THEN Y1=2
1055 IF SEY$="N" THEN CHECK$=" "
1060 IF SEY$()"N" AND SEY$()CHR$(13) THEN GOTO 1030
1070 ON Y1 GOTO 2400,2000
2000 'CLS
2005 PRINT" Choose mode "
2010 PRINT" A=auto ; M=manual"
2015 MODE$=INKEY$
2020 IF MODE$="A" GOTO 2030
2025 IF MODE$()"M" THEN GOTO 2015
2030 MODE=1
2040 IF MODE$="A" THEN MODE=2
2050 ON MODE GOTO 2420,2060
2060 IF CHECK$="**" THEN GOTO 1010
2065 CLS
2070 PRINT " Type in Job Information and press (CR)"
2080 INPUT JOB$
2090 CLS
2100 PRINT" Enter today's date and press (CR) "
2200 INPUT MDATE$
2210 CLS
2400 PRINT" Enter bolt number and press (CR)"
2410 INPUT BOLT$
2420 CLS :PRINT:PRINT
2500 PRINT " Wrench Type (ex. 1.5)"
2510 PRINT " ";WRENCH : LOCATE 1,4
2511 INPUT WREN: IF WREN()0 THEN WRENCH=WREN
2515 Y11=0
2520 IF WRENCH=1.2 THEN GOSUB 5000
2530 IF WRENCH=1.5 THEN GOSUB 5050
2540 IF WRENCH=2.5 THEN GOSUB 5100
2550 IF WRENCH=5 THEN GOSUB 5150
2560 IF WRENCH=10 THEN GOSUB 5200
2570 IF WRENCH=15 THEN GOSUB 5250
2580 IF WRENCH=25 THEN GOSUB 5300
2585 CLS
2590 IF Y11=1 GOTO 2700
2610 PRINT : PRINT "Bad wrench type ": GOTO 2500
2700 PRINT " Enter Torque in FT-LBS "
2710 PRINT " ";T : LOCATE 1,2
2720 INPUT T1 : IF T1()0 THEN T=T1
2730 IF T(=0 THEN GOTO 2585
2740 P=(T-YINT)/SLW
2750 IF P(=10000 THEN GOTO 2880
2760 CLS : PRINT "  TOO HIGH TORQUE FOR THE WRENCH"
2770 PRINT "  YOU USING !!": GOTO 2500
2880 PR=P/10.25
2885 PR=CINT(PR)
2890 IF MODE=1 GOTO 4000
2895 ' ***** AUTO ROUTINE *******
2900 CLS: PRINT " Press G to start tightening "
2910 G$=INKEY$: IF G$()"G" GOTO 2910
2920 IST=1
2930 G1$=INKEY$ : IF G1$=CHR$(32) THEN GOTO 2970
2940 CLS: PRINT" DEAD MAN (SPACE BAR)"
2945 PRINT"HAS TO BE HIT IN EMERGENCY"
```

```
2950 'PRINT " has to be PRESSED CONTINUESLY"
2955 'PRINT " during system operation "; GOTO 2930
2970 RELAY$="R" : GOSUB 6000
2980 J=1
2990 J=J+1
2999 G1$=INKEY$: IF G1$=CHR$(32) THEN GOTO 3030
3000 'G1$=INKEY$ : IF G1$()CHR$(32) THEN GOTO 3030
3010 IF J< 50 GOTO 2990
3020 GOTO 3100
3030 GOSUB 7000
3040 CHECK$="**": GOTO 50
3100 GOSUB 7000
3120 RELAY$="A" : GOSUB 6000
3135 'PRINT"STRING"
3140 FOR I=1 TO 21
3200 INPUT#2,FINAL$(I)
3204 'PRINT FINAL$(I);" ";
3205 NEXT I
3206 CLOSE: OPEN"O",#1,"COM0:(E8N3F)"
3207 OPEN"I",#2,"COM0:(E8N3F)"
3210 GOSUB 8000
3220 IF SLOPE>SLEND THEN GOTO 3500
3230 IST=IST+1
3240 IF IST()2 GOTO 3260
3250 FLAG=0 : GOTO 2970
3260 IF I>1.1*IP GOTO 3450
3270 IF FLAG=1 THEN GOTO 3400
3280 PRINT " Loose bolt or "
3290 PRINT " no ratchet stroke !!!"
3291 K=1
3295 K=K+1 : IF K<40 GOTO 3295
3300 CLS: GOTO 2970
3400 PRINT " No ratchet stroke !!!!!"
3410 K=1
3420 K=K+1 : IF K<40 GOTO 3420
3430 CLS : GOTO 2970
3450 FLAG=1 : GOTO 2970
3500 CHECK$="* "
3510 PRINT " Move wrench to the NEXT BOLT!!!"
3520 LPRINT:LPRINT:LPRINT "   Job: ";JOB$
3530 LPRINT "   Date: ";MDATE$
3540 LPRINT "   Bolt ID: ";BOLT$
3550 LPRINT "   Wrench: PHW";WRENCH
3560 LPRINT "   Torque [FT-LBS] = ";T
3565 LPRINT:LPRINT:LPRINT
3570 GOTO 50
4000 PRINT" PRESS :"
4010 PRINT"         A - to advance "
4020 PRINT"         R - to retract "
4030 PRINT"         S - to stop"
4040 AA$=INKEY$
4050 IF AA$="S" GOTO 50
4060 IF AA$="A" GOTO 4200
4065 IF AA$()"R" THEN GOTO 4040
4070 RELAY$="R": GOTO 4210
4200 RELAY$="A"
4210 GOSUB 6000
4215 FOR I=1 TO 17:NEXT I
4220 AA$=INKEY$
4225 'PRINT AA$
4230 IF AA$=RELAY$ THEN GOTO 4215
4234 'PRINT EOF(2)
4235 IF EOF(2)=0 THEN GOTO 4040
4240 GOSUB 7000
```

```
4250 GOTO 4040
4260 END
5000 '********PHW 1.2 ********
5010 SLW=.131: YINT=12.3: Y11=1
5020 RETURN
5050 '********PHW 1.5 *********
5060 SLW=.162: YINT=69.2: Y11=1
5070 RETURN
5100 '********PHW 2.5 *********
5110 SLW=.251: YINT=-2.7: Y11=1
5120 RETURN
5150 '********PHW 5 ***********
5160 SLW=.573: YINT=48.6: Y11=1
5170 RETURN
5200 '********PHW 10 **********
5210 SLW=1.06: YINT=1.6: Y11=1
5220 RETURN
5250 '********PHW 15 **********
5260 SLW=1.83: YINT=146.8: Y11=1
5270 RETURN
5300 '********PHW 25 **********
5310 SLW=2.98: YINT=-218 : Y11=1
5320 RETURN
6000 '****** TRANSMISSION ROUTINE ********
6001 IF RELAY$="R" OR MODE=1 THEN GOTO 6016
6002 GOSUB 9500
6003 CLOSE
6005 ON ERROR GOTO 6014
6006 OPEN "O",#1,"COM0:(E8N31)"
6012 OPEN"I",#2,"COM0:(E8N31)"
6013 GOTO 6021
6014 IF ERR=24 THEN GOTO 9000
6015 GOTO 8200
6016 CLOSE: OPEN"O",#1,"COM0:(E8N3F)"
6018 OPEN"I",#2,"COM0:(E8N3F)"
6021 MODE1$=STR$(MODE): PR$=STR$(PR)
6022 MODE1$=RIGHT$(MODE1$,1)
6025 IF PR<1000 THEN GOSUB 6500
6030 IF PR<100 THEN GOSUB 6550
6040 IF PR<10 THEN GOSUB 6600
6050 INFO$=MODE1$+B1$+PR$+RELAY$
6060 IF RELAY$="R" THEN PRINT#1,INFO$;
6061 IF RELAY$="A" THEN PRINT#1,INFO$;
6062 'PRINT INFO$
6070 INPUT#2,INFO1$
6071 'PRINT INFO1$
6080 IF INFO1$=INFO$ THEN GOTO 6110
6090 CHECK1$="N"
6100 PRINT#1,CHECK1$; : GOTO 6060
6110 CHECK1$="Y" : PRINT#1,CHECK1$;
6120 RETURN
6500 B1$="0" : PR$=RIGHT$(PR$,3)
6510 RETURN
6550 B1$="00" : PR$=RIGHT$(PR$,2)
6560 RETURN
6600 B1$="000" : PR$=RIGHT$(PR$,1)
6610 RETURN
7000 '******* INTERUPT ROUTINE ************
7001 CLOSE: OPEN"O",#1,"COM0:(E8N3F)"
7002 OPEN"I",#2,"COM0:(E8N3F)"
7010 INTER$="A" : PRINT#1,INTER$; :K=1
7020 K=K+1
7021 'PRINT EOF(2)
7030 IF EOF(2)=-1 THEN 7050
7031 'PRINT EOF(2)
7035 INPUT#2,INTER1$
```

```
7036 'PRINT "INTER1=";INTER1$
7040 IF INTER1$="X" THEN GOTO 7070
7050 IF K>7 THEN GOTO 7010
7060 GOTO 7020
7070 RETURN
8000 '********** 20 NUMBERS & I CONVERTING ROUTINE *****
8005 'PRINT"VALUES"
8010 FOR I=1 TO 21
8050 MMV(I)=VAL(FINAL$(I))
8055 'PRINT MMV(I);
8060 NEXT I
8070 ICOUNT=MMV(21)
8080 IF IST>1 GOTO 8100
8090 IP=ICOUNT
8100 SLOPE=MMV(20)/ICOUNT
8110 SLEND=(MMV(20)-MMV(10))/10
8120 RETURN
8200 '*** SUBROUTINE
8201 PRINT"DEAD MAN'S SWITHCH OPEN!"
8202 PRINT"DEAD MAN'S SWITHCH OPEN!"
8210 GOSUB 7000
8220 CHECK$="**"
8230 RESUME 50
9000 ' TIME ERROR ROUTINE
9010 PRINT" DEAD MAN'S SWITCH"
9020 PRINT" MUST BE PRESSED!!!!!"
9030 RESUME 6000
9500 '****************
9510 PRINT" DEAD MAN'S SWITCH"
9520 PRINT" MUST BE PRESSED!!!!!"
9530 RETURN
```

TABLE IV

LIST OF VARIABLES FOR PROGRAM OF FIGURES 14A-14K

| Variable | Description |
| --- | --- |
| CHECL | (Values Possible: " "; "*"; "**") Checks if pump unpluged or system is ready for next bolt or system was aborted by use of dead man's switch. |
| JOB$ | Alphanumeric, represents job information. |
| DATE$ | Aplhanumeric, represents date. |
| BOLT$ | Alphanumeric, represents bolt identification. |
| WRENCH | Numeric, represents hydraulic wrench models (1.2, 1.5, 2.5, 5, 10, 15, 25 of Raymond Engineering). |
| TORQUE | Numeric, input torque in ft.-lbs. |
| PRESSURE | Numeric, input pressure calculated from torque. |
| SWL | Numeric, slope of wrench characteristic. |
| YINT | Numeric, Y-intercept of wrench characteristic. |
| PRESET | Numeric, target preset pressure in mV. |
| MODE | Numeric, constant determining operating mode (auto manual). |
| J | Counter. |

| | | |
|---|---|---|
| N | — | Count corresponding to 3sec of the time (to be determined by program). |
| IST | — | Wrench Stroke counter. |
| I | — | Counter of pressure points within the stroke. |
| MMV(1) | — | Pressure reading in mV of pressure transducer. |
| P1 | — | Value of first pressure point. |
| IP | — | Number of pressure points taken during the first stroke. |
| SLOPE | — | Overall average slope between two readings calculated using change in pressure from the first to the last data point (dPave). |
| SLEND | — | Average slope between two readings calculated using change in pressure for last 10 data points ($dP_f$). |
| FLAG | — | Constant = 0 or = 1 when first good stroke is encountered. |

What is claimed is:

1. Apparatus for automatic cycling and termination of operation of a fluid powered torque wrench supplied with operating fluid from a pump, including:
   first control means for selecting a desired level of torque to be applied to a fastening element by the torque wrench;
   second control means connected to said first control means to receive a first signal from said first control means commensurate with said desired level of torque and initiate a tightening cycle of operation of the wrench;
   monitoring means for monitoring the pressure of the operating fluid in said wrench and generating a second signal commensurate with the torque imposed on a fastening element by said wrench;
   comparator means to compare said first and second signals and deliver a third signal to said second control means to interrupt the operation of the wrench; and
   said first control means analyzing the pressure history of the tightening cycle of operation of the wrench to initiate another cycle of tightening operation or terminate the tightening operation.

2. The apparatus of claim 1 wherein:
   said first control means includes first computer means having input means to select wrench operating size and a selected torque load to be applied to a fastener, said computer means being capable of converting the selected torque load to a first voltage signal for said first signal.

3. The apparatus of claim 2 wherein:
   said second control means includes second computer means which receives said first voltage signal and delivers a series of reference signals to said comparator means;
   said monitoring means includes pressure transducer means to sense the pressure of operating fluid in the wrench and generate a second voltage signal commensurate therewith for said second signal; and
   said comparator means compares said series of reference signals and said second voltage signal and generates an electrical signal as said third signal in response to the relationship between said first and second signals.

4. The apparatus of claim 3 wherein:
   said first control means is capable of distinguishing between an intermediate wrench stroke in which less than the selected torque has been applied to a fastening element and a final wrench stroke in which the selected level of torque has been applied to a fastening element.

5. The apparatus of claim 4 wherein:
   said first control means distinguishes between an intermediate wrench stroke and a final wrench stroke by analyzing the relationship between the average rate of change of the pressure of the operating fluid of the wrench over a substantial part of the tightening cycle of the wrench and the final rate of change of the pressure of the operating fluid at the end of the tightening cycle of the wrench.

6. The apparatus of claim 5 wherein:
   the relationship of said final rate of change of pressure being greater than said average rate of change of pressure is identified as an intermediate stroke of the wrench.

7. The apparatus of claim 5 wherein;
   the relationship of said final rate of change of pressure being less than the average rate of change of pressure is identified as a final stroke of the wrench.

8. The apparatus of claim 5 wherein:
   said first control means is also capable of distinguishing between an intermediate wrench stroke and a non-stroke.

9. The apparatus of claim 8 wherein:
   the relationship of said final rate of change of pressure being greater than said average rate of change of pressure in a time period of less than 90% of the time period of the previous stroke is identified as non-stroke of the wrench.

10. Apparatus for automatic cycling and termination of operation of a fluid powered torque wrench supplied with operating fluid from a pump, including:

flow control valve means between the pump and said wrench to direct pressurized fluid to said wrench to advance or retract said wrench;

first valve control means connected to said flow control valve means to position said flow control valve means in either a null position or an advance position to deliver pressurized fluid to said wrench to advance said wrench;

second valve control means connected to said flow control valve means to position said flow control valve means to either a null position or a retract position to deliver pressurized fluid to said wrench to retract said wrench;

first control means for selecting a desired level of torque to be applied to a fastening element by the torque wrench and generating a first signal commensurate with a cut off pressure level of fluid supplied to said wrench which is commensurate with said desired level of torque;

second control means connected to said first control means to receive said first signal from said first control means commensurate with said desired level of torque, said second control means being connected to operate said first and second valve control means and operating in response to an appropriate signal to operate said first valve control means to position said flow control valve means to deliver pressurized fluid to advance said wrench to tighten a fastener;

pressure sensing means for sensing the pressure level of fluid delivered to said pump and generating a second signal commensurate with the torque imposed on a fastening element by said wrench;

comparator means to compare said second signal with a series of pressure level signals from said second control means and generating a third signal to said second control means when the pressure in said pump equals a pressure level signal from said second control means;

said first signal to said second control means establishing a cut off level, and said second control means functioning to operate said first valve control means to position said flow control valve means in a null position when said third signal from said comparator means is commensurate with the pressure in said pump being equal to said cut off pressure level; and said first control analyzing the pressure history of the tightening cycle of operation of the wrench to either terminate the tightening operation or cause said second control means to first operate said second valve control means to position said flow control valve means to deliver pressurized fluid to said wrench to retract said wrench and then operate said second valve control means to position said flow control valve means in a null position and then operate said first valve control means to position said flow control valve means to deliver pressurized fluid to said wrench for another cycle of operation to tighten the fastener.

11. The apparatus of claim 10 wherein:
said first control means includes first computer means having input means to select wrench operating size and a selected torque load to be applied to a fastener, said computer means being capable of converting the selected torque load to a first voltage signal for said first signal.

12. The apparatus of claim 11 wherein:
said second control means includes second computer means which receives said first voltage signal and delivers a series of reference signals to said comparator means;

said monitoring means includes pressure transducer means to sense the pressure of operating fluid in the wrench and generate a voltage signal commensurate therewith for said second signal; and said comparator means compares said series of reference signals and said second voltage signal and generates an electrical signal as said third signal in response to the relationship between said first and second signals.

13. The apparatus of claim 11 wherein:
said first control means is capable of distinguishing between an intermediate wrench stroke in which less than the selected torque has been applied to a fastening element and a final wrench stroke in which the selected level of torque has been applied to a fastening element.

14. The apparatus of claim 12 wherein:
said first control means distinguishes between an intermediate wrench stroke and a final wrench stroke by analyzing the relationship between the average rate of change of the pressure of the operating fluid of the wrench over a substantial part of the tightening cycle of the wrench and the final rate of change of the pressure of the operating fluid at the end of the tightening cycle of the wrench.

15. The apparatus of claim 13 wherein:
the relationship of said final rate of change of pressure being greater than said average rate of change of pressure is identified as an intermediate stroke of the wrench.

16. The apparatus of claim 14 wherein;
the relationship of said final rate of change of pressure being less than the average rate of change of pressure is identified as a final stroke of the wrench.

17. The apparatus of claim 10 wherein:
said pressure sensing means includes pressure transducer means;
and also including:
amplifier means connected to said pressure transducer means to receive the output from said pressure transducer means and deliver a signal commensurate therewith to said comparator means.

18. The apparatus of claim 10 wherein said second control means is microprocessor means, and including:
digital to analog converter means connected to receive a sequence of digital voltage signals from said microprocessor means and to deliver said signals in sequence to said comparator for comparison with said output signal from said amplifier means commensurate with the pressure level; and said comparator means being connected to said microprocessor means to deliver a signal to said microprocessor means when the digital voltage signal to said comparator means and the amplifier output signal to said comparator means are approximately equal.

19. A method for automatic cycling and termination of operation of a fluid powered torque wrench supplied with operating fluid from a pump, including the steps of:
selecting in a first control means a desired level of torque to be applied to a fastening element by the torque wrench;

delivering to a second control means connected to said first control means a first signal from said first control means commensurate with said desired level of torque to initiate a tightening cycle of operation of the wrench;

monitoring the pressure of the operating fluid in said wrench and generating a second signal commensurate with the torque imposed on a fastening element by said wrench;

comparing said first and second signals and delivering a third signal to said second control means to interrupt the operation of the wrench; and analyzing in said first control means the pressure history of the tightening cycle of operation of the wrench to initiate another cycle of tightening operation or terminate the tightening operation.

20. The method of claim 19 wherein:
said step of selecting a desired level of torque in a first control means includes delivering to first computer means inputs to select wrench operating size and a selected torque load to be applied to a fastener, said first computer means being capable of converting the selected torque load to a first voltage signal for said first signal.

21. The method of claim 20 wherein:
said second control means includes second computer means which receives said first voltage signal and delivers a series of reference signals to said comparator means; and said monitoring step includes sensing the pressure of operating fluid in the wrench and generating a voltage signal commensurate therewith for said second signal; and said comparing step compares said series of reference signals and said second voltage signal and generates an electrical signal as said third signal in response to the relationship between said first and second signals.

22. The method of claim 21 including the step of:
distinguishing between an intermediate wrench stroke in which less than the selected torque has been applied to a fastening element and a final wrench stroke in which the selected level of torque has been applied to a fastening element.

23. The method of claim 22 wherein said step of distinguishing includes:
distinguishing between an intermediate wrench stroke and a final wrench stroke by analyzing the relationship between the average rate of change of the pressure of the operating fluid of the wrench over a substantial part of the tightening cycle of the wrench and the final rate of change of the pressure of the operating fluid at the end of the tightening cycle of the wrench.

24. The method of claim 23 wherein:
the relationship of said final rate of change of pressure being greater than said average rate of change of pressure is identified as an intermediate stroke of the wrench.

25. The method of claim 23 wherein:
the relationship of said final rate of change of pressure being less than the average rate of change of pressure is identified as a final stroke of the wrench.

26. The method of claim 23 wherein said step of distinguishing also includes:
distinguishing between an intermediate wrench stroke and a non-stroke.

27. The method of claim 26 wherein:
the relationship of said final rate of change of pressure being greater than said average rate of change of pressure in a time period of less than 90% of the time period of the previous stroke is identified as a nonstroke of the wrench.

28. The method of claim 19 further including the steps of:
determining the nut factor of the fastener being tightened;

determining the preload applied to the fastener based on the determined nut factor; and changing the desired level of torque to be applied to the fastener in accordance with the determined preload.

29. The method of claim 28 wherein:
said nut factor is determined from the pressure of the operating fluid in the wrench and the angular stroke of the wrench.

30. The method of claim 29 wherein:
said nut factor is determined from the relationship $$K = \frac{\Delta P}{\Delta \theta} \left[ \frac{L\, A_c}{D \left( \frac{K_B K_J}{K_B + K_J} \right) \frac{Pi}{360}} \right]$$

where
K = nut factor
L = length of wrench lever arm (in.)
Ac = cross sectional area of wrench piston
$K_B$ = bolt stiffness (lbs/in)
$K_J$ = joint stiffness (lbs/in)
D = nom. diam of bolt
$\Delta P$ = change in pressure during wrench stroke (psi)
$\Delta \theta$ = angular stroke of wrench or change in "angle" of nut;
Pi = pitch of threads (inch)

31. The method of claim 28 wherein:
said preload is determined from the relationship $F_p = T/KD$
where
$F_p$ = preload
T = Torque
D = diameter of the fastener k = nut factor.

* * * * *